(12) United States Patent
Yano et al.

(10) Patent No.: US 7,086,227 B2
(45) Date of Patent: *Aug. 8, 2006

(54) HYDROSTATIC VEHICLE DRIVING SYSTEM APPLICABLE TO A WORKING VEHICLE

(76) Inventors: Kazuhiko Yano, 2-18-1, Inadera, Amagasaki-shi, Hyogo (JP); Toshiro Azuma, 2-18-1, Inadera, Amagasaki-shi, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/039,838

(22) Filed: Jan. 24, 2005

(65) Prior Publication Data

US 2005/0129533 A1  Jun. 16, 2005

Related U.S. Application Data

(63) Continuation of application No. 10/728,816, filed on Dec. 8, 2003, now Pat. No. 6,860,105, which is a continuation of application No. 09/798,949, filed on Mar. 6, 2001, now Pat. No. 6,668,549.

(30) Foreign Application Priority Data

| Mar. 7, 2000 | (JP) | ................................ 2000-61360 |
| Apr. 10, 2000 | (JP) | ............................. 2000-107911 |
| Jul. 11, 2000 | (JP) | ............................. 2000-209641 |

(51) Int. Cl.
*F16D 31/02* (2006.01)
(52) U.S. Cl. ............................. 60/433; 60/450; 60/490
(58) Field of Classification Search .................. 60/431, 60/433, 450, 452, 487, 490
See application file for complete search history.

(56) References Cited

U.S. PATENT DOCUMENTS

| 4,478,041 A | 10/1984 | Pollman |
| 4,546,847 A | 10/1985 | Abels |
| 5,335,750 A | 8/1994 | Geringer et al. |
| 5,593,000 A * | 1/1997 | Johnson ....................... 74/487 |
| 6,151,895 A | 11/2000 | Matsura |
| 6,272,854 B1 | 8/2001 | Ishii et al. |
| 6,449,949 B1 | 9/2002 | Abend et al. |
| 6,668,549 B1 * | 12/2003 | Yano et al. ................... 60/490 |
| 6,715,283 B1 | 4/2004 | Abend et al. |
| 6,786,042 B1 | 9/2004 | Ishii |

* cited by examiner

*Primary Examiner*—Edward K. Look
*Assistant Examiner*—Michael Leslie
(74) *Attorney, Agent, or Firm*—Sterne, Kessler, Goldstein & Fox P.L.L.C.

(57) ABSTRACT

A hydrostatic vehicle driving system structured from an engine to a drive axle in a working vehicle. A hydraulic pump driven by the engine and a variable displacement hydraulic motor for driving the drive axle are fluidly connected with each other through a hydraulic circuit. A motor capacity control system controls capacity of the hydraulic motor in correspondence to the condition of load on the engine. The motor capacity control system comprises load-detection means detecting hydraulic pressure in the hydraulic circuit replacing the load on the engine, a hydraulic actuator for changing the capacity of the hydraulic motor, and actuator-control means controlling the hydraulic actuator according to the detection of hydraulic pressure by the load-detection means.

10 Claims, 34 Drawing Sheets

HYDROSTATIC VEHICLE DRIVING SYSTEM APPLICABLE TO A WORKING VEHICLE

CROSS REFERENCE TO RELATED APPLICATIONS

This application is a continuation of U.S. application Ser. No. 10/728,816, filed Dec. 8, 2003, which is a continuation of U.S. application Ser. No. 09/798,949, filed Mar. 6, 2001, now U.S. Pat. No. 6,668,549, issued 2003-Dec.-30, which are incorporated herein by reference in their entirety.

BACKGROUND OF THE INVENTION

1. Field of the Invention

The present invention relates to a hydrostatic vehicle driving system applicable to a working vehicle like that having a mower unit, namely, a lawn tractor, including a hydrostatic transmission preferably incorporated in a transaxle apparatus, wherein the speed reduction ratio exerted by the driving system is automatically changed in correspondence to the condition of load on an engine.

2. Related Art

Conventionally, it is well-known that a working vehicle like a lawn tractor having a mower unit is equipped with a belt type stepless transmission having a split pulley (hereinafter, "a belt transmission") for avoiding overload on an engine of the vehicle. Generally, such a belt transmission is interposed between the output shaft of the engine and the input shaft of the transaxle apparatus incorporating a mechanical transmission like a multi-speed gear type transmission. The belt transmission automatically changes its speed reduction ratio according to the change of output rotary speed of the engine. In this regard, the speed reduction ratio of the belt transmission is smaller when the engine drives fast, and greater when the engine drives slowly.

This system is advantageous in that, while the engine drives fast, the smaller speed reduction ratio is established for efficient exertion of the capacity of the engine, and that, while the engine drives slow, the engine can be automatically prevented from overload because of the greater speed reduction. However, the tandem arrangement of the belt transmission and the transaxle apparatus interferes with minimization and cost-saving of the vehicle.

On the other hand, for being applied to a working vehicle such as a lawn tractor, there is a well-known conventional transaxle apparatus (an integral hydrostatic transmission, namely, an "IHT") which incorporates a hydrostatic stepless transmission (hereinafter, an "HST"). The speed reduction ratio exerted by the HST, which corresponds to the ratio of capacity of a hydraulic motor to that of a hydraulic pump in the HST, is conventionally changed by a driver's manual operation of a movable swash plate of the variable capacity hydraulic pump. However, the conventional IHT used in such a working vehicle is not provided with a device automatically changing the speed reduction ratio of its HST in correspondence to output of or load on an engine.

Incidentally, even if the speed reduction ratio of such an HST in IHT for a working vehicle can be automatically changed correspondingly to load on an engine, there are still some cases such that the automatic changing of the speed reduction ratio is not desired. Particularly, if the working vehicle is a lawn tractor, it is preferable that, during its mowing work, the speed reduction ratio is not automatically changed, but manually changed only by a driver's will for preventing the lawn from being mowed unevenly.

BRIEF SUMMARY OF THE INVENTION

A main object of the present invention is to provide a hydrostatic vehicle driving system between an engine and an axle, used in a working vehicle like a lawn tractor, including an HST which comprises a hydraulic pump and a hydraulic motor fluidly connected with each other through a hydraulic circuit, wherein the speed reduction ratio exerted by the driving system can be automatically steplessly changed in correspondence to load on the engine without the use of a conventional belt transmission having a split pulley for minimization and cost-saving of the vehicle.

To achieve the object, the hydraulic motor is made to be a variable displacement hydraulic motor, whose capacity is controlled by a motor capacity control system in correspondence to the condition of load on the engine.

Consequently, the speed reduction ratio of the HST is automatically optimally increased for avoiding overload on the engine, and reduced for effectively transmitting power of the engine to the axle. The present vehicle driving system with an HST can be improved in its minimization and cost-saving because there is no use of the belt transmission as mentioned above.

Preferably, the hydraulic pump, the hydraulic motor and the axle are contained in a housing, thereby constituting a compactly integrated transaxle apparatus.

The motor capacity control system comprises load-detection means detecting hydraulic pressure in the hydraulic circuit corresponding to the load on the engine, a hydraulic actuator for changing the capacity of the hydraulic motor, and actuator-control means controlling the hydraulic actuator according to the hydraulic pressure detected by the load-detection means.

Accordingly, the capacity of the hydraulic motor can be changed without an expensive electric sensor or actuator, but with hydraulic oil utilized as it is used in the HST or the transaxle apparatus, thereby enabling the motor capacity control system to be provided simply and at low cost.

If there are some cases that the vehicle having the above-mentioned present hydrostatic vehicle driving system is desired to cruise at a constant speed, the automatically controlled capacity of the hydraulic motor is preferred to be fixed.

Then, the present hydrostatic vehicle driving system comprises a manual mode selection member which is provided on a working vehicle so as to be switched between a first mode position and a second mode position. When the mode selection member is located at the first mode position, the capacity of the hydraulic motor is fixed, and when the mode selection member is located at the second mode position, the capacity of the hydraulic motor can be varied by the motor capacity control system.

If the hydraulic motor is of an axial piston type, the hydraulic motor is provided with a movable motor swash plate having a contact surface abutting against a piston of the hydraulic motor. The motor swash plate is moved from a first angle to a second angle larger than the first angle accordingly to increase the load detected by the load detection means. The first angle and the second angle are respectively formed between the contact surface of the motor swash plate and the phantom plane perpendicular to a rotary axis of the hydraulic motor.

When the motor swash plate is located at the first angle, the capacity of the hydraulic motor is smaller so as to establish the smaller speed reduction ratio of the HST. When the motor swash plate is located at the second angle, the capacity of the hydraulic motor is greater so as to establish the greater speed reduction ratio of the HST.

Particularly, if the vehicle is a lawn tractor, it is preferable that the first mode position corresponds to its traveling during lawn-mowing and the second mode position corresponds to its regular traveling on a road or the like. If the variation of capacity of the hydraulic pump is out of consideration, then when the vehicle travels for mowing, the mode selection member is located at the first mode position so as to fix the speed reduction ratio, thereby enabling the vehicle to cruise at a constant speed so as to prevent the lawn from being mowed unevenly. When the vehicle travels on a road or the like out of mowing-work, the mode selection member is located at the second mode position so as to change the speed reduction ratio in correspondence to the detected load on the engine, thereby enabling an effective speed control and prevention of overload on the engine.

The hydraulic pump is a variable displacement hydraulic pump, and a manual speed control member is provided on the working vehicle for changing capacity of the hydraulic pump.

The capacity of the hydraulic pump is controlled by operation of the speed control member whether the mode selection member is located at the first mode position or the second mode position. In other words, when the mode selection member is located at the first mode position, the speed reduction ratio is not automatically controlled by the motor capacity control means, but manually changed only by operation of the speed control means. When the mode selection member is located at the second mode position, the speed reduction ratio is automatically controlled by the motor capacity control means in addition to its manual change by operation of the speed control means.

If the hydraulic pump is an axial piston type variable displacement hydraulic pump, the manual speed control member is operated so as to move a movable pump swash plate of the hydraulic pump.

The speed control member may be selectively connected to a carburetor of the engine so that, when the mode selection member is located at the second mode position, the speed control member is operated so as to control both capacity of the hydraulic pump and output rotary speed of the engine. Especially, the speed control member may be selectively connected to a throttle member of the carburetor so that, when the mode selection member is located at the second mode position, the speed control member is operated so as to move both the pump swash plate and the throttle member.

Therefore, on the above-mentioned assumption that the vehicle is a lawn tractor, during its regular traveling out of mowing work, only the speed control member is manipulated without manipulation of an accelerator member provided on the vehicle, thereby enabling the engine and transmission in the vehicle to be controlled with one hand. If the vehicle is to ascend a slope or start while the mode selection member is located at the second mode position, the engine is desirably accelerated in association with the shift of the transmission to highspeed by such an easy operation.

For an alternative mechanism for capacity control of the variable displacement hydraulic pump in association with output control of the engine, an actuator for changing capacity of the hydraulic pump may be provided in addition to the manual speed control member so as to be controlled according to the output of the engine, and a selection means is provided for selecting one of the manual speed control member and the actuator so as to change the capacity of the hydraulic pump. This selection means may be provided in association with the mode selection member so that, while the selection means selects the speed control member, capacity of the hydraulic motor is fixed, and that, while the selection means selects the actuator, capacity of the hydraulic motor can be changed.

In this regard, the above-mentioned hydraulic circuit for fluidly connecting the hydraulic pump and the hydraulic motor with each other serves as a first hydraulic circuit for driving the hydraulic motor, and additionally, a second hydraulic circuit is extended from a discharge port of a charge pump driven by the engine for supplying the first hydraulic circuit with fluid. An orifice is provided on the way of the second hydraulic circuit, so that the actuator is driven according to difference of hydraulic pressure in the second hydraulic circuit between upstream and downstream of the orifice.

Consequently, when the selection means selects the actuator, capacity of the hydraulic pump is varied according to operation of a manual accelerator member such as a pedal or a lever for adjusting the throttle of a carburetor of the engine, thereby enabling both engine controlling and transmission shifting with one hand (foot).

Other and further objects, features and advantages of the present invention will appear more fully from the following description.

BRIEF DESCRIPTION OF THE DRAWINGS/FIGURES

Figure 5:
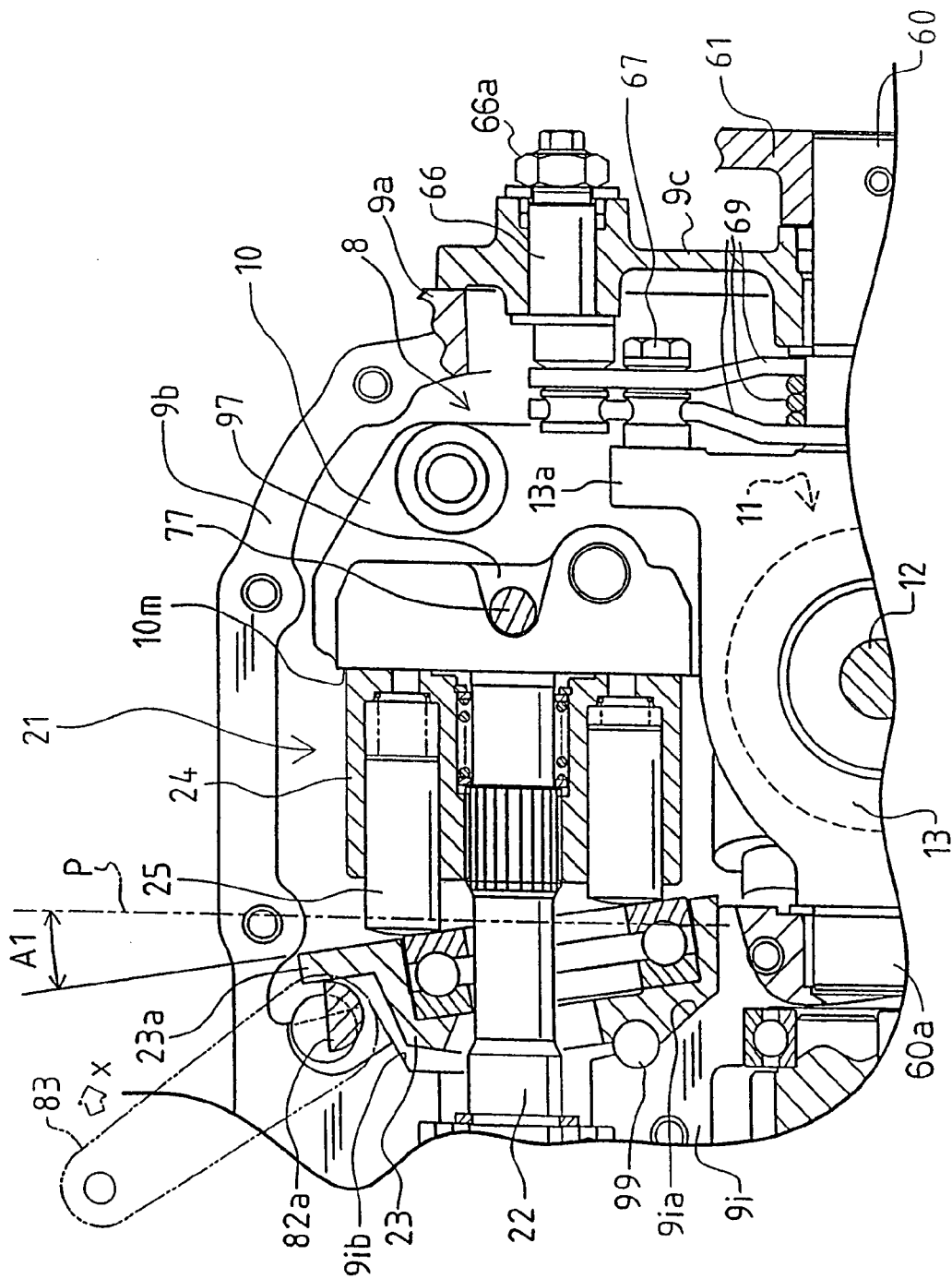
Figure 6:
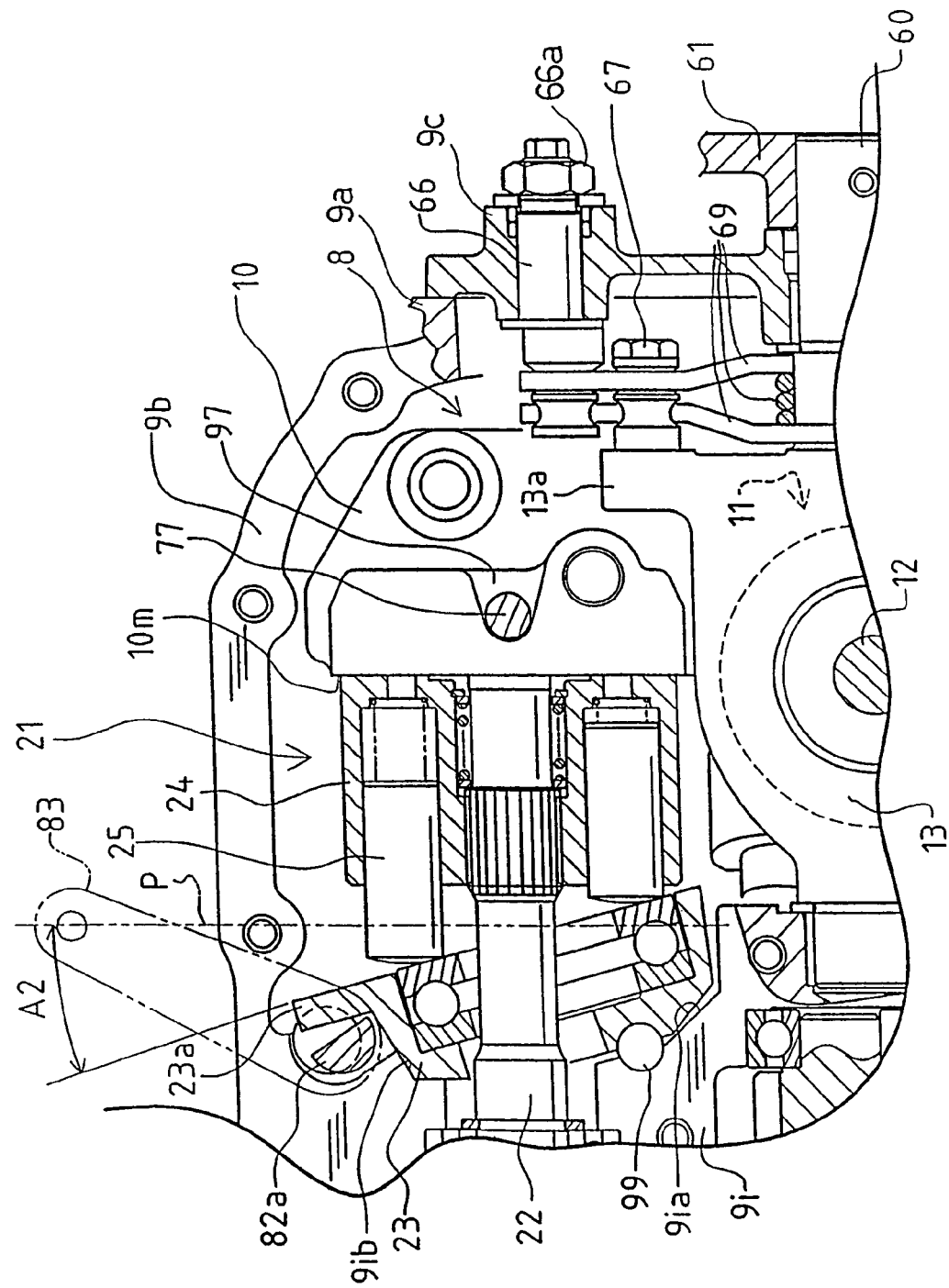
Figure 7:
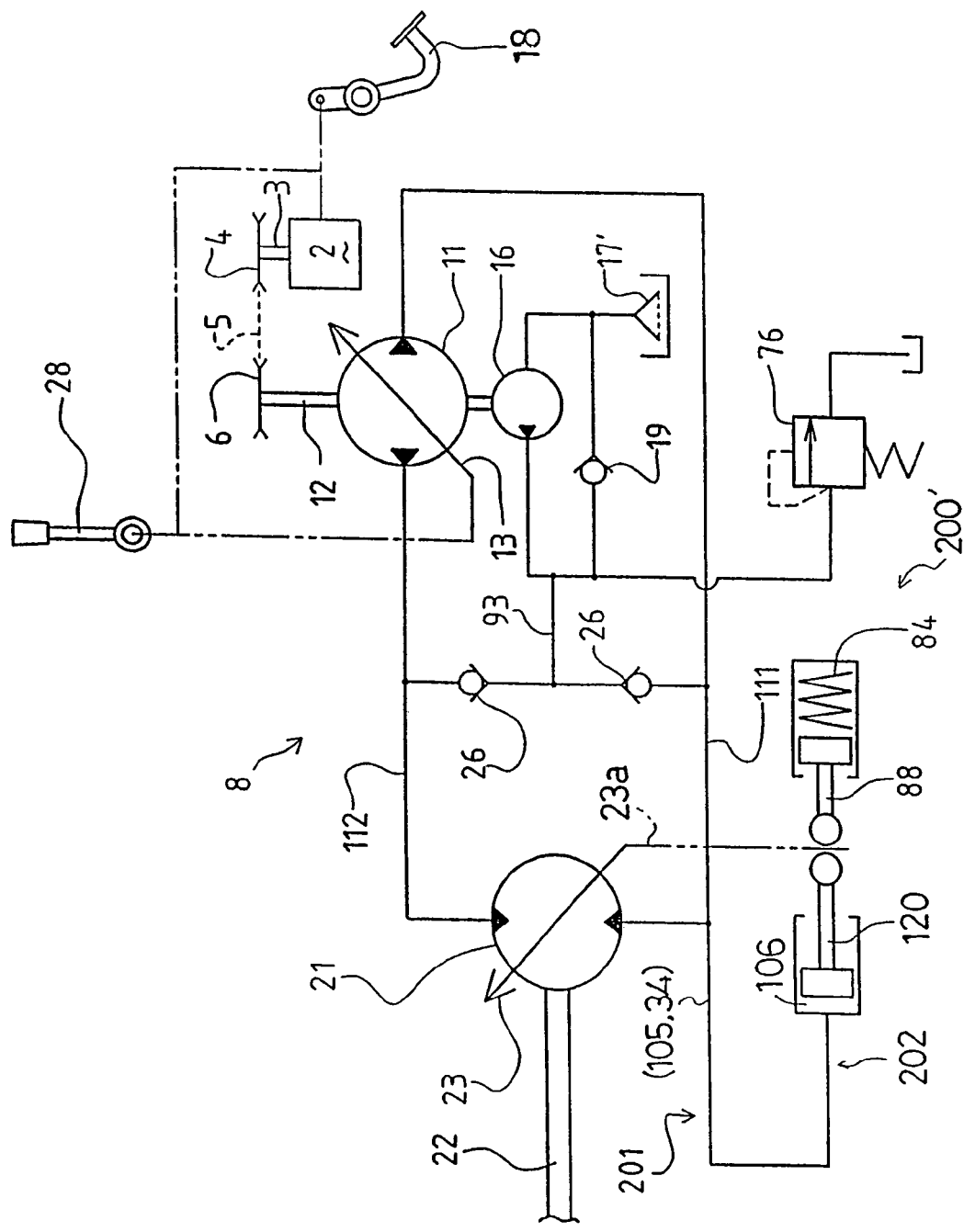
Figure 8:
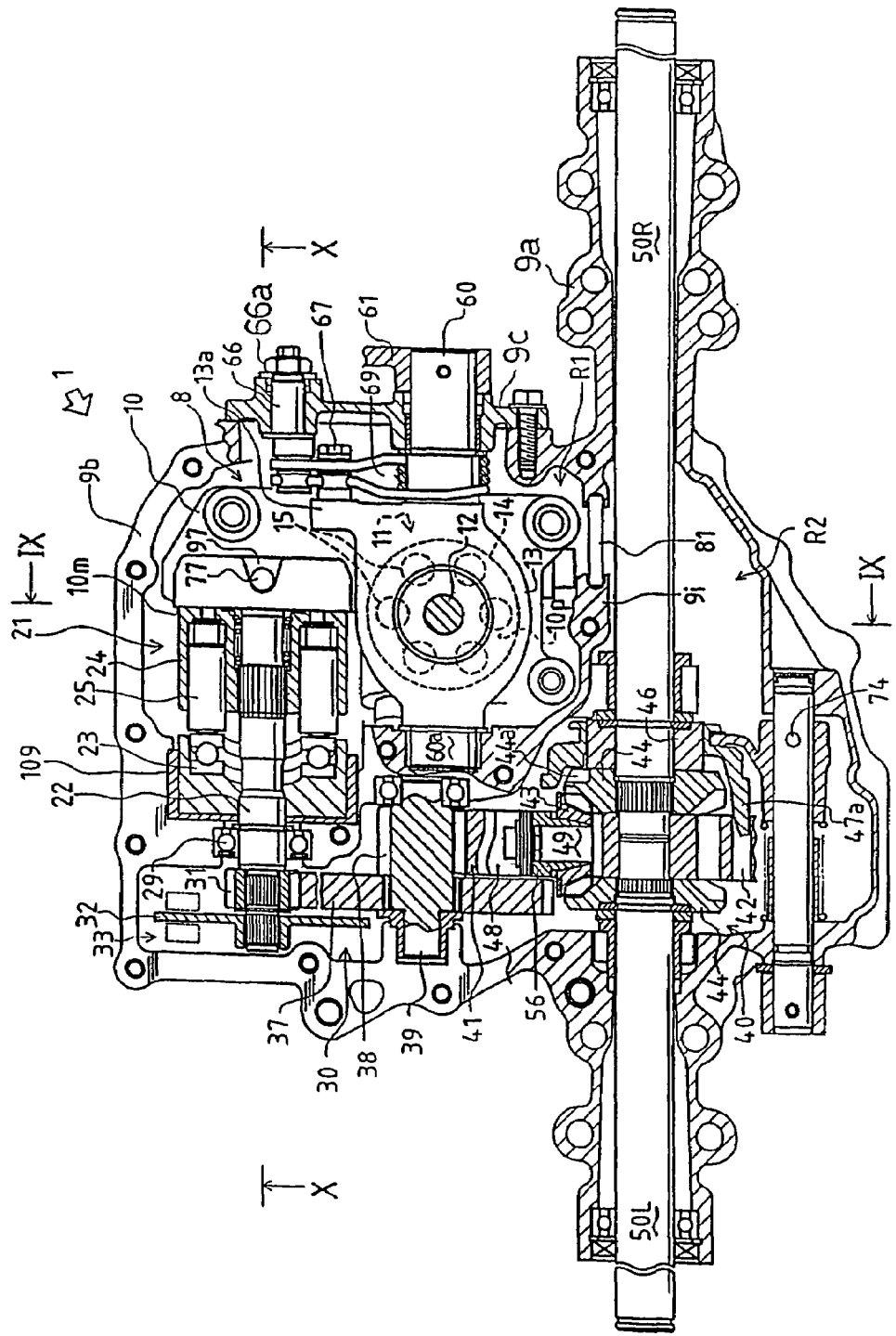
Figure 9:
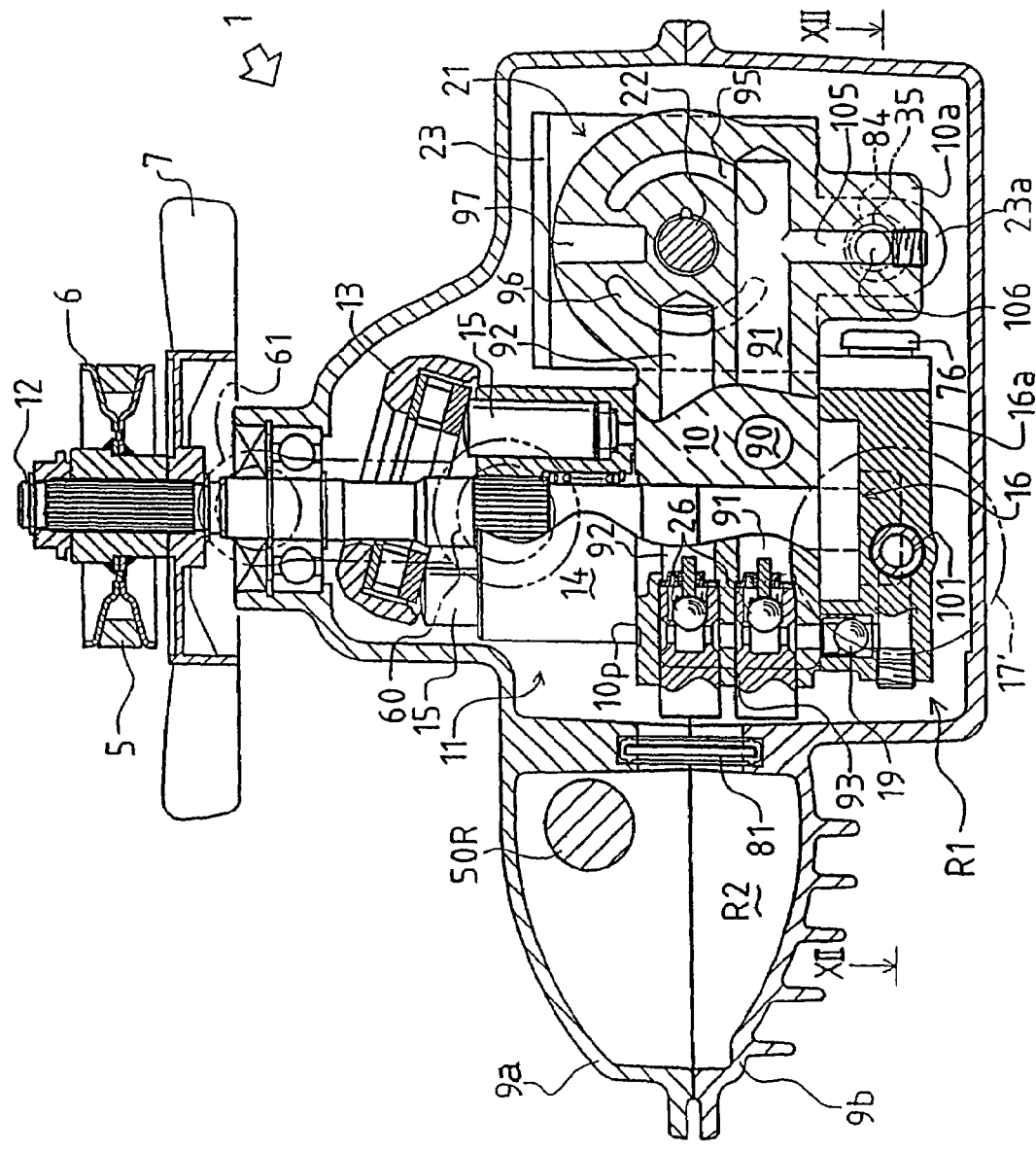
Figure 10:
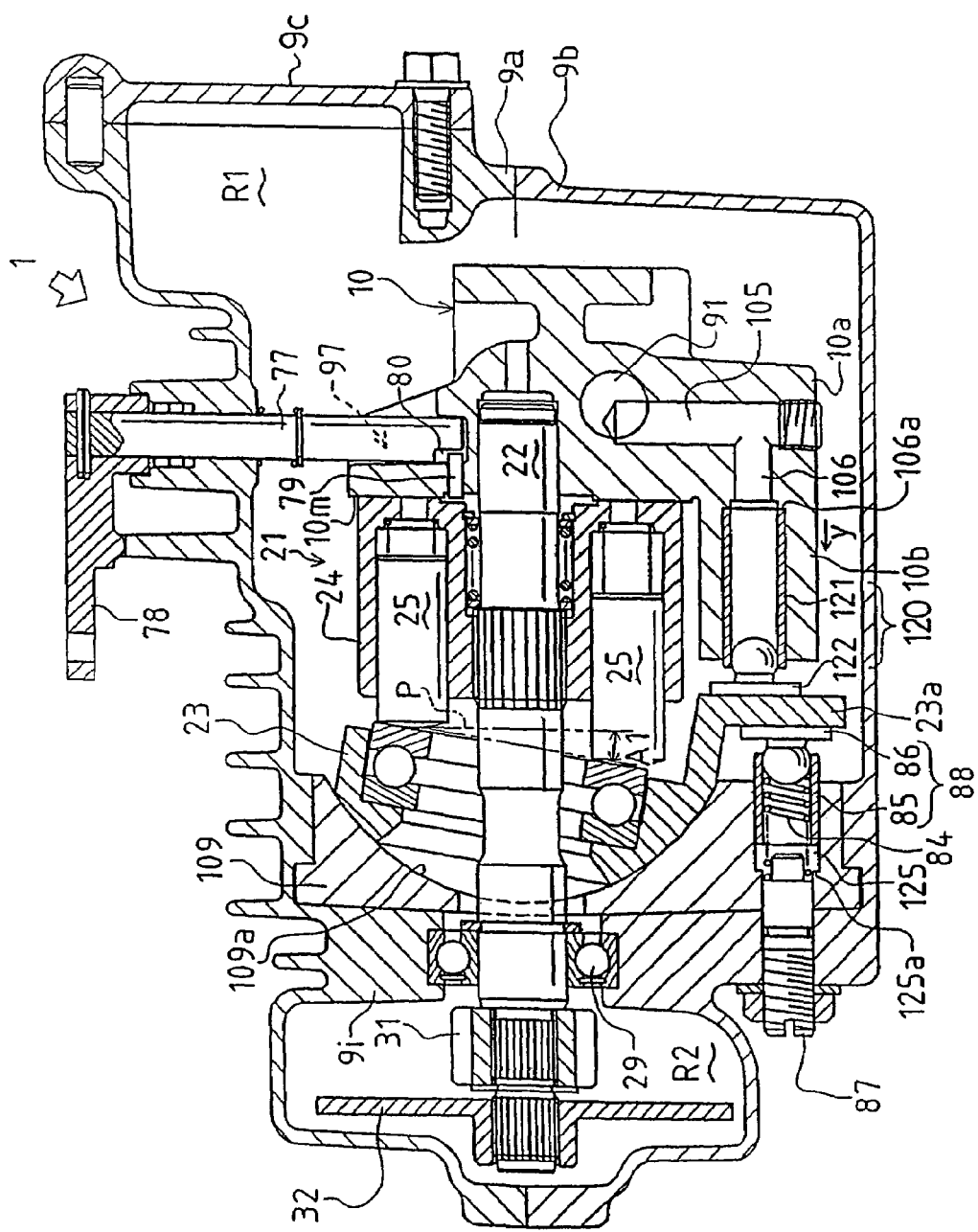
Figure 11:
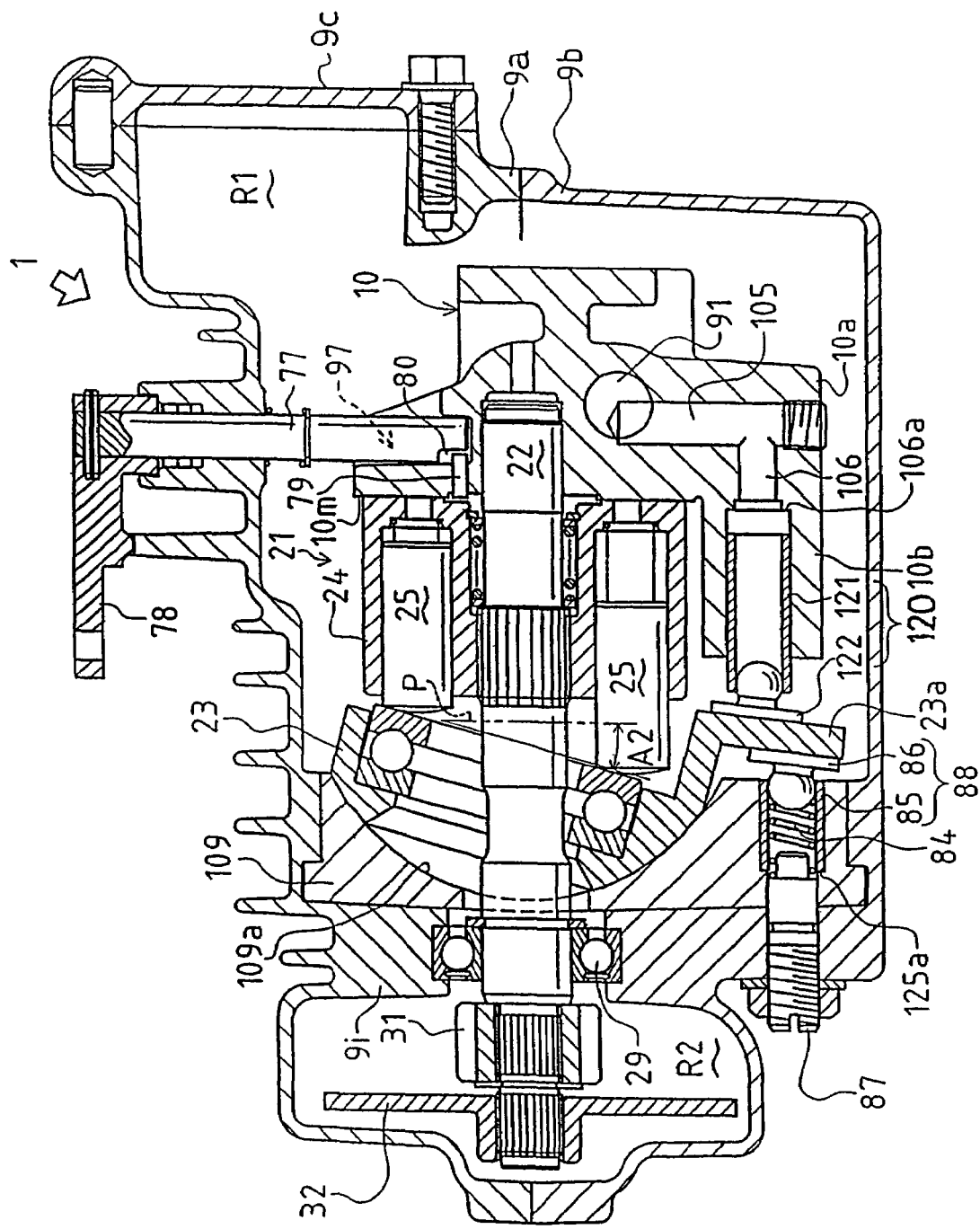
Figure 12:
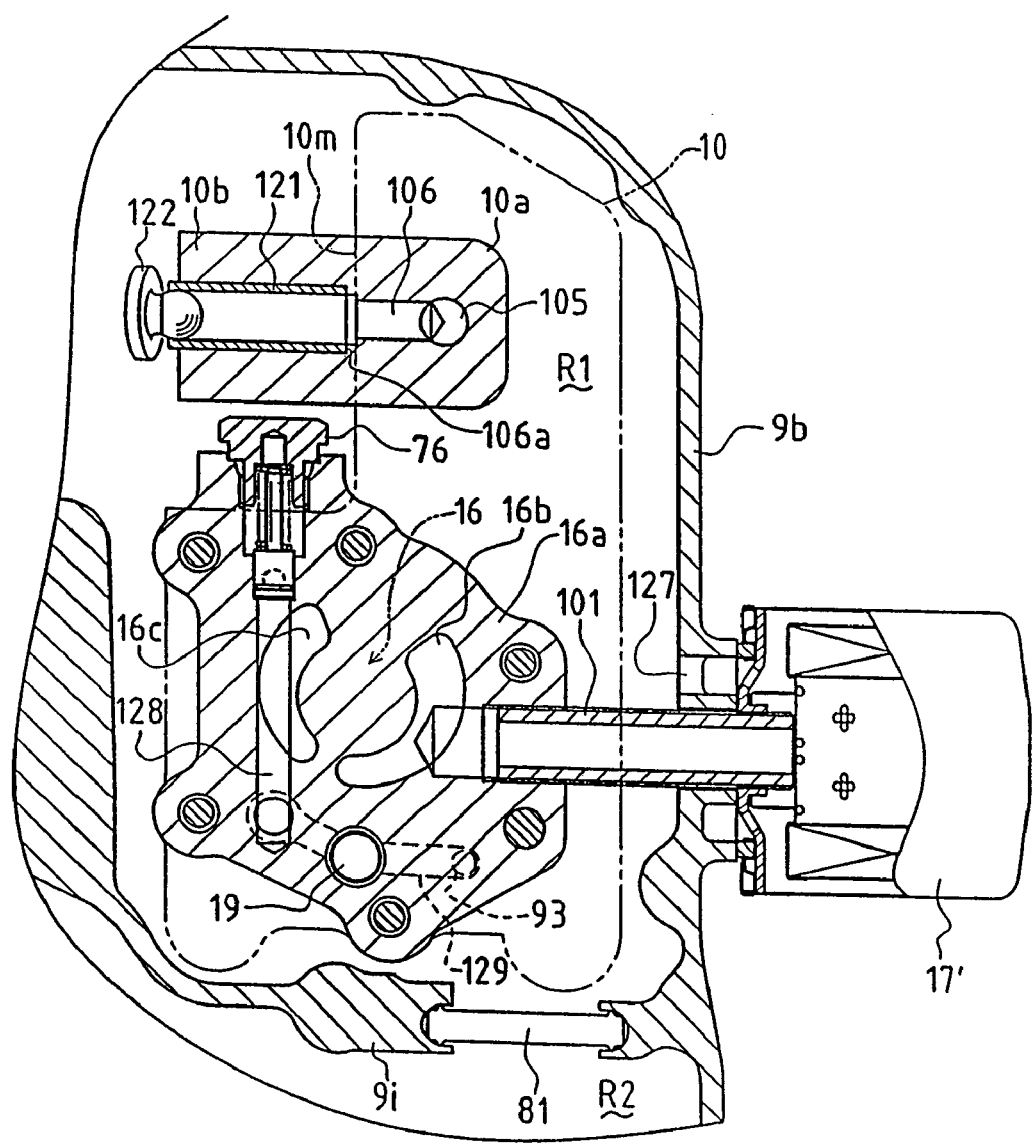
Figure 13:
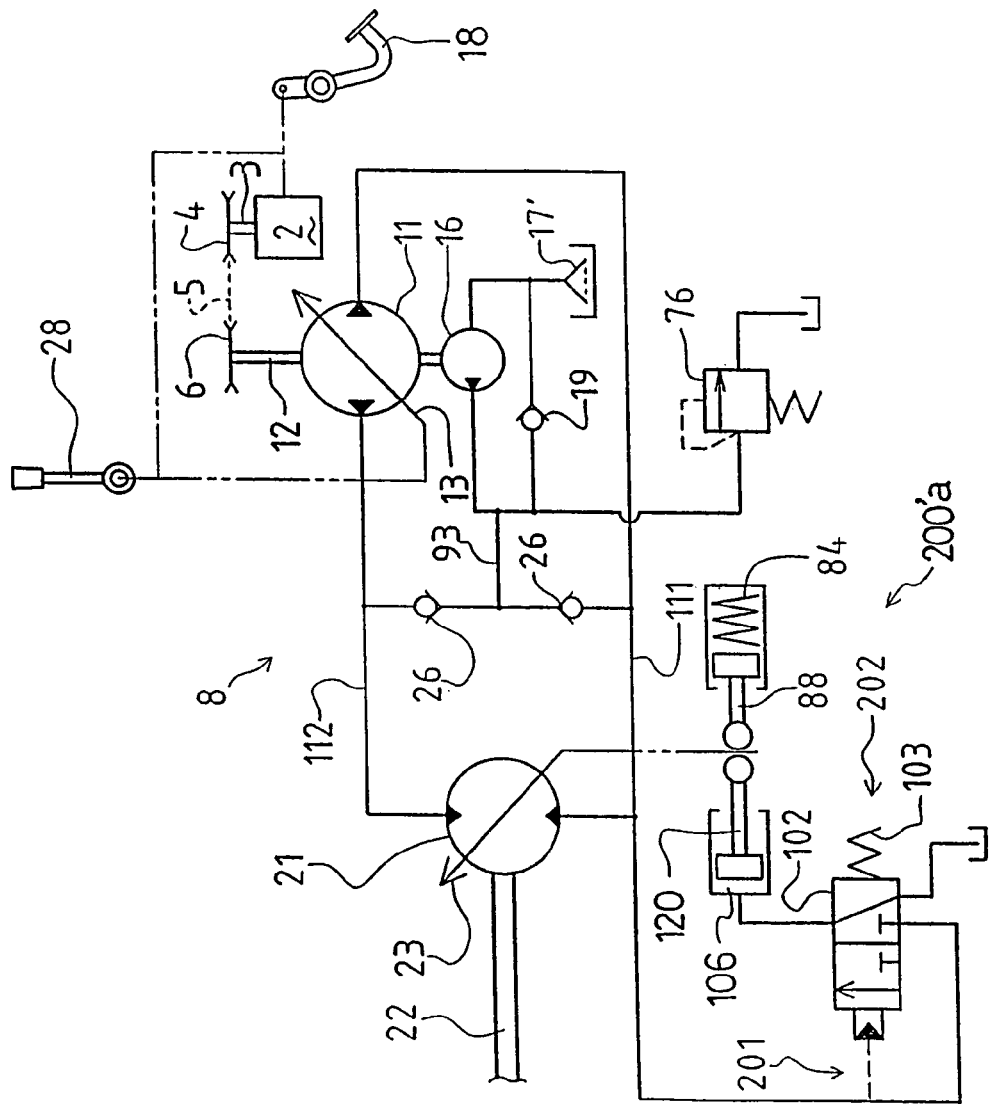
Figure 14:
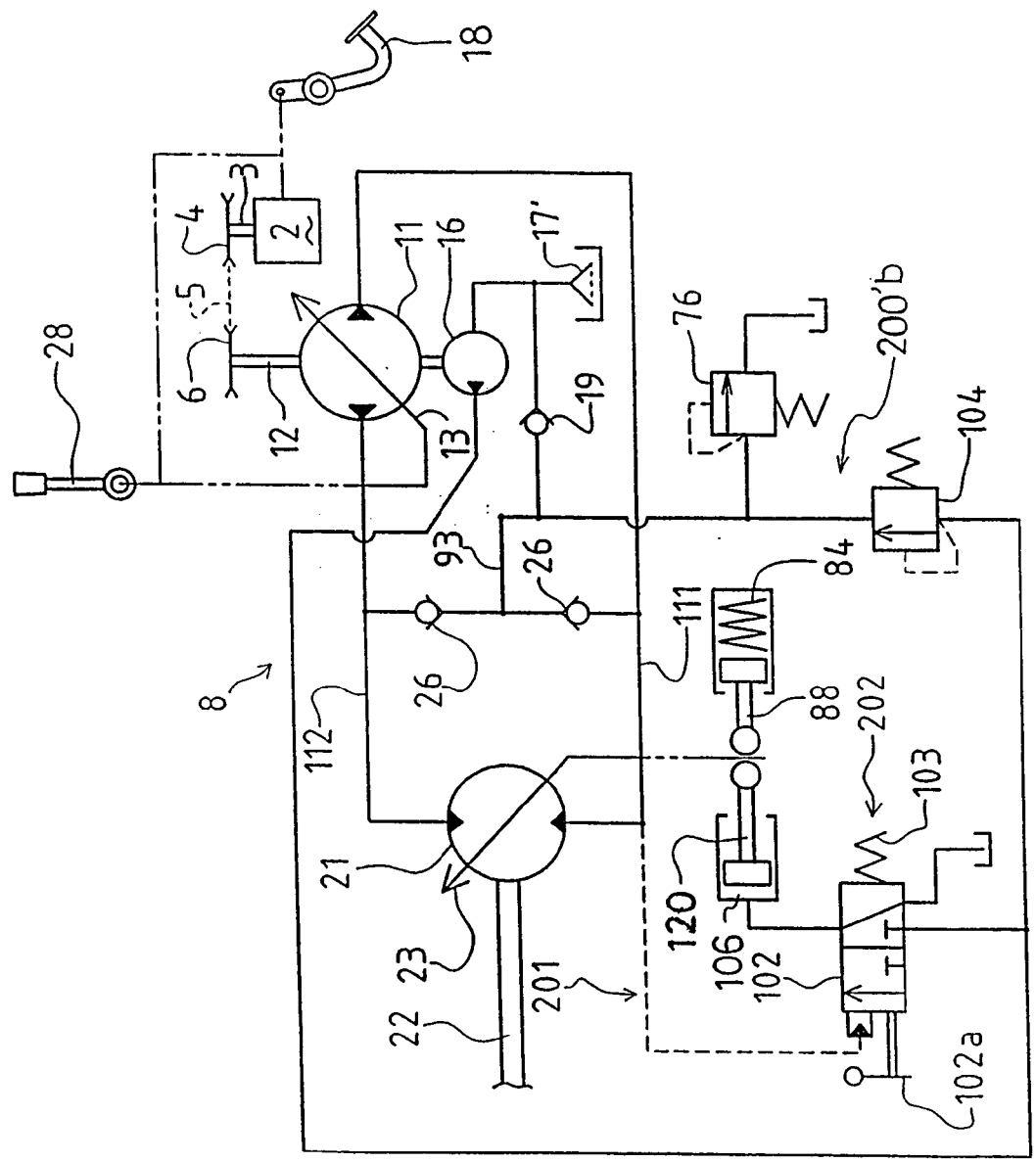
Figure 15:
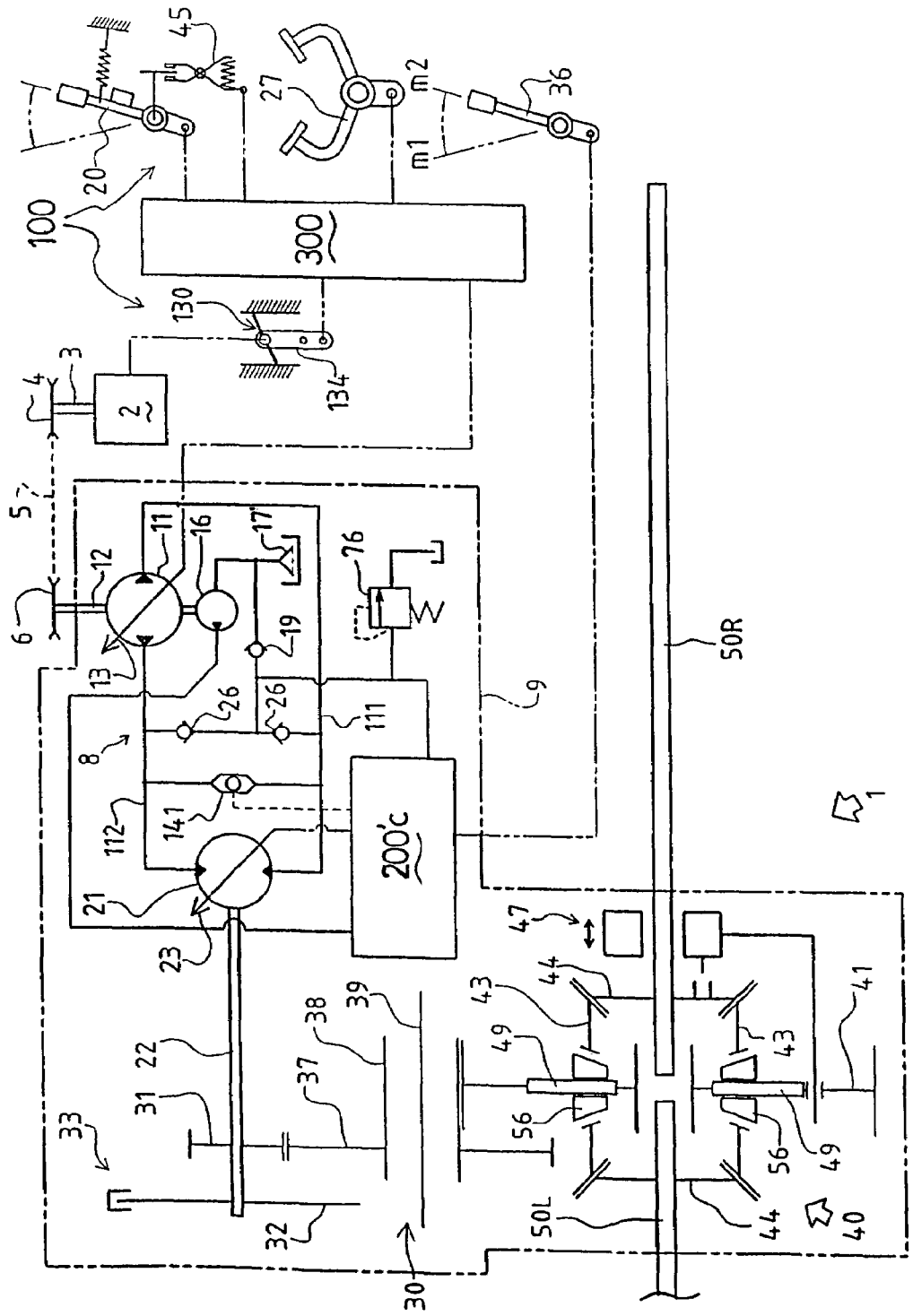
Figure 16:
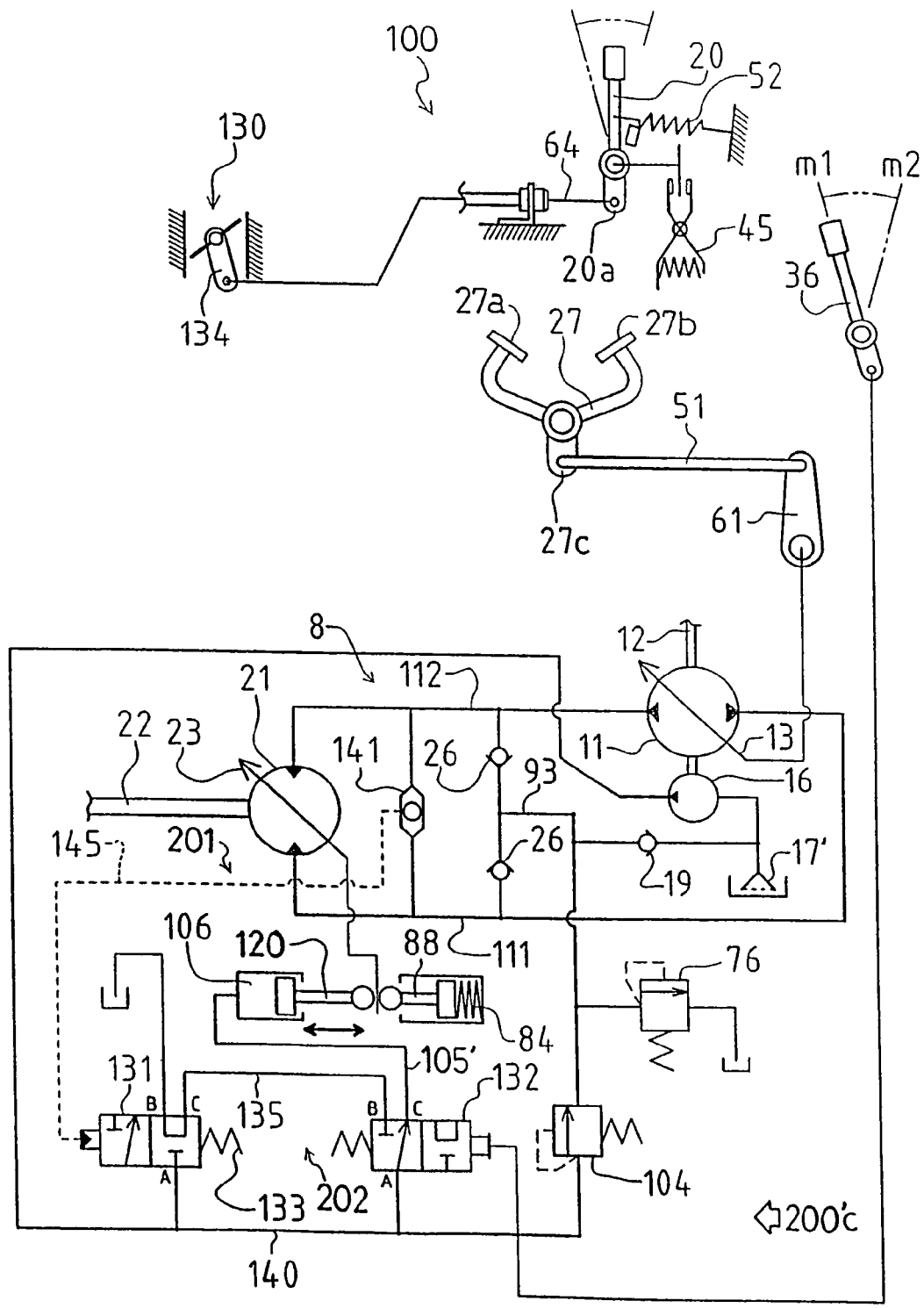
Figure 17:
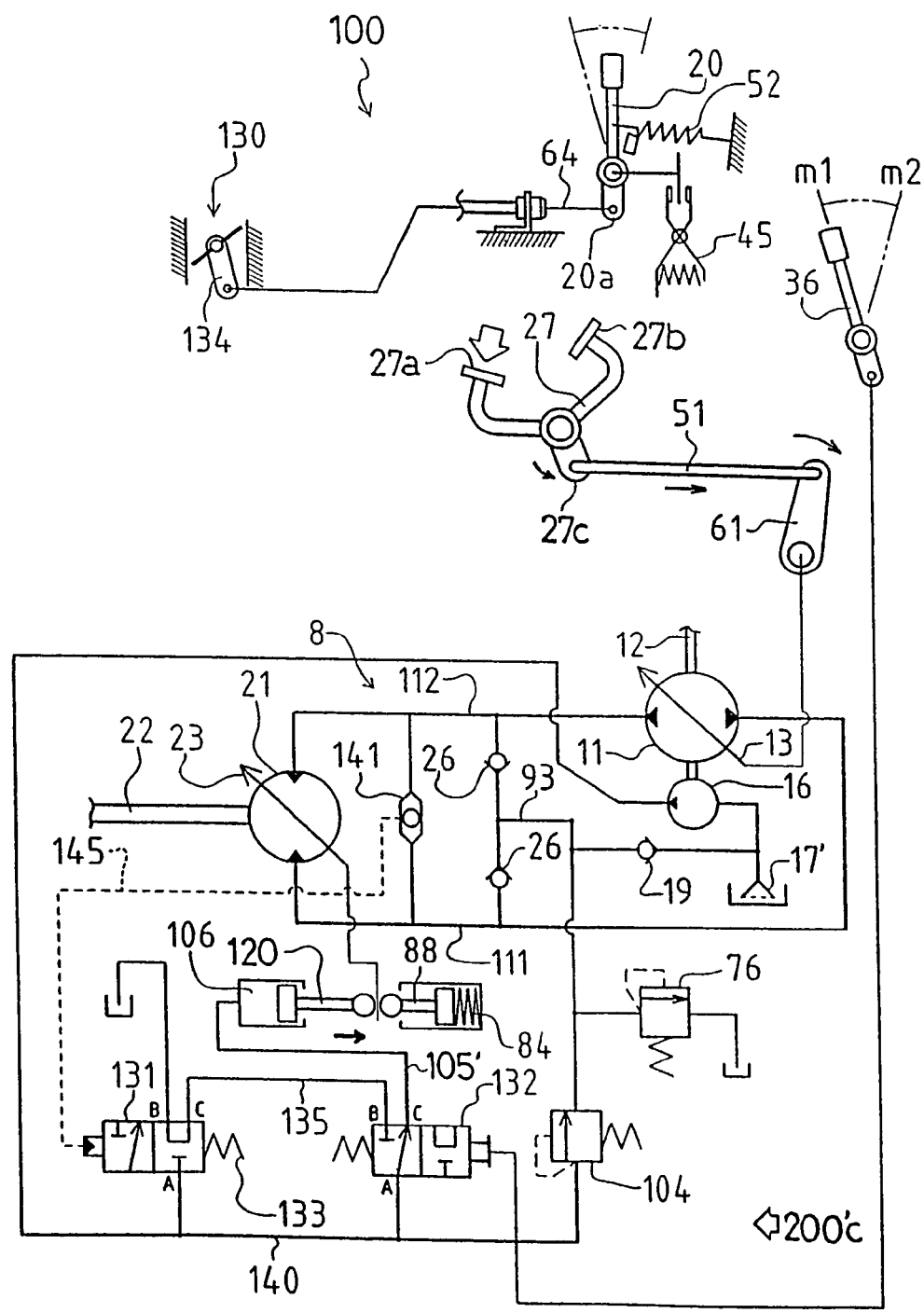
Figure 18:
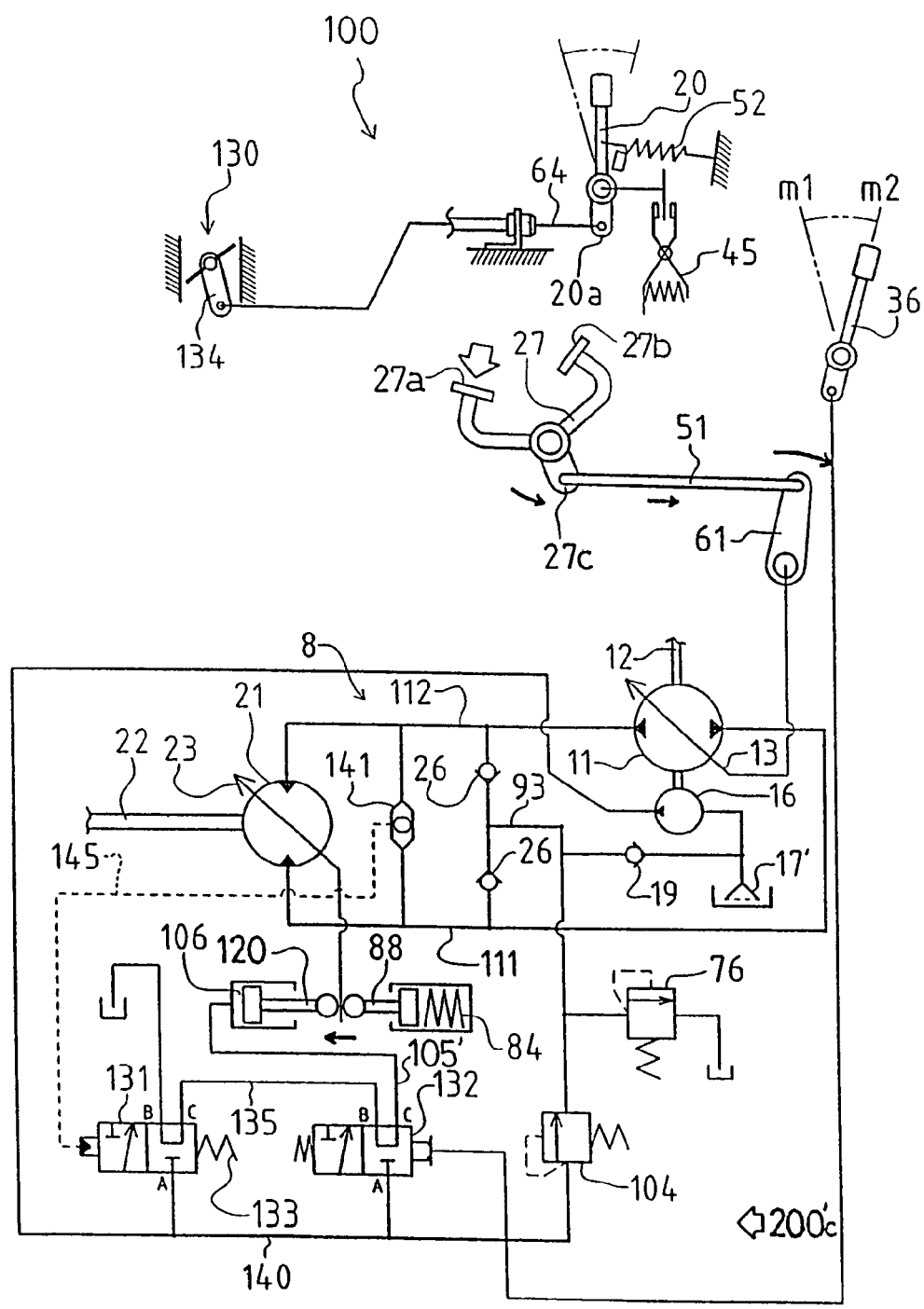
Figure 19:
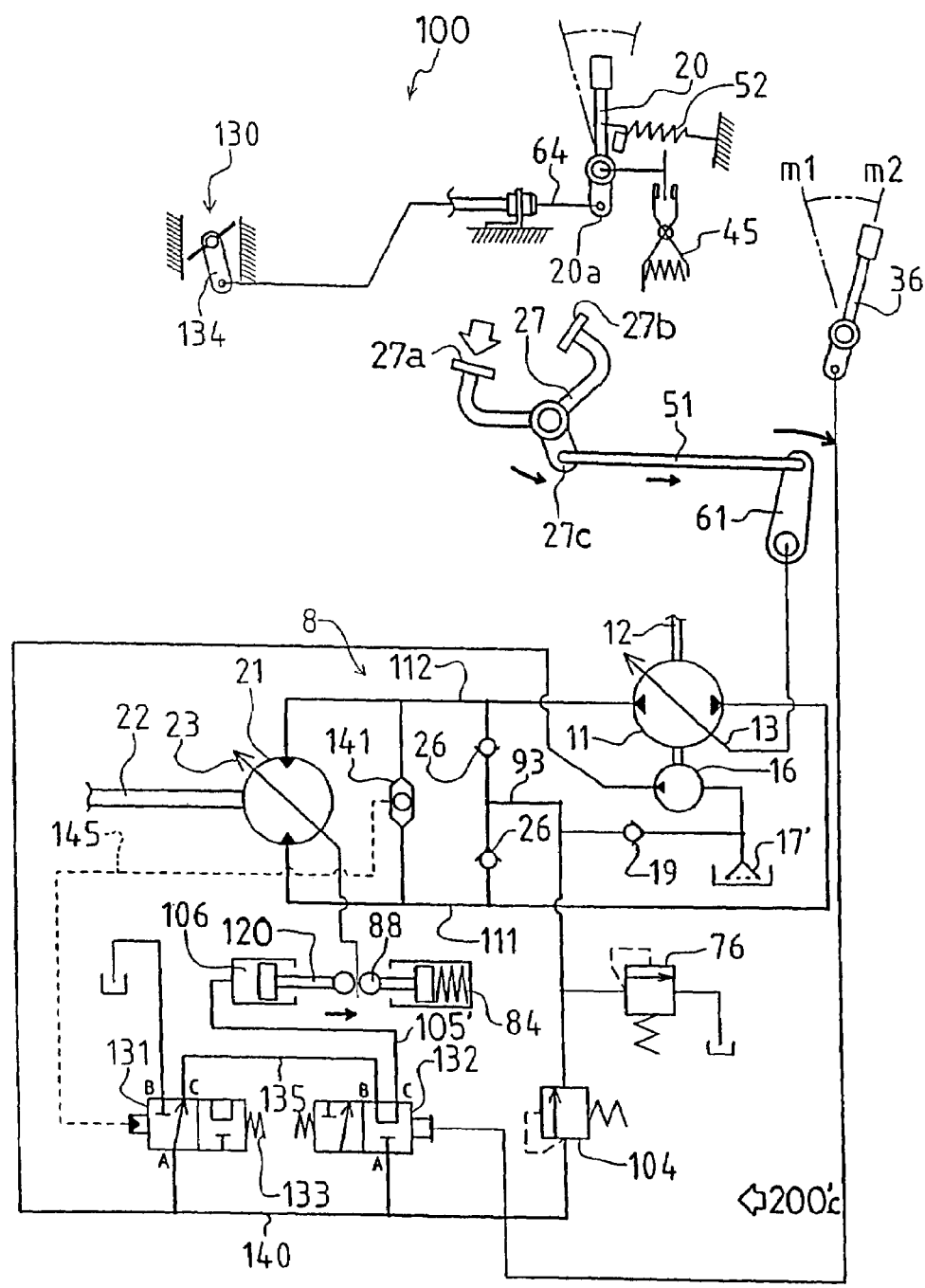
Figure 20:
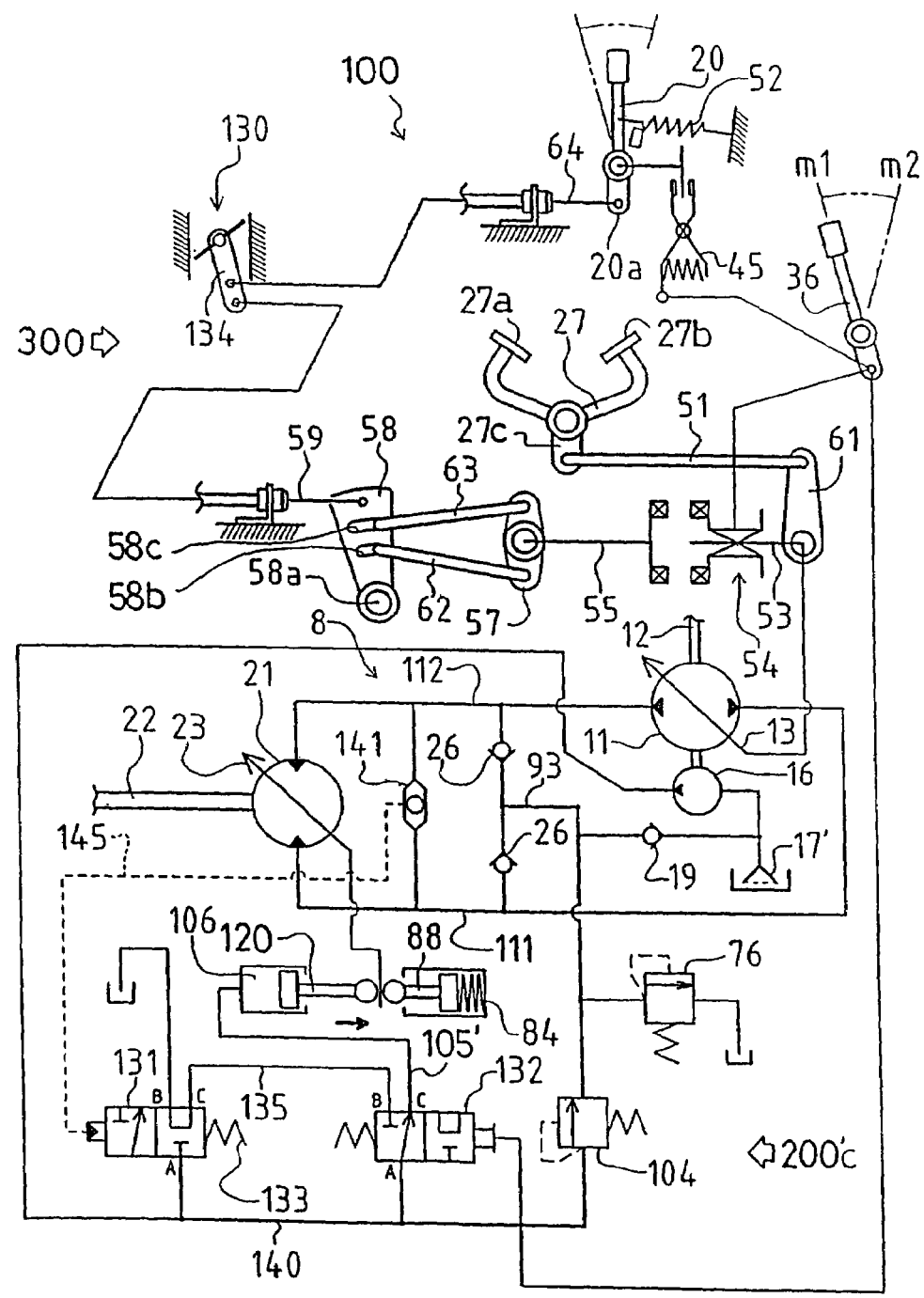
Figure 21:
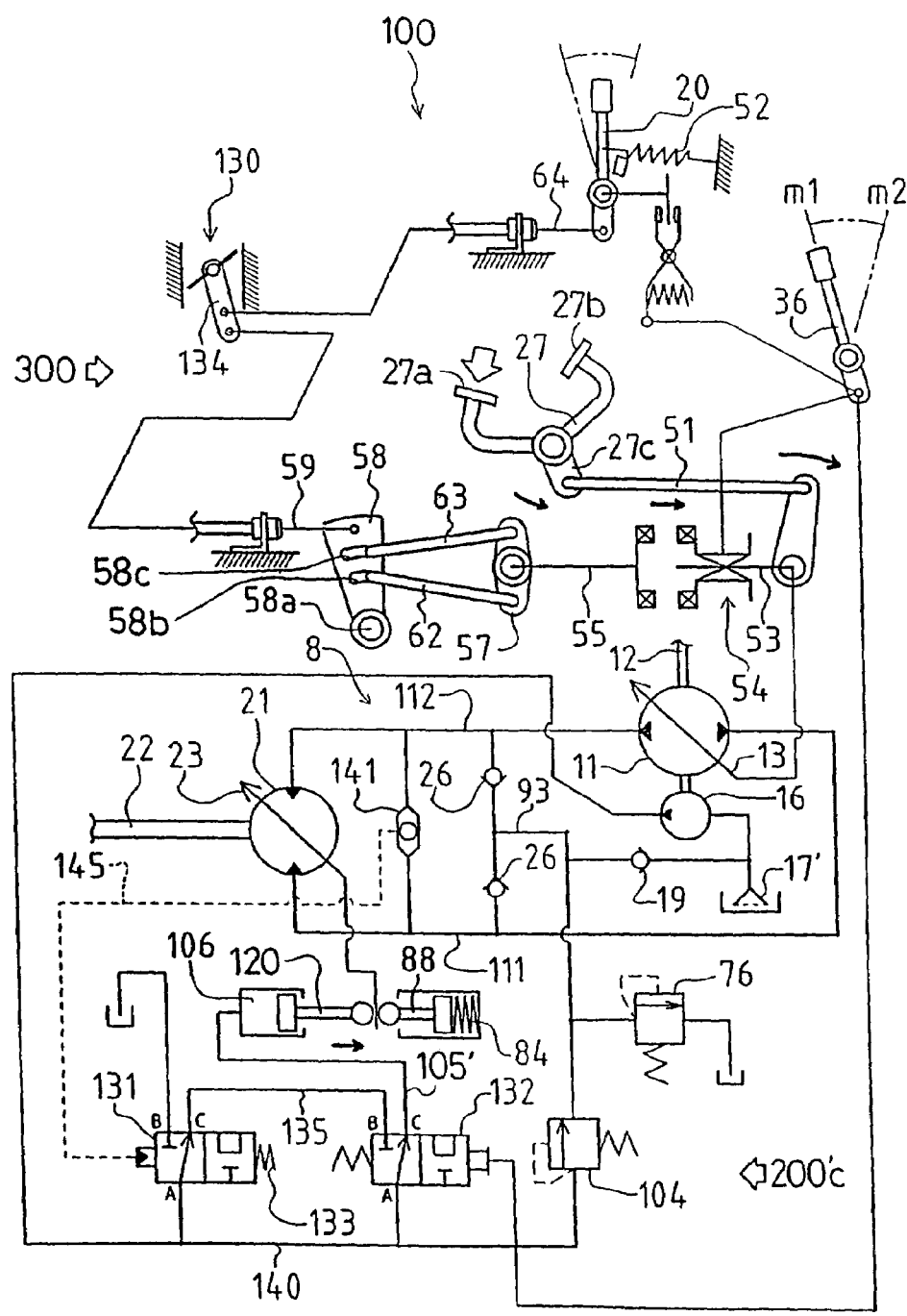
Figure 22:
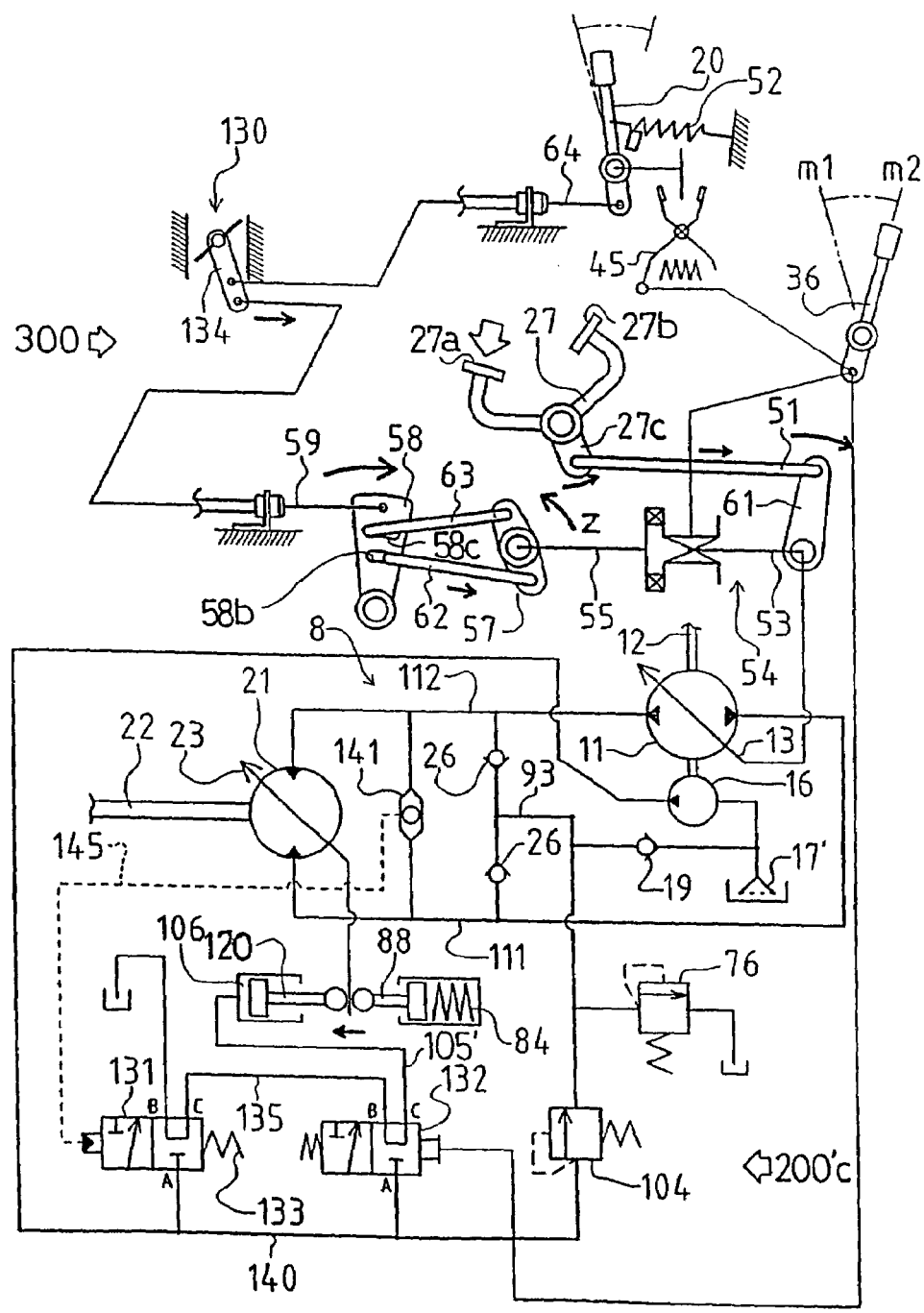
Figure 23:
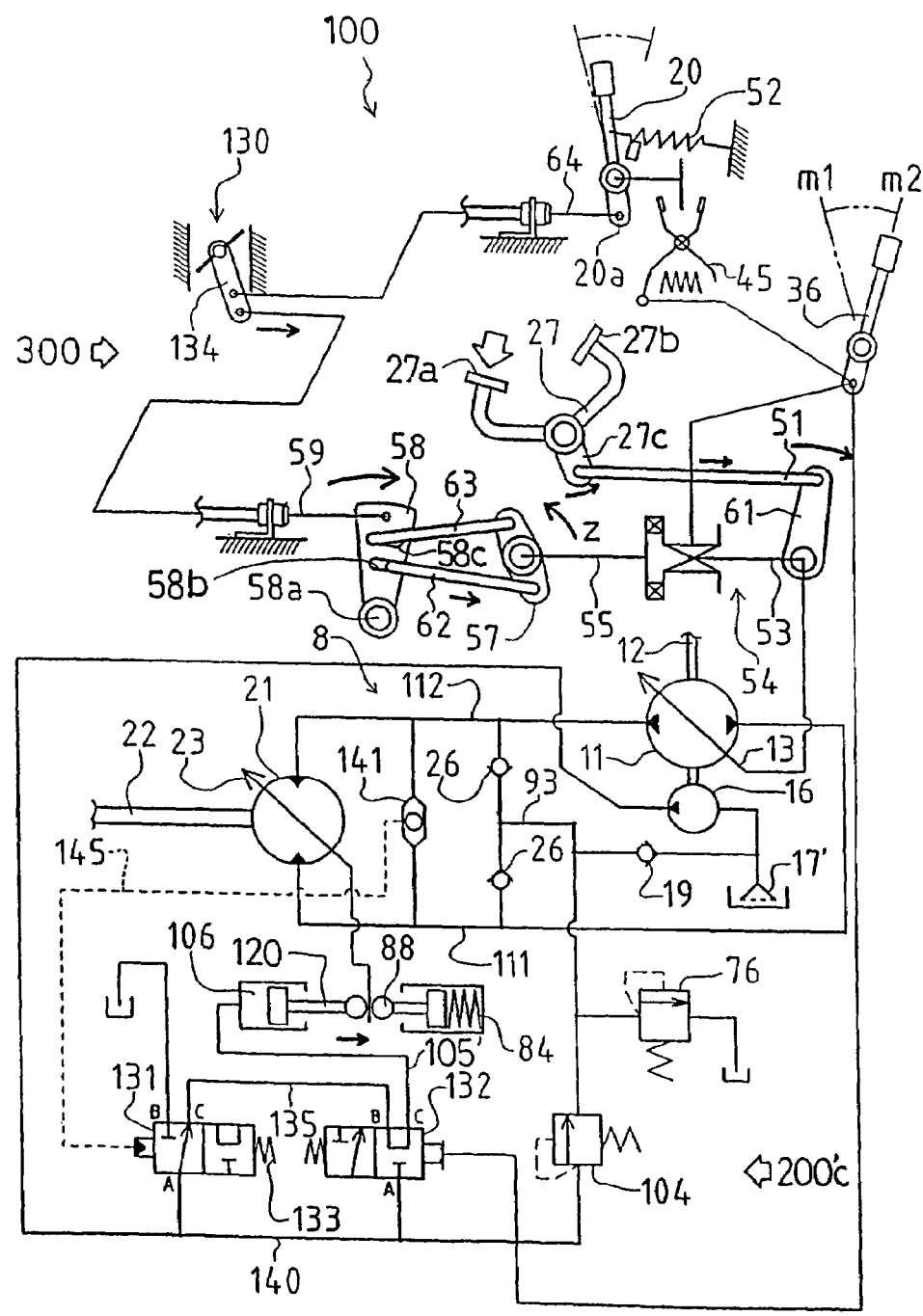
Figure 24:
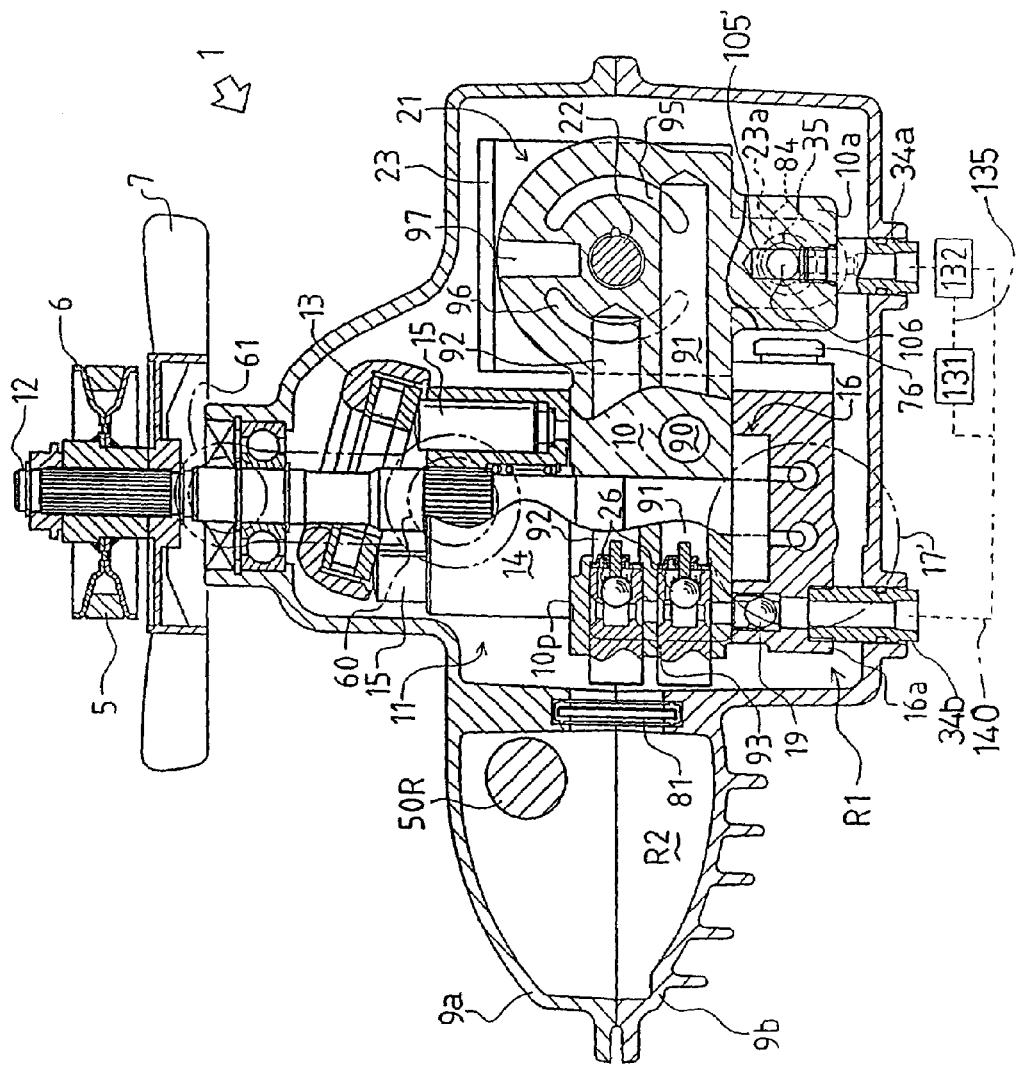
Figure 25:
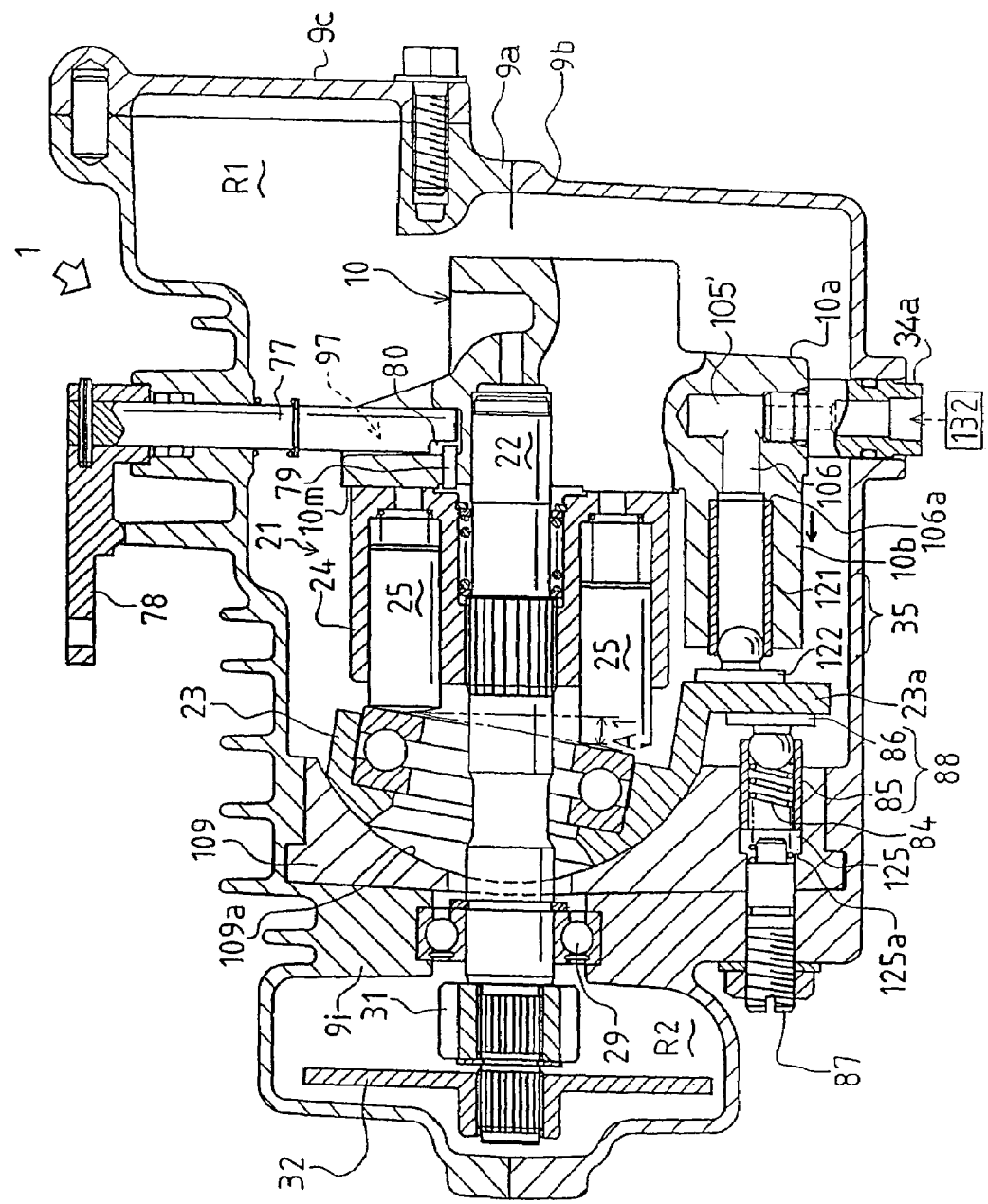
Figure 26:
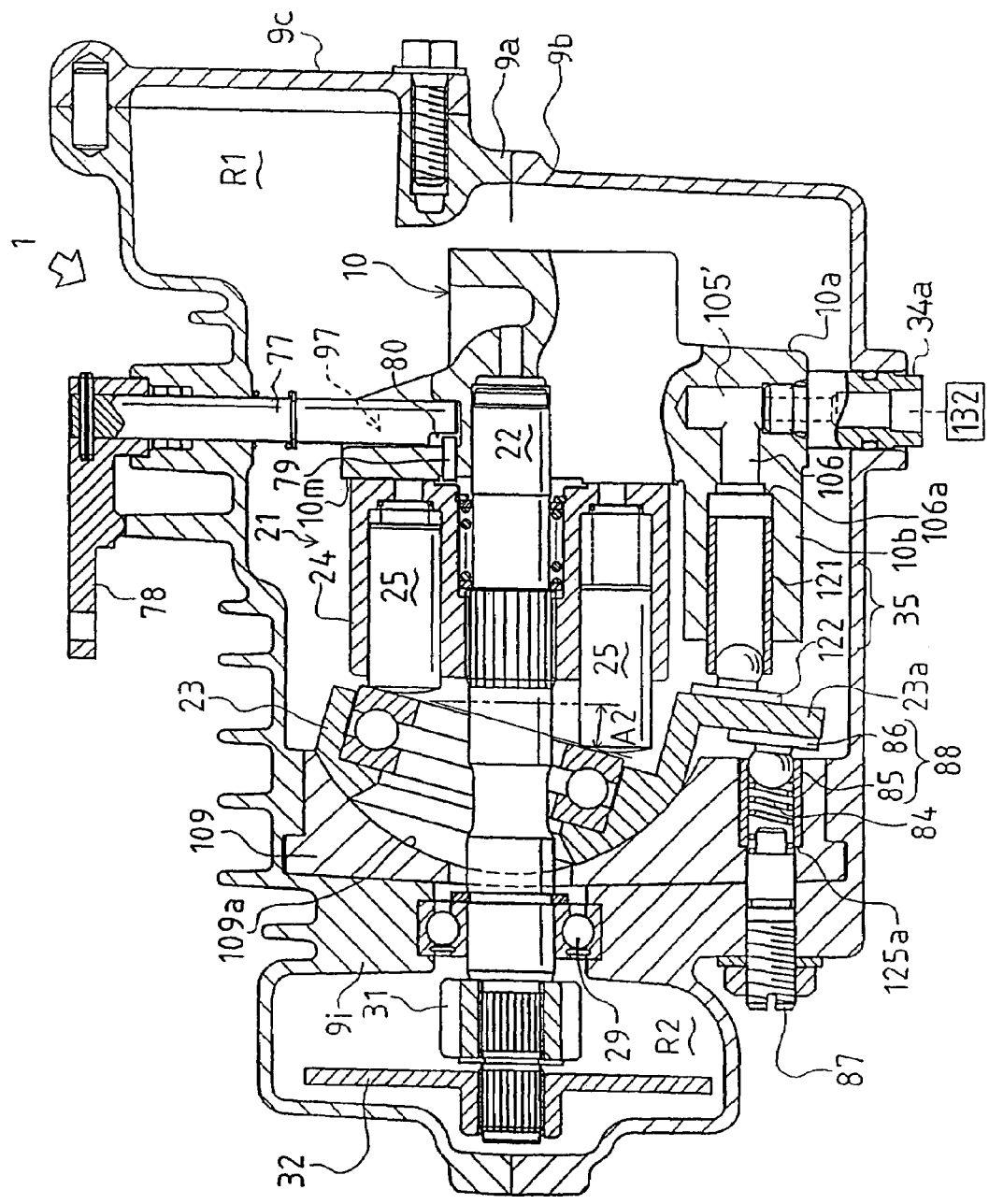
Figure 27:
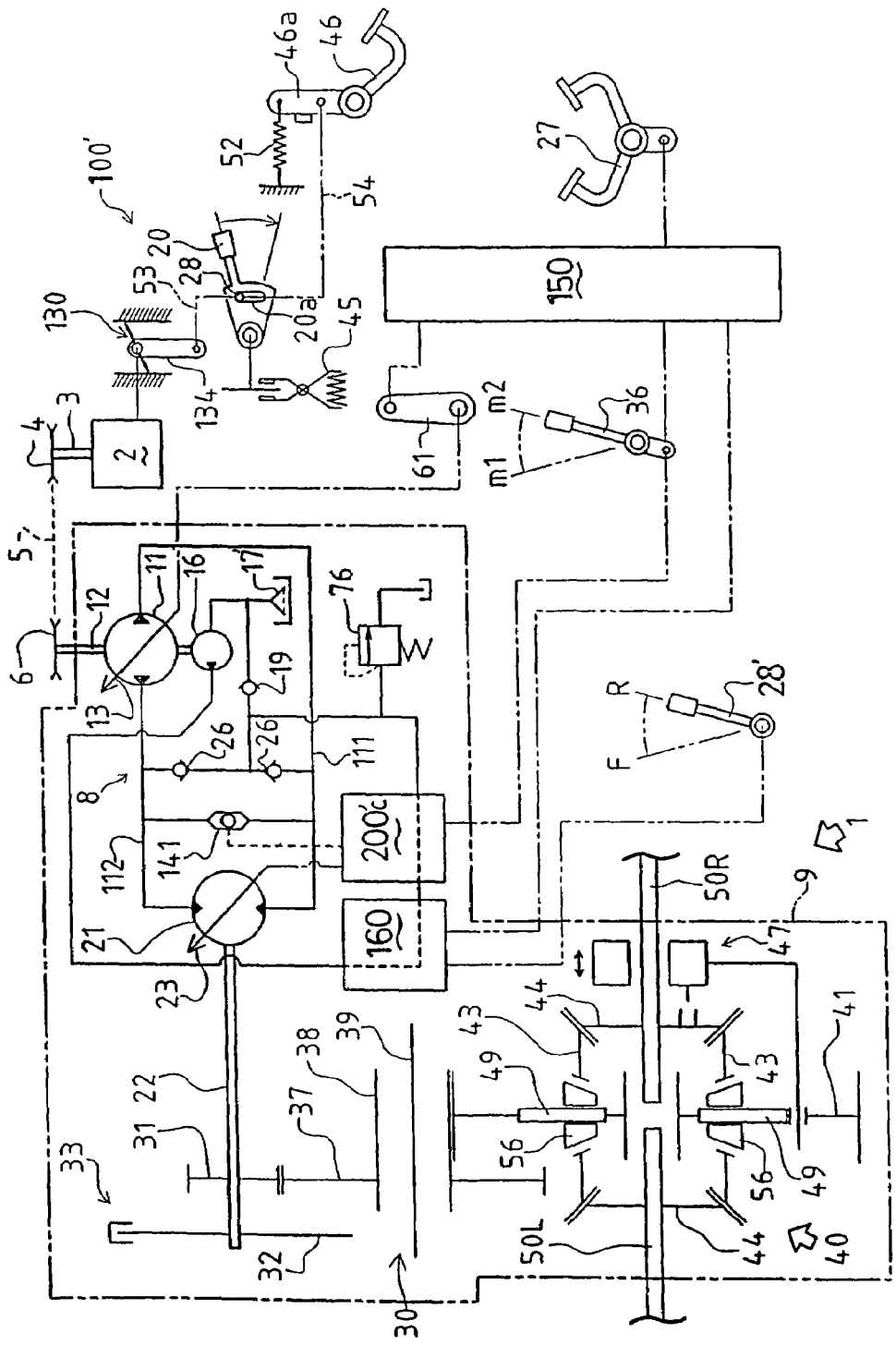
Figure 28:
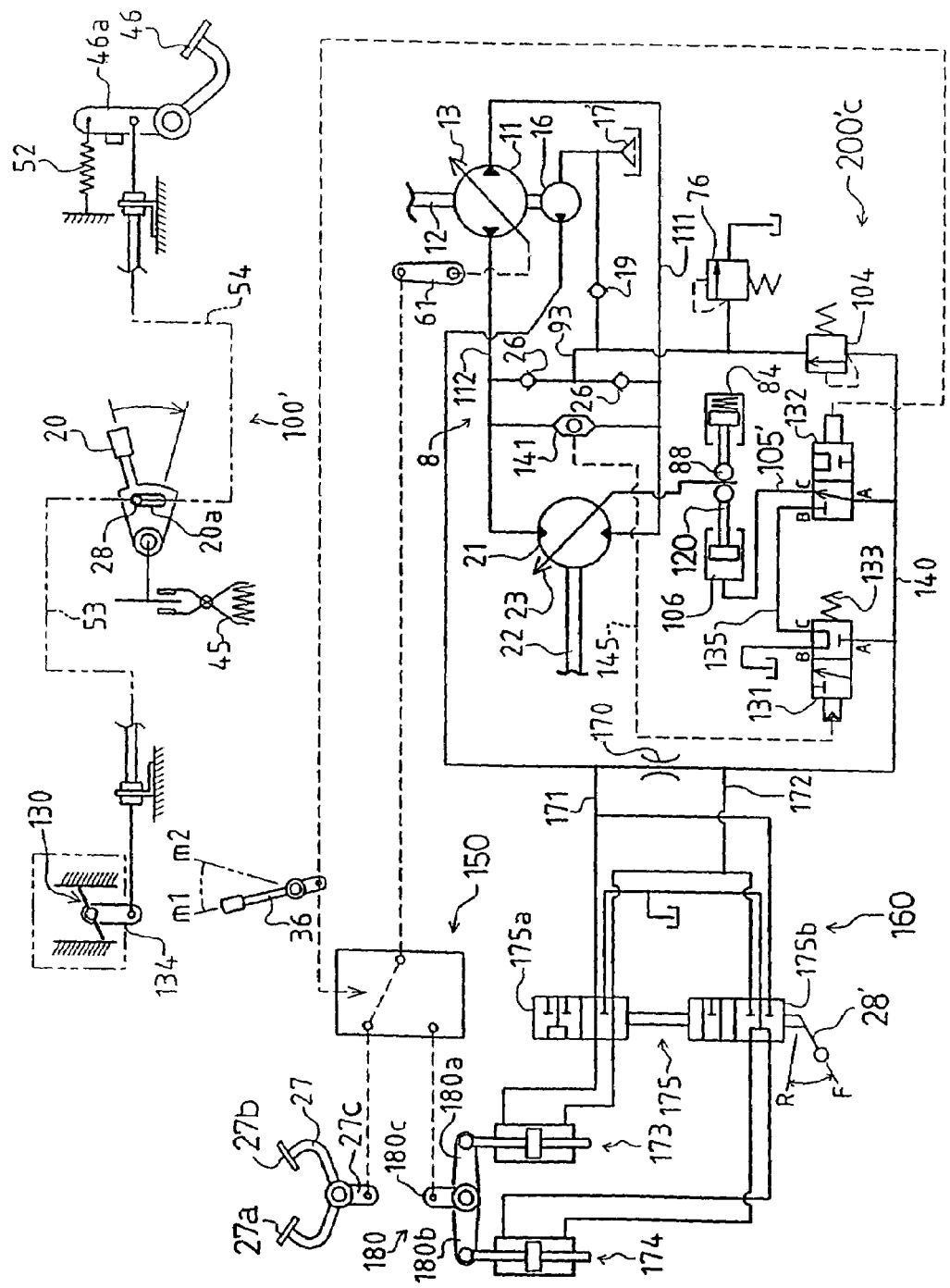
Figure 29:
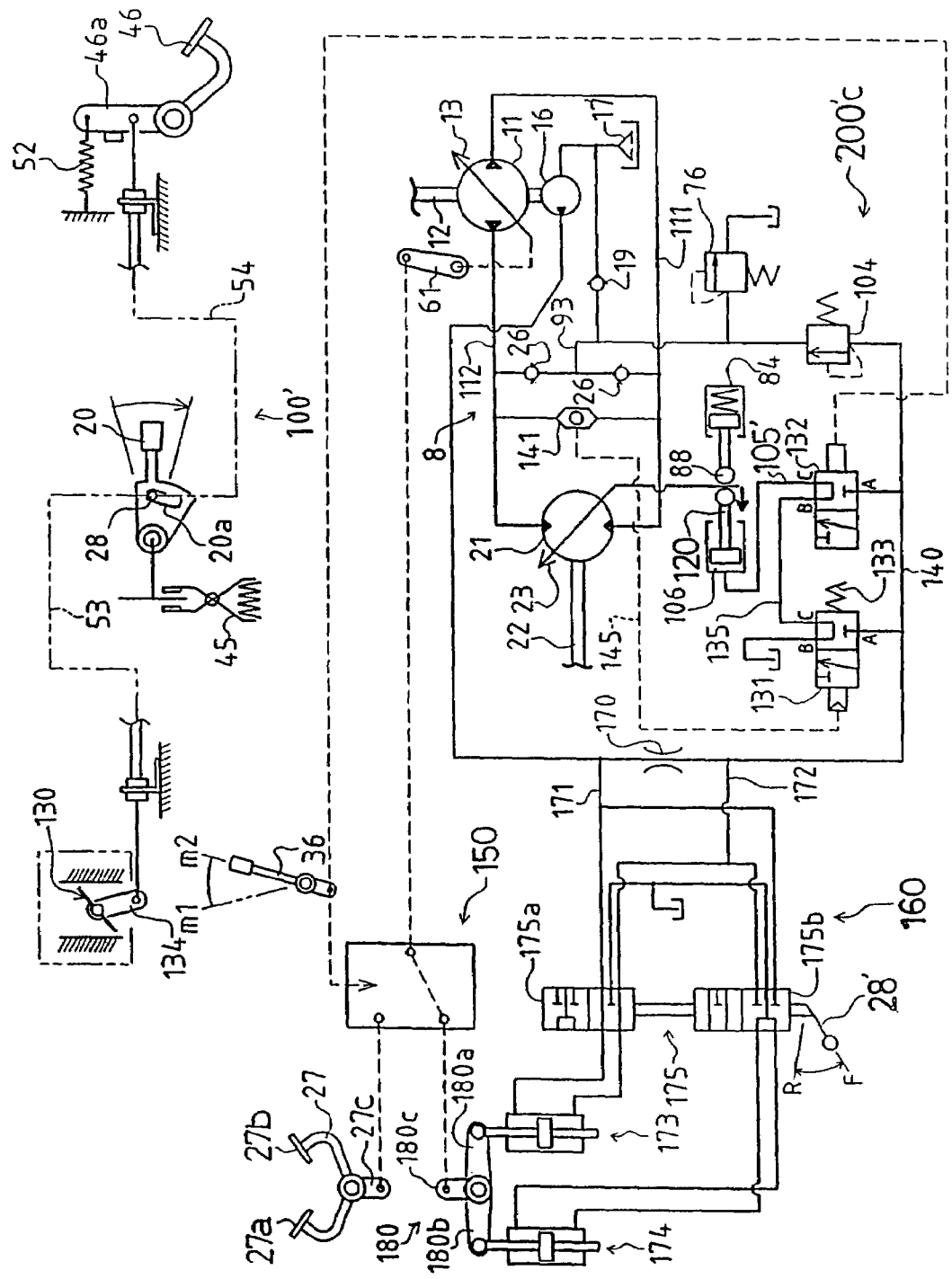
Figure 30:
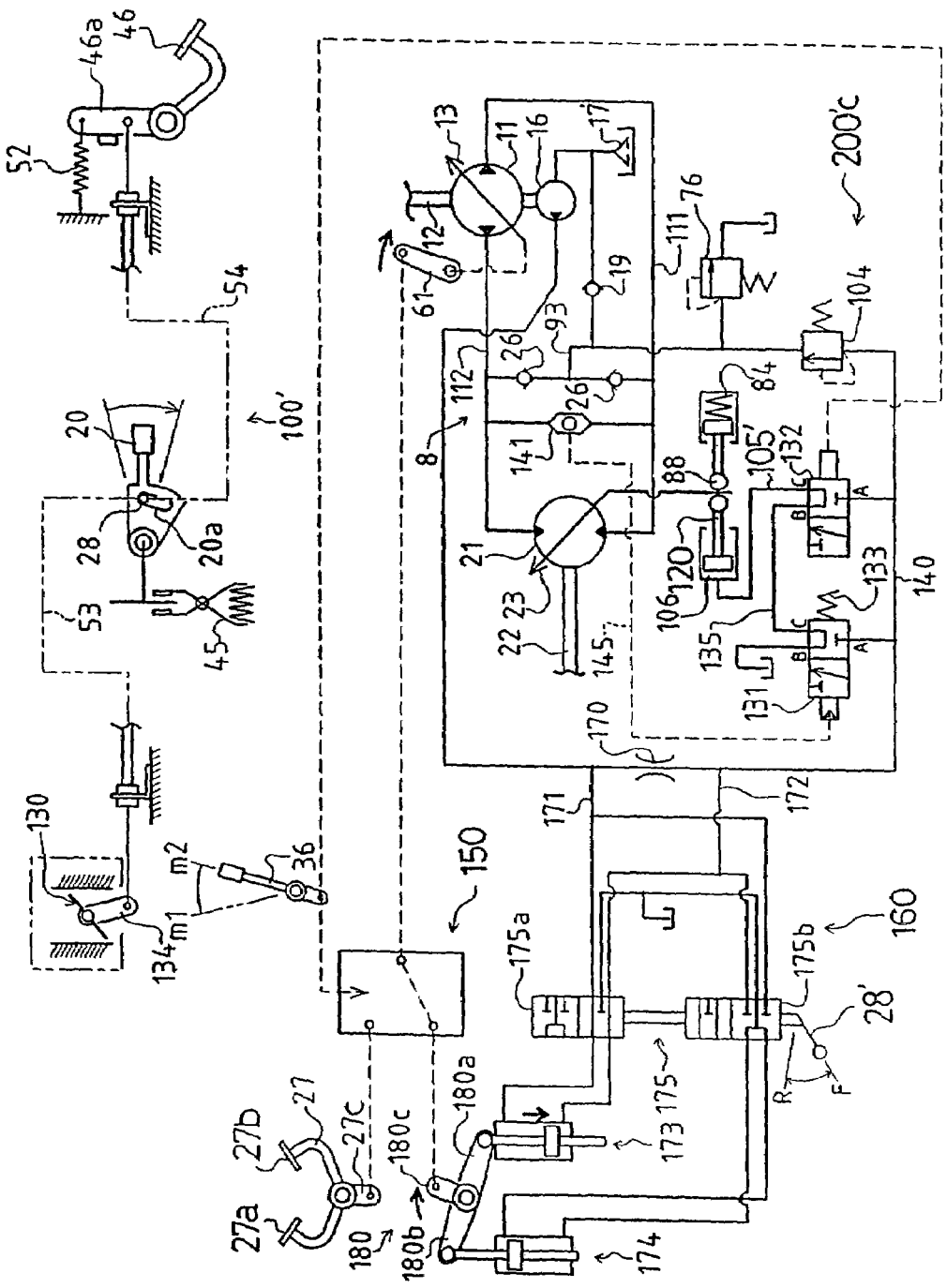
Figure 31:
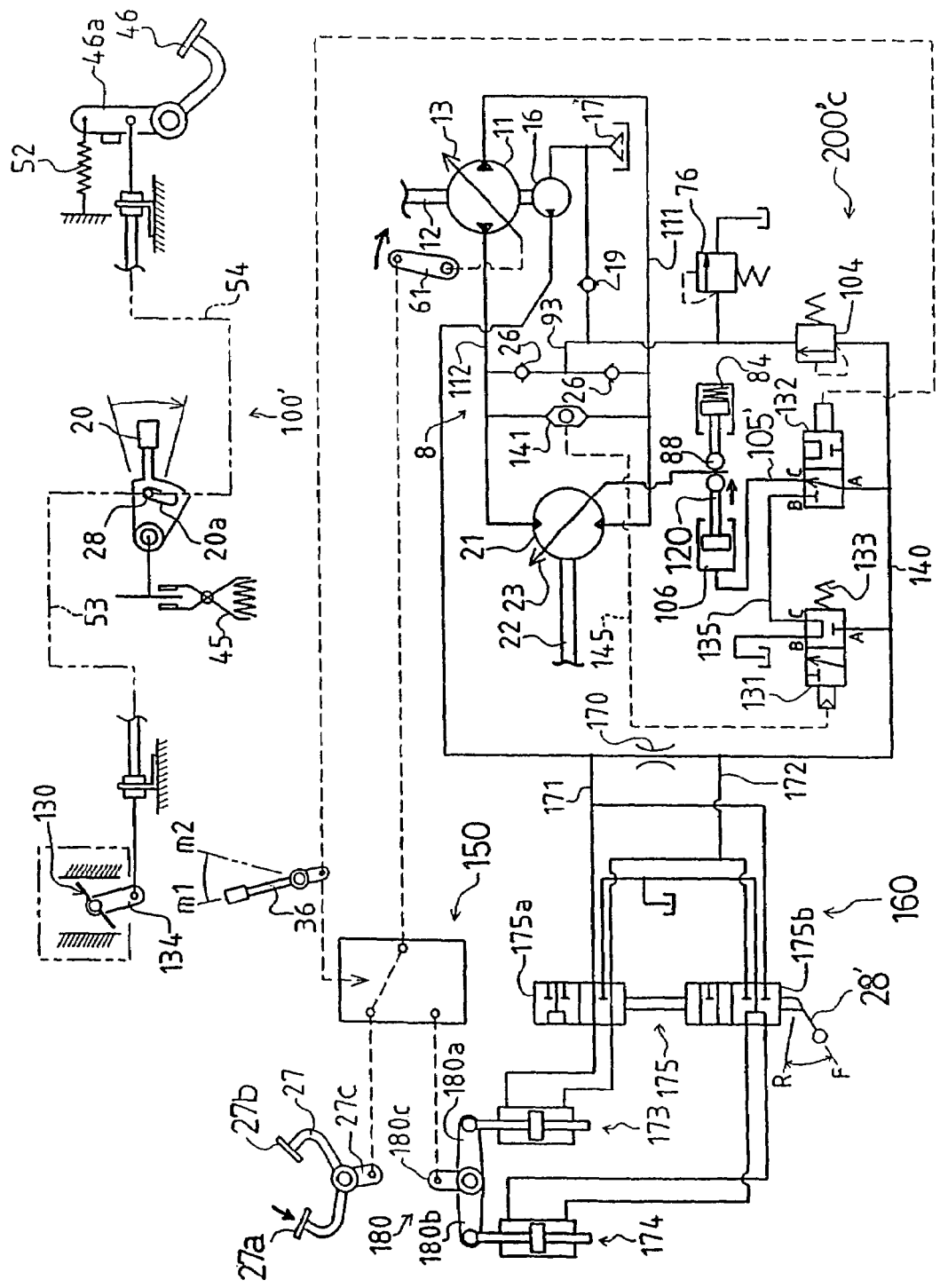
Figure 32:
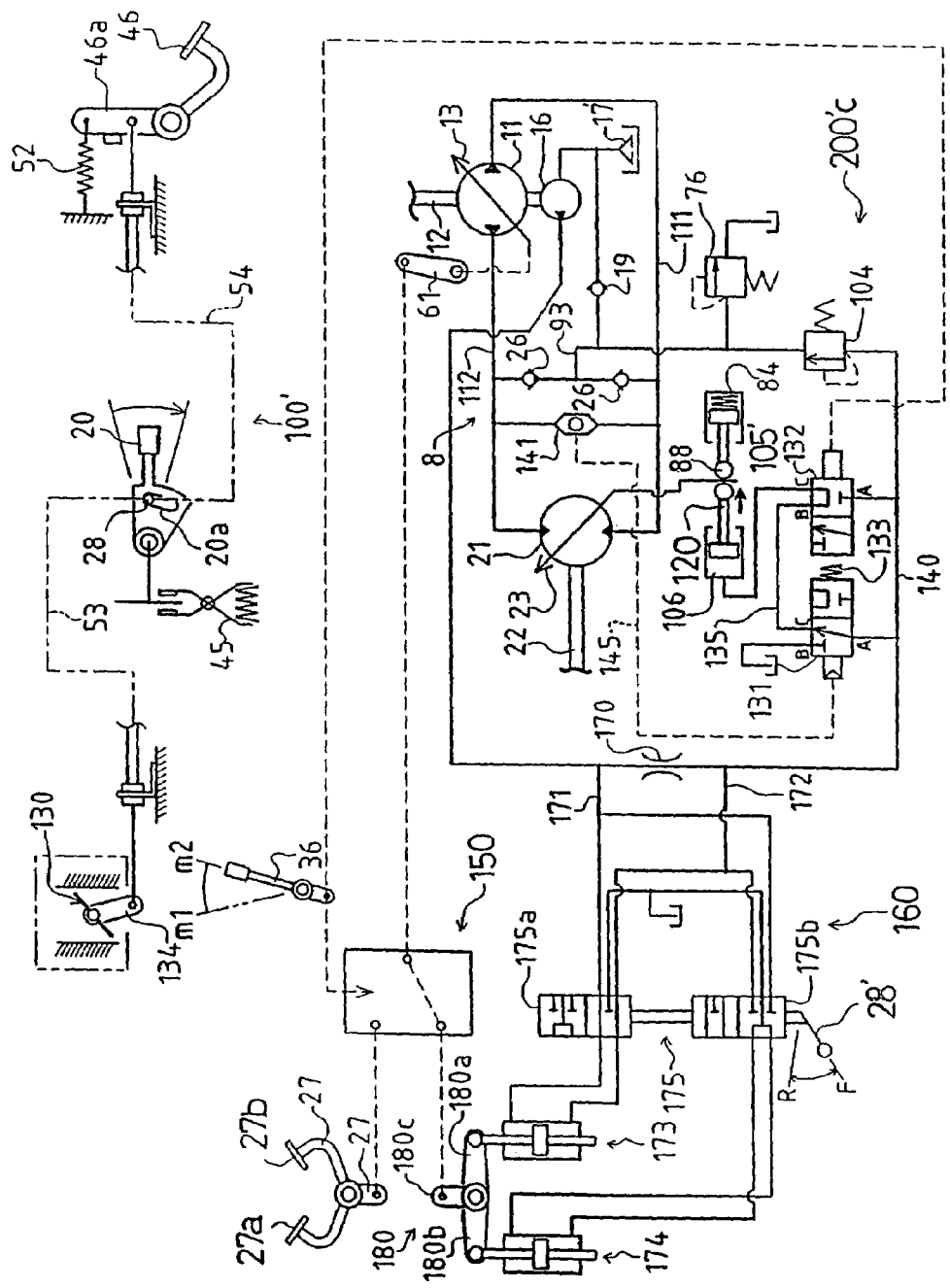
Figure 33:
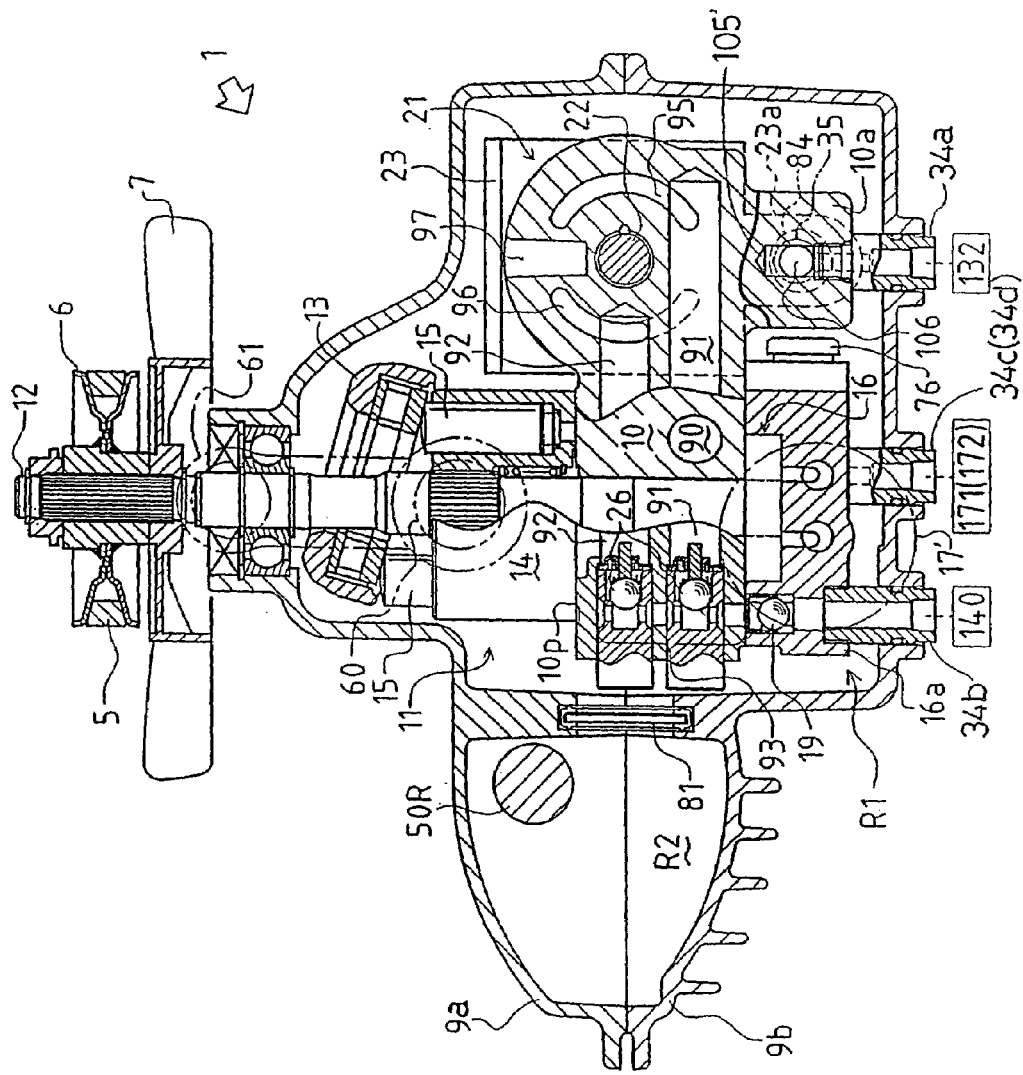
Figure 34:
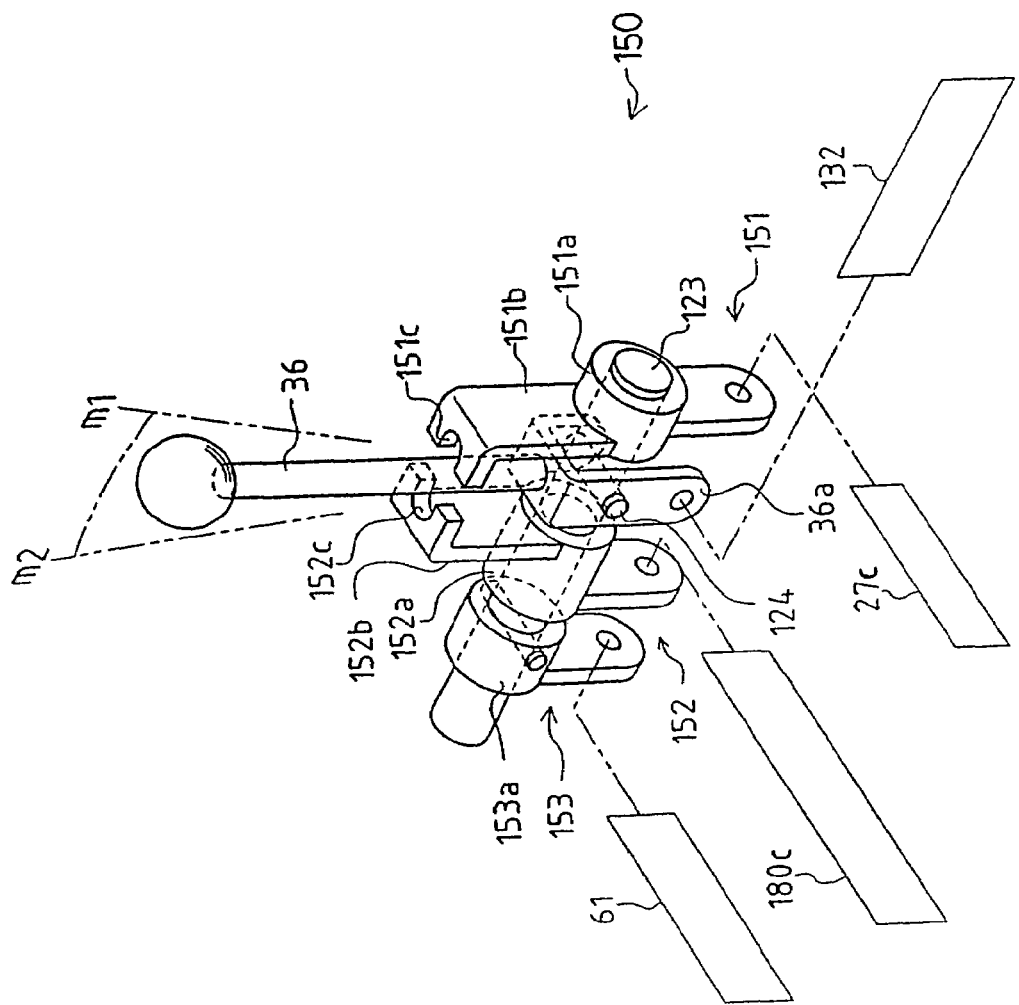

FIG. 5 is an enlarged fragmentary plan view of the same transaxle apparatus 1 from which upper housing part 9a except for a part thereof is removed, showing a principal portion of a hydraulic motor 21 therein, wherein a slant angle of a movable motor swash plate 23 is set to the minimum;

FIG. 6 is an enlarged fragmentary plan view of the same, wherein the slant angle of the motor swash plate 23 is set to the maximum;

FIG. 7 is a diagram of a principal portion of a hydrostatic vehicle driving system having a motor capacity control system 200' according to the present invention;

FIG. 8 is a plan view of transaxle apparatus 1 incorporating HST 8, from which upper housing part 9a except for a part thereof is removed, being applicable to the hydrostatic vehicle driving system as shown in FIG. 7;

FIG. 9 is a sectional view taken along the lines IX—IX of FIG. 8;

FIG. 10 is a sectional view taken along the lines X—X of FIG. 8, wherein a slant angle of motor swash plate 23 is set to the minimum;

FIG. 11 is a sectional view taken along the lines X—X of FIG. 8, wherein the slant angle of motor swash plate 23 is set to the maximum;

FIG. 12 is a sectional view taken along the lines XI—XI of FIG. 9;

FIG. 13 is a diagram of a principal portion of a hydrostatic vehicle driving system having a motor capacity control system 200'a as a modification of motor capacity control system 200' according to the present invention;

FIG. 14 is a diagram of a principal portion of a hydrostatic vehicle driving system having a motor capacity control system 200'b as a modification of motor capacity control system 200' according to the present invention;

FIG. 15 is a diagram of an entire hydrostatic vehicle driving system having a motor capacity control system 200'c as a modification of motor capacity control system 200' according to the present invention, wherein an accelerator system 100 is linked through a link mechanism 300 with a speed control pedal 27 for changing capacity of hydraulic pump 11;

FIG. 16 is a diagram of a principal portion of a first embodiment of the hydrostatic vehicle driving system as shown in FIG. 15 from which link mechanism 300 for connecting accelerator system 100 with speed control pedal 27 is removed, wherein speed control pedal 27 is neutral and a mode selection lever 36 is located at a work mode position m1;

FIG. 17 is a diagram of the same, wherein a fore pedal portion 27a of speed control pedal 27 is pressed and mode selection lever 36 is located at work mode position m1;

FIG. 18 is a diagram of the same, wherein fore pedal portion 27a of speed control pedal 27 is pressed, mode selection lever 36 is located at regular traveling mode position m2, and load applied on an engine 2 is less than the considerable;

FIG. 19 is a diagram of the same, wherein fore pedal portion 27a of speed control pedal 27 is pressed, mode selection lever 36 is located at a regular traveling mode position m2, and considerable load applied on engine 2 is detected;

FIG. 20 is a diagram of a principal portion of a second embodiment of the hydrostatic vehicle driving system as shown in FIG. 15, showing that link mechanism 300 for connecting accelerator system 100 with speed control pedal 27 is provided so as to perform both engine-control and transmission-shift by operation of only speed control pedal 27, wherein speed control pedal 27 is neutral and mode selection lever 36 is located at work mode position m1;

FIG. 21 is a diagram of the same, wherein fore pedal portion 27a of speed control pedal 27 is pressed and mode selection lever 36 is located at work mode position m1;

FIG. 22 is a diagram of the same, wherein fore pedal portion 27a of speed control pedal 27 is pressed, mode selection lever 36 is located at regular traveling mode position m2, and load applied on engine 2 is less than the considerable;

FIG. 23 is a diagram of the same, wherein fore pedal portion 27a of speed control pedal 27 is pressed, mode selection lever 36 is located at regular traveling mode position m2, and considerable load applied on engine 2 is detected;

FIG. 24 is a sectional view taken along the lines IX—IX of FIG. 8, when FIG. 8 serves as a plan view of transaxle apparatus 1 from which upper housing part 9a except for a part thereof is removed, being applicable to the hydrostatic vehicle driving system as shown in FIGS. 15 to 23;

FIG. 25 is a sectional view taken along the lines X—X of FIG. 8, when FIG. 8 serves as a plan view of transaxle apparatus 1 from which an upper housing part 9a except for a part thereof is removed, being applicable to the hydrostatic vehicle driving system as shown in FIGS. 15 to 23, wherein the slant angle of motor swash plate 23 is set to the minimum;

FIG. 26 is a similar sectional view, wherein the slant angle of motor swash plate 23 is set to the maximum;

FIG. 27 is a diagram of an entire hydrostatic vehicle driving system having motor capacity control system 200'c according to the present invention, wherein an accelerator system 100' is provided and an automatic speed control system 160 can be selectively connected to a pump swash plate 13 through selection means 150 so that the capacity of hydraulic pump 11 can be controlled according to the throttle operation of carburetor 130 of engine 2;

FIG. 28 is a diagram of a principal portion of the hydrostatic vehicle driving system as shown in FIG. 27, wherein mode selection lever 36 is located at work mode position m1, speed control pedal 27 is neutral and the load on engine 2 is less than the considerable;

FIG. 29 is a diagram of the same, wherein mode selection lever 36 is located at regular traveling mode position m2, engine 2 does not drive, and the load on engine 2 is less than the considerable;

FIG. 30 is a diagram of the same, wherein mode selection lever 36 is located at regular traveling mode position m2, engine 2 drives at some speed, and load applied on an engine 2 is less than the considerable;

FIG. 31 is a diagram of the same, wherein mode selection lever 36 is located at work mode position m1, fore pedal portion 27a of speed control pedal 27 is pressed, and the load on engine 2 is less than the considerable;

FIG. 32 is a diagram of the same, wherein mode selection lever 36 is located at regular traveling mode position m2, engine 2 does not drive, and considerable load applied on engine 2 is detected;

FIG. 33 is a sectional view taken along the lines IX—IX of FIG. 8, when FIG. 8 serves as a plan view of transaxle apparatus 1 from which upper housing part 9a except for a part thereof is removed, being applicable to the hydrostatic vehicle driving system as shown in FIGS. 27 to 34; and FIG. 34 is a perspective view of selection means 150 with mode selection lever 36.

DETAILED DESCRIPTION OF THE INVENTION

Basically, a hydrostatic vehicle driving system according to the present invention includes an HST having a variable displacement hydraulic motor whose capacity is controlled with hydraulic pressure in a closed fluid circuit of the HST in correspondence to engine load. This driving system is particularly applicable to a working vehicle such as that having a mower unit, namely, a lawn tractor.

A basic style of the hydrostatic vehicle driving system of the present invention will be described in accordance with FIG. 1.

Power from an engine 2 mounted on a working vehicle is transmitted to a pair of left and right axles 50L and 50R through an HST 8, a gear train 30 and a differential 40. Generally, axles 50L and 50R are driven for driving rear wheels of the working vehicle. HST 8 includes a variable displacement hydraulic pump 11 and a variable displacement hydraulic motor 21 fluidly connected with each other through a pair of first and second hydraulic oil passages 111 and 112.

Between engine 2 and hydraulic pump 11 is interposed a regular belt transmission without a split pulley. In this regard, an output pulley 4 is fixed on an output shaft 3 of engine 2. An input pulley 6 is fixed on an input shaft (a pump shaft) 12 of hydraulic pump 11. A belt 5 is interposed between both pulleys 4 and 6.

Hydraulic pump 11, which is of an axial piston type, has a movable pump swash plate 13. A speed control pedal 18 for speed changing and a forward/backward travel selection lever 28 for switching the traveling direction of the vehicle between forward and backward are provided in the vicinity of a driver's seat of the working vehicle.

In this embodiment, speed control pedal 18 is also linked with a carburetor of engine 2 so that the opening of carburetor is increased in proportion to the pressing of speed control pedal 18. Consequently, the vehicle is accelerated by increasing compound outputs of both engine 2 and HST 8.

Forward/backward travel selection lever 28 is linked with a fitting linkage interposed between pump swash plate 13 of hydraulic pump 11 and speed control pedal 18. When forward/backward travel selection lever 28 is switched, the linkage between pump swash plate 13 and speed control pedal 18 is switched so as to reverse the slanting direction of pump swash plate 13, whereby the direction of oil discharged from hydraulic pump 11 to hydraulic motor 21 is switched, thereby switching the traveling direction of the working vehicle between forward and backward.

Alternatively, as shown in FIG. 15, speed control pedal 18 and forward/backward travel selection lever 28 may be combined into a double speed control pedal 27 like a seesaw. As shown in FIG. 16 and others, double speed control pedal 27 is pivoted at its intermediate portion, and provided with a pair of pedal portions, which are a fore pedal portion 27a and a rear pedal portion 27b, arranged in opposite with respect to the intermediate pivot portion. A swing arm 27c is extended from the intermediate pivot portion of pedal 27, and linked to a control arm 61 for rotating motor swash plate 23 through a link rod 51. Depending upon whether fore pedal portion 27a or rear pedal portion 27b is pressed, control arm 61 is rotated to one of opposite sides from its neutral position so as to rotate motor swash plate 23 into either its forward traveling range or backward traveling range.

In each of later described hydrostatic vehicle driving systems, speed control pedal 27 may be exchanged with speed control pedal 18 and forward/backward switching lever 28 in correspondence to the variation of structure of the working vehicle.

Figure 1:
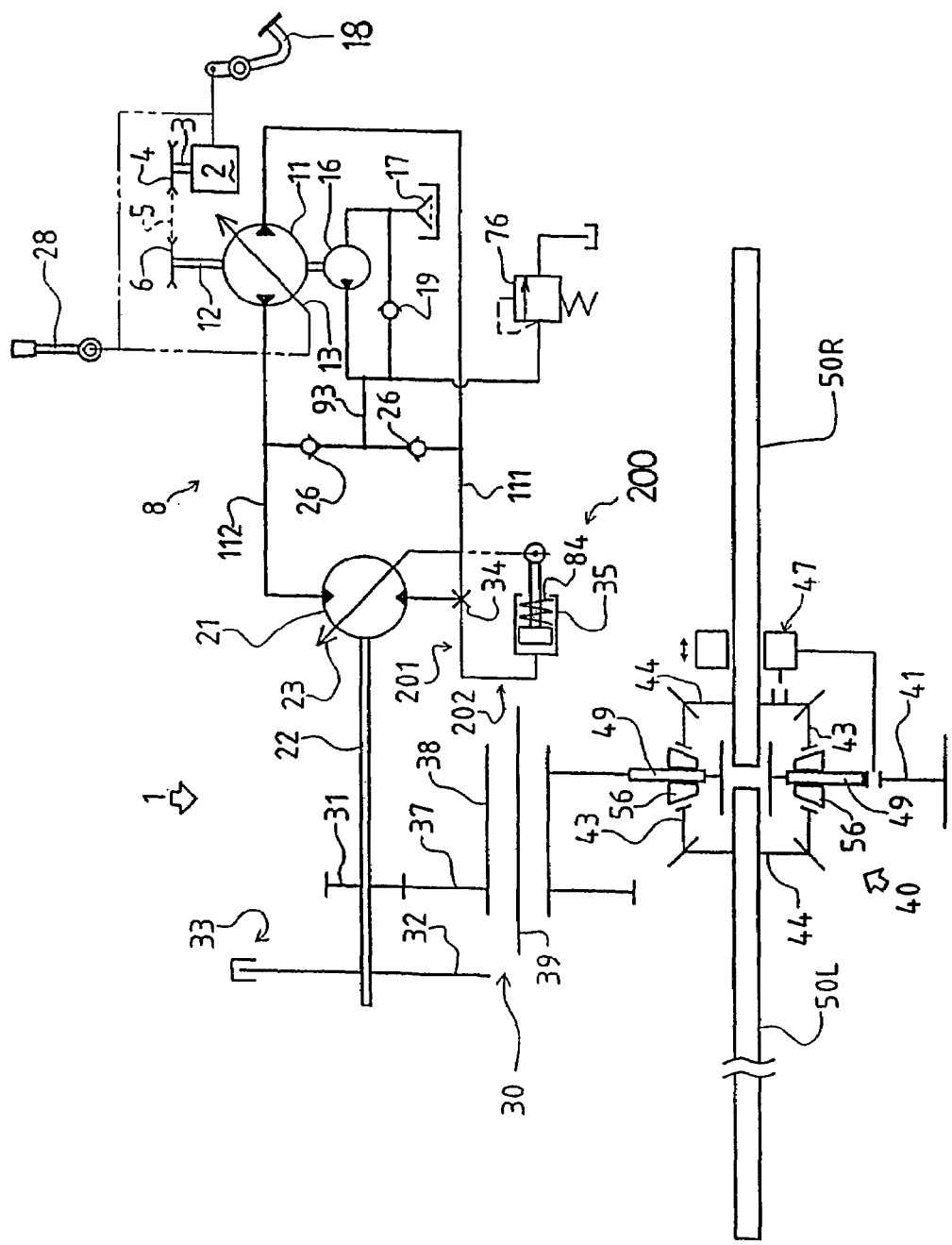
FIG. 1 is a diagram of an entire hydrostatic vehicle driving system having a motor capacity control system 200 according to the present invention.

FIG. 1 simply illustrates that speed control pedal 18 is linked with an engine carburetor so as to be used as an accelerator pedal. This interlocking of pump swash plate 13 of hydraulic pump 11 with the engine carburetor may be performed in both cases of forward and backward traveling of the working vehicle. Alternatively, if the working vehicle is not required to travel backward at high speed, this interlocking may be established only when the working vehicle travels forward and released when the working vehicle travels backward. Of course, hydraulic pump 11 may be out of interlocking with the engine carburetor so as to control the output of HST 8 independently to the output of engine 2.

An accelerator system 100 shown in FIGS. 15 to 23 will be described. A carburetor 130 of engine 2 is provided with a throttle arm 134. A manual accelerator lever 20 is fixedly provided with a swing arm 20a. Swing arm 20a is linked with throttle arm 134 through a wire 64 so that the angle of throttle arm 134 is adjusted by rotating accelerator lever 20, thereby controlling the output rotary speed of engine 2.

Accelerator lever 20 is biased toward its neutral (idling) position by a return spring 52. Furthermore, accelerator lever 20 is provided with friction lock means 45 so as to be frictionally held at the operated position against return spring 52 after it is released from an operator's force.

Accelerator system 100 shown in FIGS. 15 to 19 is free from the operation of speed control pedal 27. FIGS. 20 to 23 illustrates accelerator system 100 which can selectively interlock with speed control pedal 27 through a link mechanism 300 (also shown in FIG. 15). In link mechanism 300, speed control pedal 27 and friction lock means 45 interlock with a later-discussed mode selection lever 36.

Alternatively, FIGS. 27 to 32 illustrates another accelerator system 100'. In accelerator system 100', accelerator lever 20 is integrally provided with a plate portion 20a. An arcuate slot 20b centering on the pivot of accelerator lever 20 is bored through plate portion 20a. A slide pin 20c is slidably engaged in slot 20b and connected to throttle arm 134 through a wire 64. Slide pin 20c is initially held at one end of slot 20b. This accelerator lever 20 is also provided with friction lock means 45.

When accelerator lever 20 is manually rotated to an optimal position from its idling position, slide pin 20c, while being held at the one end of slot 20b, is moved together with accelerator lever 20 so as to rotate throttle arm 134. After the operation of accelerator lever 20 is finished and released from a driver's force, accelerator lever 20 is held at the optimal position by friction lock means 45.

Furthermore, a momentary accelerator pedal 46 is disposed in the vicinity of a driver's seat. Momentary accelerator pedal 46 is integrally provided with a swing arm 46 which is connected with slide pin 20c through a wire 65. Momentary accelerator pedal 46 is biased to its neutral (idling) position by a return spring 52.

When momentary accelerator pedal 46 is pressed against return spring 52, slide pin 20c slides from the one end to the other end in slot 20b while accelerator lever 20 is held by friction lock means 45, thereby rotating throttle arm 134 from the position determined by lever 20 as long as pedal 46 is pressed. Afterward, when momentary accelerator pedal 46 is released, pedal 46 returns to the idling position by spring 52 and throttle arm 134 returns to the position determined by accelerator lever 20 fixed by friction lock means 45.

The operation of each of accelerator systems 100 and 101' in association with speed control pedal 27, mode selection lever 36 and the like will be detailed in later descriptions of each corresponding hydrostatic vehicle driving system for a working vehicle.

Now, a transaxle apparatus 1 as an integrated hydrostatic transmission (an IHT) which is applicable to the hydrostatic vehicle driving system used in a working vehicle as shown in FIG. 1 will be described in accordance with FIGS. 1 to 6.

As shown in FIGS. 2 to 6, transaxle apparatus 1 comprises a housing 9 constituted by an upper housing part 9a and a lower housing part 9b which are joined with each other through their surrounding horizontal flat joint surfaces. A bearing portion for a motor shaft 22 is formed by upper and lower housing parts 9a and 9b on their joint surfaces. Axles 50L and 50R are rotatably supported through a bearing portion formed by upper housing part 9a above its joint surface. In housing 9 is disposed differential 40 through which axles 50L and 50R are differentially connected at their inside ends with each other. Axles 50L and 50R project laterally outwardly from left and right outer ends of housing 9, respectively.

Figure 2:
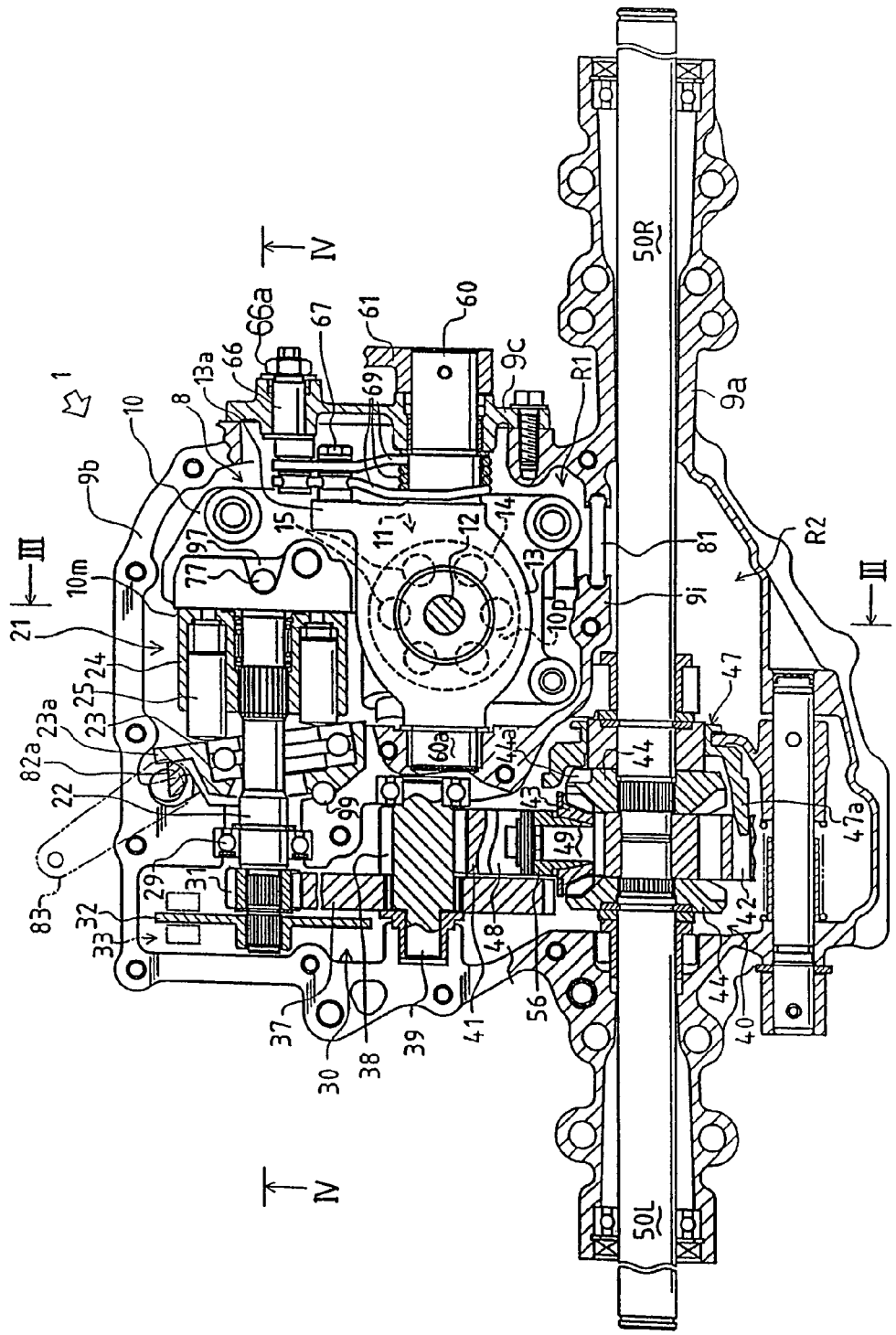
FIG. 2 is a plan view of a transaxle apparatus 1 incorporating an HST 8, from which an upper housing part 9a except for a part thereof is removed, being applicable to the hydrostatic vehicle driving system as shown in FIG. 1.

As shown in FIG. 2, the inner space of housing 9 is divided into a first chamber R1 and a second chamber R2 through a partition wall 9i formed integrally with housing 9. Moreover, partition wall 9i is integrally formed of upper housing part 9a and lower housing part 9b joined with each other. In first chamber R1 is disposed HST 8. In second chamber R2 are disposed differential 40, gear train 30 which is interposed between motor shaft 22 of HST 8 and differential 40, and axles 50L and 50R.

Partition wall 9i extends laterally along axle 50R and is bent so as to extend longitudinally in perpendicular to axle 50R, thereby making first chamber R1 substantially rectangular and forming second chamber R2 in a substantially L-like shape disposed along two adjacent edges of first chamber R1. Therefore, HST 8 and axle 50R are juxtaposed forwardly and rearwardly through a lateral extending portion of partition wall 9i, and HST 8 and gear train 30 are juxtaposed rightwardly and leftwardly through a longitudinal extending portion of partition wall 9i. Differential 40 is disposed in the corner portion of L-like shaped second chamber R2 serving as a cross point of axles 50L and 50R and gear train 30.

Figure 3:
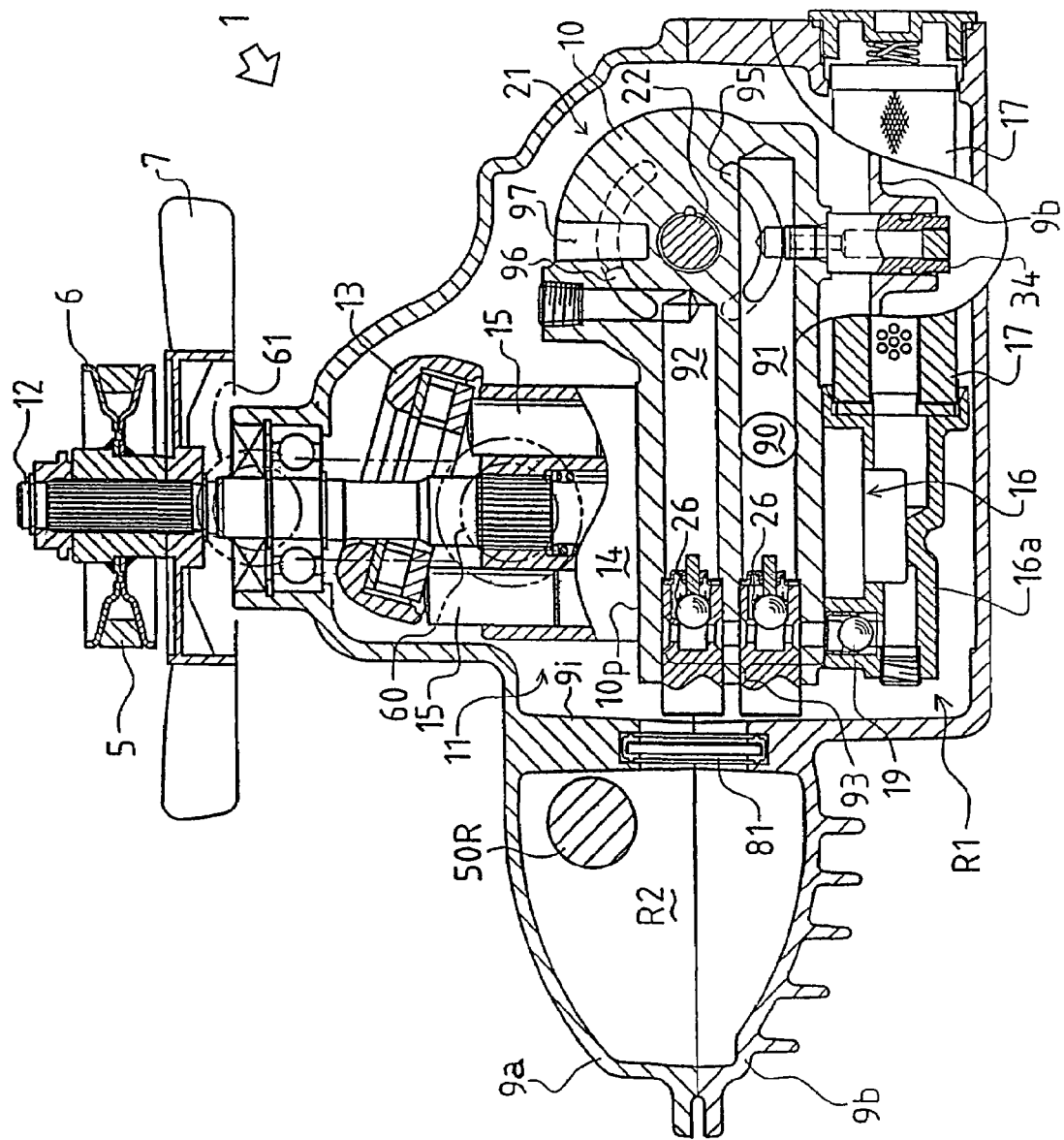
FIG. 3 is a sectional view taken along the lines III—UI of FIG. 2.

First chamber R1 and second chamber R2 are filled with oil in common, thereby serving as oil sumps. Partition wall 9i is bored at its optimal portion by a hole in which an oil filter 81 is disposed. For example, oil filter 81 may be provided in the lateral extending portion of partition wall 9i between HST 8 and axle 50R as shown in FIGS. 2 and 3. Oil filter 81 allows oil to flow therethrough between first and second chambers R1 and R2. First chamber R1 is supplied therein with oil cleaned through oil filter 81 from second chamber R2, while the oil undergoing obstacles such as iron powder generated from rubbing gears in second chamber R2. Thus, the oil used as lubricating oil for gears and bearings of gear train 30, differential 40 and the like can be also used as fine operating oil for HST 8.

Housing 9 is provided at the ceiling of its upper housing part 9a with an oil replenishing port (not shown) in communication with first chamber R1. An external oil reservoir (not shown) disposed outside housing 9 is connected with the oil replenishing port directly or through a piping (not shown) like a rubber hose. While the oil used as operating oil for HST 8 is heated by the activation of HST 8 so as to expand the whole of oil in first chamber R1 (and second chamber R2), the excessively increased oil flows into the oil reservoir, thereby adjusting the volume of oil in housing 9.

Figure 4:
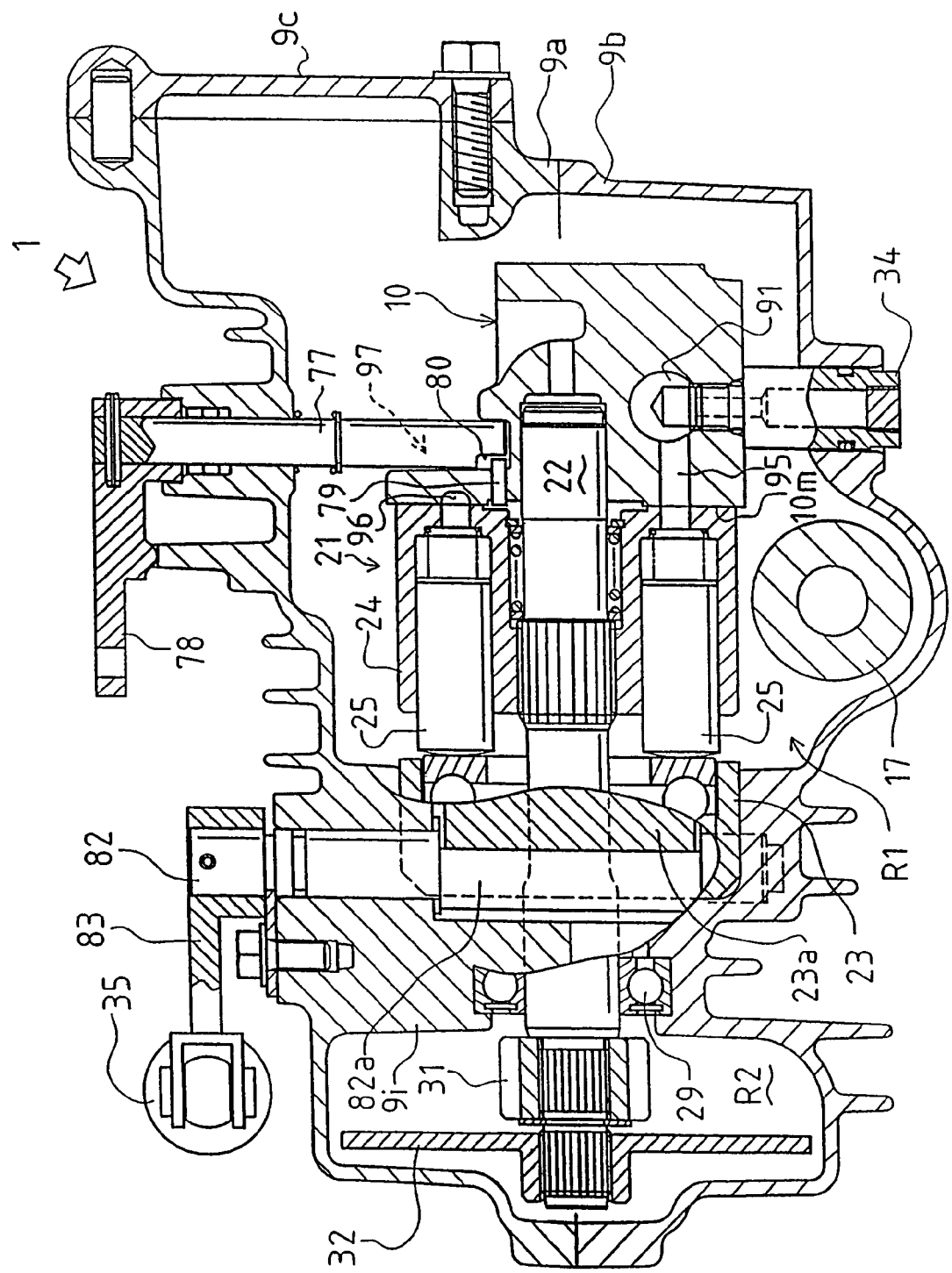
FIG. 4 is a sectional view taken along the lines IV—IV of FIG. 2.

Referring to gear train 30, as shown in FIGS. 1, 2 and 4, in second chamber R2, an output gear 31 and a brake disc 32 are fixed onto motor shaft 22 of HST 8, and a brake device 33 is disposed in the vicinity of brake disc 32 so as to apply braking force onto brake disc 32 for braking motor shaft 22.

A counter shaft 39 is rotatably disposed parallel between motor shaft 22 and differential 40 in second chamber R2. Counter shaft 39 is formed on its periphery with a speed reduction gear 38. A speed reduction gear 37 which is diametrically larger than speed reduction gear 38 is disposed around counter shaft 39. Speed reduction gear 37 is formed at its inner periphery with teeth which engages with speed reduction gear 38, thereby being fixed to counter shaft 39. Speed reduction gear 37 engages with output gear 31. Speed reduction gear 38 engages with an input gear 41 of differential 40.

Referring to differential 40, each of coaxial left and right axles 50L and 50R is fixedly provided on its inward end portions with a side bevel gear 44. Axles 50L and 50R are further extended toward each other from respective side bevel gears 44 thereon and slidably rotatably inserted into a central through-hole of input gear 41.

Input gear 41 is bored through between left and right side surfaces thereof with a pair of pinion holes 48 disposed symmetrically with respect to the central through-hole. A pinion shaft 49 and a bevel pinion 43 are disposed in each pinion hole 48. Each bevel pinion 43 is provided on pinion shaft 49 through a friction member 56 so as to apply a certain frictional braking force onto rotating bevel pinion 43, thereby designating differential 40 as a limited-slip differential.

Differential 40 is provided with a differential-locking system. In this regard, a lock member 47 is slidably provided around one axle 50 (in this embodiment, right axle 50R). Pawls 47a provided on lock member 47 are engaged in respective holes 42 of input gear 41. Lock member 47 is slidable along axle 50R while it engages with input gear 41 through pawls 47a and holes 42. One side bevel gear 44 (fixed on right axle 50R) is formed with recesses 44a. By sliding lock member 47 along axle 50R, lock member 47 is engaged/disengaged with/from side bevel gear 44 through recesses 44a. Accordingly, differential 40 is locked by an operator so as to make axles 50L and 50R rotatable integrally with each other.

HST 8 in transaxle apparatus 1 shown in FIGS. 1 to 6 has such a structure as follows:

Center section 10 is removably attached to housing 9 in first chamber R1. Center section 10 is provided at its forward half portion with a vertical surface disposed perpendicularly to axles 50L and 50R. The vertical surface serves as a motor mounting surface 10m to which hydraulic motor 21 is mounted. Center section 10 is provided at its rearward half portion with a horizontal surface serving as a pump mounting surface 10p to which hydraulic pump 11 is mounted. In hydraulic pump 11, a cylinder block 14 is slidably mounted onto pump mounting surface 10p so as to be rotatable centering its vertical axis relative to center section 10. A pump shaft 12 is vertically disposed through a center of pump mounting surface 10p and rotatably supported by center section 10. Pump shaft 12 is axially disposed through cylinder block 14. Pump shaft 12 and cylinder block 14 are locked together. Cylinder block 14 are provided therein with a plurality of cylinder holes disposed in parallel to pump shaft 12 and on the periphery of pump shaft 12. Pistons 15 with biasing springs are reciprocally movably inserted into the cylinder holes, respectively.

Pump shaft 12 projects upwardly from the top of upper housing part 9a for serving as an input shaft. Input pulley 6 and a cooling fan 7 are fixed onto the upwardly projecting portion of pump shaft 12. As mentioned above, as shown in FIG. 6 and other drawings showing each hydrostatic vehicle driving system discussed later, output pulley 4 is fixed onto output shaft 3 of vehicle engine 2. Belt 5 is interposed between output pulley 4 and input pulley 6 so as to transmit power from engine 2 to hydraulic pump 11.

Movable pump swash plate 13 is disposed in housing 9 between the ceiling of upper housing part 9a and cylinder block 14 so as to abut against heads of pistons 15. Pump swash plate 13 is tilted so as to incline its surface abutting against the heads of pistons 15 at an optimal angle from the horizontal plane perpendicular to the rotary axis of cylinder block 14, thereby varying the direction and amount of oil discharged from hydraulic pump 11 to hydraulic motor 21 through later-discussed hydraulic circuit consisted by a pair of hydraulic oil passages 111 and 112 within center section 10.

Pump swash plate 13 made as a trunnion type is downwardly curved at its both ends on which coaxial trunnion shafts 60 and 60a are laterally provided respectively. Trunnion shaft 60a is journalled in partition wall 9i. Trunnion shaft 60 is journalled through a cover 9c attached to upper housing part 9a and extended outwardly for serving as a speed control shaft, as shown in FIG. 2. Speed control arm 61 is fixed onto the outward projecting portion of trunnion shaft 60.

For constituting the linkage among pump swash plate 13, speed control pedal 18 and forward/backward traveling selection lever 28 as shown in FIG. 1, speed control arm 61 is linked with both speed control pedal 18 and forward/backward traveling selection lever 28.

By pressing speed control pedal 18, speed control arm 61 together with trunnion shafts 60 and 60a are rotated in a longitudinal direction of the working vehicle so as to rotate pump swash plate 13 slantwise around trunnion shafts 60 and 60a. Thus, the amount of oil discharged from hydraulic pump 11 to hydraulic motor 21 is varied so as to change the output rotary speed of hydraulic motor 21, thereby changing the traveling speed of the working vehicle in traveling either forward or backward.

By switching lever 28 between a forward traveling position and a backward traveling position when pump swash plate 13 is located at a neutral position, the rotational direction of pump swash plate 13 corresponding to the depth of pressed speed control pedal 18 is changed oppositely with respect to the surface of pump swash plate 13 perpendicular to pistons 15. Thus, when lever 28 is located at the forward traveling position, pump swash plate 13 is rotated in its rotational range for forward traveling from the neutral position according to the depth of pressed speed control pedal 18. When lever 28 is located at the backward traveling position, the opposite happens.

As shown in FIGS. 2 and 5, pump swash plate 13 is formed integrally with a neutral arm 13a, from which a pin 67 projects toward cover 9c. An eccentric shaft 66 is disposed through cover 9c and projects inwardly and outwardly from cover 9c. The inward projecting portion of eccentric shaft 66 is disposed eccentrically to the axis of the portion thereof supported in cover 9c. In housing 9, a neutral spring 69 is coiled around trunnion shaft 60 and extended parallel at its both end portions so as to sandwich pin 67 and the inward projecting portion of eccentric shaft 66.

When speed control arm 61 is rotated from its neutral position, pin 67 is integrally rotated so as to forcedly push one of the end portions of neutral spring 69 further away from the other end portion which is held at its initial position by eccentric shaft 66. When rotated speed control arm 61 is released from the operating force which has been applied thereon, the end portion of neutral spring 69 which has been pushed by pin 67 returns to its initial position by its biasing force so as to push pin 67 to its initial position, thereby automatically returning pump swash plate 13 to its neutral position.

A neutral adjusting nut 66a is provided on the threaded outward projecting portion of eccentric shaft 66. When eccentric shaft 66 is rotated in relative to nut 66a, the inward projecting portion of eccentric shaft 66 disposed between both the end portions of neutral spring 69 is revolved centering the axis of the portion of eccentric shaft 66 disposed in cover 9c so as to change the initial position of both the end portions of neutral spring 69 together with pin 67, thereby adjusting the neutral position of pump swash plate 13.

In hydraulic motor 21, a cylinder block 24 is slidably mounted onto motor mounting surface 10m so as to be rotatable relative to center section 10 centering its horizontal axis disposed in parallel to axles 50L and 50R. Motor shaft 22 is axially disposed through cylinder block 24, thereby being disposed laterally in parallel to axles 50L and 50R. Motor shaft 22 and cylinder block 24 are locked together. Cylinder block 24 are provided therein with a plurality of cylinder holes disposed in parallel to motor shaft 22 and on the periphery of motor shaft 22. Pistons 25 with biasing springs are reciprocally movably inserted into the cylinder holes, respectively.

Motor shaft 22 is horizontally disposed between upper and lower housing parts 9a and 9b as mentioned above. Motor shaft 22 is inserted at one end thereof into center section 10 through the center of pump mounting surface 10p and rotatably supported by center section 10. Motor shaft 22 is extended through a movable motor swash plate 23 from cylinder block 24 oppositely to center section 10 so as to project at the other end thereof into second chamber R2. Motor shaft 22 is journalled at its intermediate portion through a bearing 29 in partition wall 9i. Bearing 29 is sandwiched between the portions of upper and lower housing parts 9a and 9b which are formed into partition wall 9i. Bearing 29 is provided with an oil seal so as to prevent oil from mutually flowing between chambers R1 and R2 therethrough.

Motor swash plate 23 can be rotated between a minimum slant angle position and a maximum slant angle position. When motor swash plate 23 is located at the minimum slant angle position, the surface of motor swash plate 23 abutting against the heads of pistons 25 is slanted at a minimum angle A1 from a plane P which is perpendicular to the rotary axis of hydraulic motor 21 (motor shaft 22 and pistons 25), whereby the amount of oil discharged from hydraulic motor 21 is the minimum. At this time, if the slant position of pump swash plate 13 is out of consideration, a speed reduction ratio established by HST 8 is the minimum.

When motor swash plate 23 is located at the maximum slant angle position, the surface of motor swash plate 23 abutting against the heads of pistons 25 is slanted at a maximum angle A2 from plane P, whereby the amount of oil discharged from hydraulic motor 21 is the maximum. At this time, if the slant position of pump swash plate 13 is out of consideration, the speed reduction ratio of HST 8 is the maximum.

The slant position of motor swash plate 23 is changed by a hydraulic actuator in correspondence to the load applied on engine 2. The hydraulic control system for motor swash plate 23 is distinctive in each transaxle apparatus 1 among the present first embodiment thereof shown in FIGS. 1 to 6 and other embodiments described later. Each of the different hydraulic control systems of motor swash plate 23, namely, a motor capacity control system 200 or the like, will be discussed later.

First and second hydraulic oil passages 111 and 112 formed in center section 10 serve as a closed oil circuit for fluidly connecting hydraulic pump 11 and hydraulic motor 21 with each other. In center section 10, a pair of kidney ports (not shown) are open at pump mounting surface 10p and a pair of first and second kidney ports 95 and 96 are open at motor mounting surface 10m. In center section 10 is bored along its longitudinal direction with an upper horizontal oil hole 91 and a lower horizontal oil hole 92 in parallel. A slant oil hole 90 is formed slantwise in center section 10 and connected with upper horizontal oil hole 91. The first kidney port on pump mounting surface top is connected with first kidney port 95 on motor mounting surface 10m through oil holes 91 and 90. The second kidney port on pump mounting surface 10p is connected with second kidney port 96 on motor mounting surface 10m through oil hole 92.

A series of oil holes 91 and 90 constitute first hydraulic oil passage 111. Oil hole 92 serves as second hydraulic oil passage 112. Consequently, hydraulic oil is circulated between hydraulic pump 11 and hydraulic motor 21 through the pair of first and second hydraulic oil passages 111 and 112.

When first hydraulic oil passage 111 is hydraulically higher-pressured and second hydraulic oil passage 112 is hydraulically depressed, hydraulic motor 21 is rotated in one direction for driving axles 50L and 50R forward. When second hydraulic oil passage 112 is hydraulically higher-pressured and first hydraulic oil passage 111 is hydraulically depressed, hydraulic motor 21 is rotated in the other opposite direction for driving axles 50L and 50R backwardly. Such a difference of hydraulic pressure between first and second hydraulic oil passages 111 and 112 is mainly established by setting the position of pump swash plate 13 of hydraulic pump 11 with the above-mentioned operation means for speed changing and determining the traveling direction of the working vehicle, like speed control pedal 18 and forward/backward traveling selection lever 28 and so on.

The rotational force of hydraulic motor 21 is transmitted into axles 50L and 50R through gear train 30 and differential 40.

HST 8 is provided with a structure for compensation of hydraulic oil in first and second hydraulic oil passages 111 and 112. Center section 10 is bored with a vertical charge oil passage 93 crossing upper and lower horizontal oil holes 91 and 92. A check valve 26 is disposed in a crossing point between each of oil holes 91 and 92 and charge oil passage 93 for prevention of backflow of oil to each of hydraulic oil passages 111 and 112.

An open bottom end of charge oil passage 93 at the bottom surface of center section 10 serves as a charge oil port. The charge oil port is connected with a discharge port of a charge pump 16 which is disposed below center section 10. Charge pump 16 is a usual trochoid pump. A charge pump casing 16a is attached onto a bottom surface of center section 10. An inner rotor and an outer rotor are disposed in charge pump casing 16a. A suction filter 17 is disposed in housing 9 and attached to an inlet opening of the suction port of charge pump casing 16a as shown in FIG. 3. Pump shaft 12 of hydraulic pump 11 is extended downwardly through center section 10 so as to drive the inner and outer rotors of charge pump 16. Therefore, pump shaft 12 also serves as a drive shaft for charge pump 16.

As shown in FIG. 1, a relief valve 76 is provided in charge pump casing 16a for regulating the charge pressure effecting in the discharge port of charge pump casing 16a.

As shown in FIGS. 1 and 3, a check valve 19 for prevention of freewheel is provided in charge pump, casing 16a so as to be interposed between the discharge port of charge pump 16 and charge oil passage 93.

When the working vehicle is stationary on a slope, hydraulic motor 21 receives a driving force from axles 50L and 50R and functions as a pump so as to reduce the hydraulic oil in either hydraulic oil passage 111 or 112. However, check valve 19 is opened by negative pressure of either hydraulic oil passages 111 or 112 so as to absorb the oil in housing 9, thereby preventing the reduction of hydraulic oil.

When the working vehicle is towed, oil is bypassed between hydraulic oil passages 111 and 112.

In this regard, as shown in FIGS. 2, 4 and 5, a camshaft 77 is disposed vertically and rotatably supported by upper housing part 9a. Camshaft 77 projects upwardly from housing 9 so as to be fixedly provided thereon with a bypassing lever 78. A downward recess 97 is formed at a portion of center section 10 in the vicinity of motor mounting surface 10m. A bottom end portion of camshaft 77 is inserted into recess 97. In recess 97, a bottom end portion of camshaft 77 is partly notched so as to form a cam 80.

Center section 10 is bored with a diametrically small through-hole in parallel to motor shaft 22 between motor mounting surface 10m and recess 97. A pin 79 is reciprocally disposed in the through-hole. One end of pin 79 is disposed close to cylinder block 24. The other end of pin 79 is disposed close to cam 80 in recess 97.

If the working vehicle provided with this transaxle apparatus 1 is towed by another working vehicle, lever 78 is rotated so as to rotate camshaft 77 integrally and make cam 80 push pin 79 so that the end of pin 79 projects from motor mounting surface 10m and pushes cylinder block 24, thereby separating cylinder block 24 from motor mounting surface 10m. Therefore, cylinder block 24 is hydraulically bypassed and each of hydraulic oil passages 111 and 112 is directly connected to the oil sump in housing 9. Hydraulic motor 21 becomes rotatable freely from the hydraulic oil in hydraulic oil passages 111 and 112. Consequently, axles 50L and 50R interlocking with motor shaft 22 become free so as to prevent resistance against the towing.

The hitherto descriptions are chiefly given on the structures of transaxle apparatus 1 which are common among some embodiments thereof described later. Now, description will be given on each distinctive control system of motor swash plate 23 of hydraulic motor 21, namely, motor capacity control systems 200, 200', 200'a, 200'b and 200'c which utilize hydraulic pressure of HST 8 for adjusting the speed reduction ratio of HST 8 correspondingly to load on engine 2.

Previous to the descriptions thereof, the reason why the hydraulic pressure of at least either first hydraulic oil passage 111 or second hydraulic oil passage 112 is used as detection of the engine load is referred to. While the working vehicle travels, various resistances such as road resistance, air resistance, acceleration resistance, slope resistance and so on are generated on axles 50L and 50R. These resistances are transmitted as a torque against the driving force of motor shaft 22 through gear train 30 to motor shaft 22 of hydraulic motor 21.

The greater the total resistance generated from axles 50L and 50R becomes, the greater hydraulic pressure force is required to drive motor shaft 22. If the working vehicle drives forward, the hydraulic pressure of first hydraulic oil passage 111 is increased so much as to overcome the total resistance, thereby becoming higher than its essential pressure determined by setting the capacity of hydraulic pump 11 with pump swash plate 13.

On the other hand, the increase of the total resistance results in the increase of load applied on engine 2.

Consequently, when the hydraulic pressure of either first hydraulic oil passage 111 or second hydraulic oil passage 112 is increased, the load on engine 2 is increased.

Thus, according to the detection of the increase of hydraulic pressure of the hydraulic oil passage of HST 8 regarded as the increase of load on engine 2, the capacity of hydraulic motor 21 is automatically increased so as to increase the speed reduction ratio of HST 8, thereby overcoming the load of engine 2.

In transaxle apparatus 1 shown in FIGS. 1 to 6, for example, a motor capacity control system 200 is provided for controlling the position of motor swash plate 23, thereby controlling the capacity of hydraulic motor 21. In this regard, motor capacity control system 200 consists of a hydraulic actuator moving motor swash plate 23, load-detection means 201, and actuator-control means 202. In this embodiment, the hydraulic actuator is hydraulic cylinder 35. Load-detection means 201 detects the hydraulic pressure of first hydraulic oil circuit 111 replacing the load on engine 2. Actuator-control means 202 hydraulically controls hydraulic cylinder 35 on basis of the hydraulic pressure condition detected by load-detection means 201.

Incidentally, there is no assumption that the working vehicle having transaxle apparatus 1 shown in FIGS. 1 to 6 travels backward with engine 2 under heavy load. Hence, transaxle apparatus 1 of this embodiment utilizes the detection of hydraulic pressure of only first hydraulic oil passage 111, without second hydraulic oil passage 112, replacing the detection of engine load.

However, hydraulic pressure of second hydraulic oil passage 112 may be used as detection of the engine load and for controlling motor swash plate 23, additionally or alternatively to first hydraulic oil passage 111, if it is required to overcome the engine load in backward traveling and if there is a room for such a device in transaxle apparatus 1.

Now, referring to arrangement of motor swash plate 23 in transaxle apparatus 1 shown in FIGS. 1 to 6, a round fulcrum shaft 99 serving as a fulcrum of movable motor swash plate 23 in its slanting is vertically disposed while being partly inserted into partition wall 9i of housing 9. Motor swash plate 23 is vertically formed on its back surface with a sectionally half-round groove in correspondence to fulcrum shaft 99. Motor swash plate 23 is arranged between upper and lower housing parts 9a and 9b so as to abut against heads of pistons 25. Fulcrum shaft 99 is engaged in the groove of motor swash plate 23. In this arrangement, motor swash plate 23 is rotated around fulcrum shaft 99 while the surface of the groove slides against the peripheral surface of fulcrum shaft 99.

Partition wall 9i is formed with a pair of contact surfaces 9ia and 9ib which are arranged oppositely to each other with respect to motor shaft 22 when viewed in plan as shown in FIGS. 5 and 6. Motor swash plate 23 is rotated between the minimum slant angle position with angle A1 and the maximum slant position with angle A2. When motor swash plate 23 is located at the minimum slant angle position, motor swash plate 23 abuts against contact surface 9ia, as shown in FIG. 5. When motor swash late 23 is located at the minimum slant angle position, motor swash late 23 abuts against contact surface 9ib, as shown in FIG. 6.

As shown in FIGS. 4 to 6, a control shaft 82 for rotating motor swash plate 3 is supported by housing 9 vertically in parallel to fulcrum shaft 99, and in opposite to fulcrum shaft 99 with respect to motor shaft 22. Control shaft 82 is formed at its intermediate portion into an eccentric half-round shaped cam 82a. On the other hand, motor swash plate 23 is integrally formed on one lateral side thereof with an operation arm 23a. Cam 82a of control shaft 82 is brought into contact with a vertical surface of operation arm 23a against the pressure force of pistons 25. When control shaft 82 is rotated, cam 82a is revolved centering on the axis of control shaft 82 while abutting against operation arm 23a, thereby moving motor swash plate 23.

Control shaft 82 projects upwardly from housing 9 so as to be fixedly provided thereon with a control lever 83. Lever 83 is pivotally connected with a piston rod of a hydraulic cylinder 35 serving as a hydraulic actuator for moving motor swash plate 23. Hydraulic cylinder 35 is also pivoted on a vehicle frame.

As shown in FIG. 2, an oil port sleeve 34 is provided through a bottom wall of housing 9 and attached onto the bottom surface of center section 10 so as to be connected to first hydraulic oil passage 111 in center section 10. Hydraulic oil passage 111 is higher-pressured when the working vehicle is driven forward. Hydraulic cylinder 35 is fluidly connected with first hydraulic oil passage 111 through an external pipe fitting (not shown) and oil port sleeve 34 as shown in FIG. 1.

As shown in FIG. 1, hydraulic cylinder 35 is provided with a spring 84 biasing its piston rod in the contracting direction. When the hydraulic pressure of first hydraulic oil passage 111 is small (whether first hydraulic oil passage 111 is higher-pressured or depressed), the piston rod of hydraulic cylinder 35 is contracted by the force of spring 84 so that motor swash plate 23 abuts against first contact surface 9ia, as shown in FIG. 5, wherein a surface of motor swash plate 23 abutting against pistons 25 is slanted at minimum angle A1 from plane P.

As the hydraulic pressure of first hydraulic oil passage 111 is increased, a part of pressured oil in first hydraulic oil passage 111 flows into hydraulic cylinder 35 so as to extend the piston rod of hydraulic cylinder 35 and rotate lever 83 as an arrow x shown in FIG. 5.

Accordingly, cam 82a of control shaft 82 retreats so that motor swash plate 23 with operation arm 23a abutting against cam 82a is naturally further slanted from angle A1 by effect of the pressure of pistons 25, thereby increasing the capacity of hydraulic motor 21. Motor swash plate 23 is finally balanced when the hydraulic pressure of first oil passage 111 and the spring force of spring 84 become equal in hydraulic cylinder 35. The balancing position of motor swash plate 23 is determined according to the hydraulic pressure of first oil passage 111.

If the hydraulic pressure of first hydraulic oil passage 111 exceeds a certain degree, motor swash plate 23 comes to abut against contact surface 9ib, as shown in FIG. 6, wherein the surface of motor swash plate 23 abutting against pistons 25 is slanted from plane P at maximum angle A2 that is larger than angle A1.

Minimum angle A1 and maximum angle A2 of motor swash plate 23 of hydraulic motor 21 are desirably set to appropriate degrees in consideration of the permissible load range of engine 2, the use of the working vehicle having this transaxle apparatus 1, the capacity of hydraulic pump 11, the speed reduction ratio of gear train 30 and so on.

In hydrostatic vehicle driving system shown in FIG. 1, which includes transaxle apparatus 1 shown in FIGS. 2 to 6, hydraulic cylinder 35 is provided as the hydraulic actuator for moving motor swash plate 23. Oil port sleeve 3d and the pipe fitting interposed between first hydraulic oil circuit 111 and hydraulic cylinder 35 serve as both load-detection means 201 and actuator-control means 202. Thus, motor capacity control system 200 is structured.

Next, a hydrostatic vehicle driving system for a working vehicle according to the present invention shown in FIG. 7, which includes transaxle apparatus 1 provided with an alternative motor capacity control system 200' as shown in FIGS. 8 to 12, will be described. In FIGS. 7 to 12, the same reference numerals designate identical or substantially similar parts or assemblies with those in FIGS. 1 to 6.

Except matters peculiar to this embodiment described as follows, the hydrostatic vehicle driving system shown in FIG. 7 and transaxle apparatus 1 shown in FIGS. 8 to 12 have common structures with those shown in FIGS. 1 to 6.

In this transaxle apparatus 1, a piston 120 provided in housing 9 serves as a hydraulic actuator for rotating motor swash plate 23 of hydraulic motor 21, constituting motor capacity control system 200'.

As shown in FIGS. 10 and 11, the back of motor swash plate 23 is formed into an arcuate convex. A retainer 109 is fittingly sandwiched between upper and lower housing parts 9a and 9b so as to slidably supporting motor swash plate 23. Retainer 109 has a recessed arcuate surface 109a. The arcuate surface of the back convex of motor swash plate 23 fittingly and slidably abuts against recessed arcuate surface 109a so that motor swash plate 23 is slanted while being guided by retainer 109.

In this embodiment, the rotary axis of motor shaft 21 is placed on a joint surface between upper and lower housing parts 9a and 9b. If retainer 109 for supporting motor swash plate 23 were to be molded by housing parts 9a and 9b, it would be required that upper and lower housing parts 9a and 9b are formed with arcuate surfaces, respectively, and both the arcuate surfaces of upper and lower housing parts 9a and 9b are accurately joined with each other without slipping. Such accurate formation of arcuate surfaces on respective housing parts 9a and 9b is difficult.

From this view point, retainer 109 is made separately from housing parts 9a and 9b. Even if there is unevenness between upper and lower housing parts 9a and 9b, retainer 109 having recessed arcuate surface 109a is disposed across the joint surface between upper and lower housing parts 9a and 9b so as to slidably support motor swash plate 23 properly without abrasion.

This structure is typically applicable in the case that the rotary axis of hydraulic motor 21 is arranged in parallel to or coincidentally with the joint surface of a divisible housing. It may also be used for supporting a movable swash plate of a hydraulic pump whose rotary axis is disposed in parallel to or coincidentally with the joint surface of a divisible housing.

As shown in FIGS. 9 to 12, center section 10 is additionally formed with a first extension portion 10a and a second extension portion 10b. First extension portion 10a is extended downwardly from motor mounting surface 10m. Second extension portion 10b is extended horizontally in parallel to motor shaft 22 from first extension portion 10a below hydraulic motor 21. An utmost end of second extension portion 10b is located close to motor swash plate 23.

A vertical oil hole 105 is formed in first extension portion 10a. A horizontal cylinder chamber 106 is formed in second extension portion 10b so as to be connected with oil hole 105 and open toward motor swash plate 23. Motor swash plate 23 is integrally-provided with a plane operation arm 23a which is extended downwardly from the bottom end of motor swash plate 23. Piston 120 consisting of a sleeve 121 and a ball joint 122 is interposed between cylinder chamber 106 and operation arm 23a of motor swash plate 23.

Cylinder chamber 106 is provided at its intermediate portion with a step 106a. Sleeve 121 is fittingly and slidably reciprocally inserted into a diametrically larger portion of cylinder chamber 106 between its open end and step 106a. Ball joint 122 having a spherical portion and a plane portion is interposed between sleeve 121 and operation arm 23a while the spherical portion is fittingly and slidably inserted into sleeve 121 and the plane portion abuts against operation arm 23a. When sleeve 121 abuts against step 106a as shown in FIG. 10, the slant angle of motor swash plate 23 from plane P perpendicular to motor shaft 22 is minimum angle A1.

Alternatively, cylinder chamber 106 may be provided in an extension portion formed by charge pump casing 16a instead of extension portions 10a and 10b of center section 10.

In opposite to piston 120, a return piston 88 is interposed between operation arm 23a and retainer 109. In detail, retainer 109 is formed with a piston hole 125. Return piston 88 consisting of a sleeve 85 and a ball joint 86 has a similar construction with piston 120. Sleeve 85 is fittingly and slidably reciprocally inserted into piston hole 125 through a spring 84. Ball joint 86 having a spherical portion and a plane portion is interposed between sleeve 85 and operation arm 23a while the spherical portion is fittingly and slidably inserted into sleeve 85 and the plane portion abuts against operation arm 23a. Consequently, return piston 88 biases motor swash plate 23 with the force of spring 84 against piston 120.

Piston hole 125 is further extended through housing 9 (lower housing part 9b) and open at an outer side wall of housing 9. Within the wall of housing 9, piston hole 125 is female-screwed and a threaded adjusting rod 87 is screwed into piston hole 125 and fastened with housing 9 through a nut 87a. Adjusting rod 87 is rotated and axially moved by rotating nut 87a so as to adjust the spring force of spring 84, thereby adjusting the initial position of motor swash plate 23.

In retainer 109, piston hole 125 is provided with a step 125. When sleeve 85 abuts against step 125a as shown in FIG. 11, the slant angle of motor swash plate 23 from plane P is maximum angle A2.

Due to such a structure, when the hydraulic pressure of first hydraulic oil passage 111 is increased, the hydraulic pressure in cylinder chamber 106 in connection with first hydraulic oil passage 111 is increased so as to thrust piston 120 outward, thereby pushing operation arm 23a of motor swash plate 23. The slant angle of motor swash plate 23 is increased so as to increase the capacity of hydraulic motor 21.

On the other hand, return piston 88 is pushed by operation arm 23a so as to press spring 84, thereby increasing the spring force of spring 84. Consequently, motor swash plate 23 is balanced when the pressure force of piston 120 by hydraulic pressure of first oil passage 111 and the spring force of spring 84 become equal. The balancing position of motor swash plate 23 is determined according to the hydraulic pressure of first oil passage 111.

In brief, piston 120 is operated according to the detected hydraulic pressure of first hydraulic oil passage 111 which is regarded as load on engine 2. Accordingly, if the increase of hydraulic pressure of first hydraulic oil passage 111 is detected, motor swash plate 23 is rotated from minimum angle A1 toward maximum angle A2.

The stationary or balancing position of motor swash plate 23, in relation to the hydraulic pressure of first oil passage 111, will be described in accordance with FIGS. 9 and 10.

When first oil passage 111 is hydraulically non-pressured or negatively pressured, piston 120 is detracted so that sleeve 121 abuts against step 106a. At this time, motor swash plate 23 is located at the minimum slant angle position, wherein motor swash plate 23 is slanted at angle A1 from plane P as shown in FIG. 10. When motor swash plate 23 is set at the minimum slant angle position, hydraulic motor 21 has the minimum capacity so that the speed reduction ratio of HST 8 is the minimum if the position of pump swash plate 13 of hydraulic pump 11 is fixed.

The minimum slant angle position (or angle A1) of motor swash plate 23 is determined according to the position of step 106a. In this hydraulic pressure condition of first hydraulic oil passage 111, it is possible to say that little or almost no load is applied on engine 2. Therefore, the position of step 106a may be determined so as to set angle A1 of motor swash plate 23 to the suitable minimum angle without consideration of the load on engine 2, thereby determining the minimum capacity of hydraulic motor 21.

As first hydraulic oil passage 111 is positively hydraulically pressured for driving the working vehicle forward, the hydraulic pressure of first hydraulic oil passage 111 makes piston 120 project out as an arrow y shown in FIG. 10 so as to push operation arm 23a. Thus, the slant angle of motor swash plate 23 is increased and piston 88 is retracted. Finally, motor swash plate 23 is balanced between the thrusting force of piston 120 and the biasing force of spring 84 so as to become stationary. This balancing position of motor swash plate 23 is steplessly moved in proportion to the increase of hydraulic pressure of first hydraulic oil passage 111.

When first hydraulic oil passage 111 is hydraulically pressured to a certain degree, sleeve 85 of piston 88 comes to abut against step 125a in piston hole 125, thereby stopping motor swash plate 23 at the maximum slant angle position wherein motor swash plate 23 is slanted at angle A2 from plane P, as shown in FIG. 11. When motor swash plate 23 is set at the maximum slant position, hydraulic motor 21 has the maximum capacity so that the speed reduction ratio of HST 8 is the maximum if the position of pump swash plate 13 of hydraulic pump 11 is fixed. Even if the hydraulic pressure of first hydraulic oil passage 111 is increased beyond the certain degree, motor swash plate 23 is still stationary at the maximum slant angle position.

In this high-pressured condition of first hydraulic oil passage 111, it is possible to say that heavy load is applied on engine 2. Therefore, the position of step 125a should be determined so as to set angle A2 of motor swash plate 23 to the suitable maximum angle under consideration of the maximum permissible load of engine 2, thereby determining the maximum capacity of hydraulic motor 21.

Incidentally, in association with arrangement of extension portions 10a and 10b below center section 10, instead of inner suction filter 17 as shown in FIG. 3, a suction filter 17' for filtering oil supplied to hydraulic oil passages 111 and 112 of HST 8 is externally attached onto a side wall of lower housing part 9b, as shown in FIG. 12. As shown in FIG. 9, suction filter 17' is arranged in a dead space below control arm 60, thereby minimizing transaxle apparatus 1. Additionally, as shown in FIG. 11, a suction port 127 for suction filter 17' is provided in a side wall of housing 9, and a pipe 101 is interposed through a side wall of housing 9 between a discharge port of suction filter 17' and a suction port 16b formed in charge pump casing 16a of charge pump 16.

Therefore, oil in the oil sump of housing 9 is introduced into suction filter 17' through suction port 127, and sent to suction port 16b of charge pump 16 through a pipe 101. As shown in FIG. 12, in charge pump casing 16a is formed a discharge oil passage 128 extending from discharge port 16c. An oil groove 129 is formed between center section 10 and charge pump casing 16a. Charge pump 16 discharges oil from discharge port 16b and discharge oil passage 128 to charge oil passage 93 in center section 10 through oil groove 129. A relief valve 76 is connected to discharge oil passage 128 so as to regulate a charge pressure.

Motor capacity control system 200' including piston 120 is drawn as a diagram in FIG. 7. In this system 200', the oil passage consisting of oil hole 105 and cylinder chamber 106 serve as load-detection means 201, which detects the hydraulic oil pressure of first hydraulic oil passage 111. Actuator-control means 202 for controlling Piston 102 is constituted by cylinder chamber 106, return piston 88, spring 84 and the like.

Next, various modifications of the hydrostatic vehicle driving system shown in FIG. 7, which includes motor capacity control system 200' having piston 120 as a hydraulic actuator for moving motor swash plate 23 of hydraulic motor 21, will be described in FIGS. 13 to 34.

However, as long as possible, the distinction of each following modification of this hydrostatic vehicle driving system having motor capacity control system 200' may be adapted to the first hydrostatic vehicle driving system including motor capacity control system 200 as shown in FIG. 1, which includes hydraulic cylinder 35 as a hydraulic actuator for motor swash plate 23.

In FIG. 7, movable motor swash plate 23 is steplessly adjusted with its slant angle between angles A1 and A2. Alternatively, movable motor swash plate 23 may be positionally switched between minimum angle A1 and maximum angle A2 as shown in FIGS. 13 and 14.

Referring to FIG. 13, a two-position switching valve 102 is interposed between first hydraulic oil passage 111 and piston 120. Valve 102 is operated by inner pilot pressure. When hydraulic pressure of first hydraulic oil passage 111 exceeds the force of a return spring 103 of valve 102, valve 102 is switched so as to thrust out piston 120 so that motor swash plate 23 is switched to the maximum slant position from the minimum slant position.

In such a structured motor capacity control system 200'a, a pilot oil path of valve 102 and an oil path interposed between the hydraulic actuator (piston 120) and first hydraulic oil passage 111 serve as load detection means 201. Valve 102, spring 103 and the like serve as actuator-control means 202 which controls the position of piston 120 in accordance with the hydraulic pressure replacing load on engine 2, detected by load-detection means 201.

Referring to FIG. 14, piston 120 is fluidly connected with discharge port 16c of charge pump 16 through two-position switching valve 102. Pilot pressure of valve 102 is led from first hydraulic oil passage 111.

If the pilot pressure force from first hydraulic oil passage 111 exceeds the force of spring 103 of valve 102, valve 102 is switched so that a part of oil discharged from charge pump 16 is supplied to the hydraulic actuator (piston 120) so as to thrust out piston 120, whereby motor swash plate 23 is switched to the maximum slant position from the minimum slant position.

Additionally, valve 102 is provided with a manual operation lever 102a. When the working vehicle is at work, an operator may operate lever 102a so as to fix valve 102 at the position for holding motor swash plate 23 at the maximum slant position while engine 2 may be subjected to heavy load, thereby keeping the maximum capacity of hydraulic motor 21 and enabling the working vehicle to drive at a constant low speed.

In this motor capacity control system 200'b, a pilot oil path of valve 102 serves as load-detection means 201. Valve 102, spring 103 and the like serve as actuator-control means 202 which controls piston 120 in accordance with the detected hydraulic pressure replacing load of engine 2.

A relief valve 104 determines the hydraulic pressure of piston 120. The excessive pressured oil for the hydraulic actuator is released to charge oil passage 93 through relief valve 104 so as to compensate inner oil leak of HST 8.

The working vehicle having transaxle apparatus 1 may require that the capacity of variable displacement hydraulic motor 21 is fixed to the maximum in some cases, as being referred to in FIG. 14. For example, if the working vehicle is a lawn tractor, the capacity of hydraulic motor 21, which is desirably switched between the smaller and the greater during regular traveling of the working vehicle, may be desired to be fixed to the greater for overcoming engine load during its lawn-mowing.

Considering such a case, referring to FIGS. 15 to 19, center section 10 is optimally formed therein with a piston drive oil passage 140, which is extended from the discharge port of charge pump 16 through relief valve 104 to charge oil passage 93 among check valves 19 and the pair of check valves 26.

The oil discharged from charge pump 16 and led into oil Passage 140 is pressured sufficiently for holding motor swash plate 23 at maximum angle A2, if it is supplied in cylinder chamber 106.

A first two-position switching valve 131 and a second two-position switching valve 132 are fluidly connected with piston drive oil passage 140 in parallel.

In this motor capacity control system 200'c, piston drive oil passage 140 and two valves 131 and 132 serve as actuator-control means 202. For constituting load-detection means 201, a shuttle valve 141 is interposed between first and second hydraulic oil circuits 111 and 112, and a pilot oil passage 145 is extended from shuttle valve 141.

First valve 131 is a hydraulic pilot valve, which is operated by pilot oil through pilot oil passage 145 from shuttle valve 141. First valve 131 has three ports. A port A is connected to oil passage 140. A port B is a drain port. A port C is connected to second valve 132 through a connection oil passage 135.

When the hydraulic pressure in both hydraulic oil passage 111 and 112 is less than a pilot pressure for first valve 131, in first valve 131, ports B and C are connected with each other so as to drain oil in connection oil passage 135 and port A is shut from both ports B and C in first valve 131, as shown in FIG. 16.

When the pilot pressure for first valve 131 arises in either hydraulic oil passage 111 or 112, in first valve 131, ports A and C are connected with each other so as to connect oil passage 140 with connection oil passage 135 and port B is shut from both ports A and C in first valve 131, as shown in FIG. 17.

Second valve 132 is mechanically switched between two positions by link with a mode selection lever 36, which is provided beside a driver's seat and manipulated between "a work mode position m1" and "a regular traveling mode position m2". Second valve 132 may alternatively be a solenoid valve which is switched on/off by detecting the position of lever 36. Second valve 132 also has three ports. A port A is connected to oil passage 140. A port B is connected to first valve 131 through connection oil passage 135. A port C is connected to cylinder chamber 106 through oil passage 105'.

When mode selection lever 36 is located at work mode position m1, in second valve 132, ports A and C are connected with each other so as to connect oil passage 140 to cylinder chamber 106 and port B is shut from both ports A and C, as shown in FIGS. 16 and 17. Therefore, regardless the position of first valve 131, certain pressured oil discharged from charge pump 16 is supplied into cylinder chamber 106 through oil passage 140, second valve 132 and oil passage 105', so that piston 120 is thrust out against spring 84 so as to rotate motor swash plate 23 to maximum angle A2, thereby fixing the capacity of hydraulic motor 21 to the maximum.

When mode selection valve 36 is located at regular traveling position m2, in second valve 132, ports B and C are connected with each other so as to connect oil passage 135 to cylinder chamber 106 and port A is shut from both ports B and C, as shown in FIGS. 18 and 19.

In this condition, if first valve 131 is free from pilot pressure, as shown in FIG. 18, oil is drained from cylinder chamber 106 through second and first valves 132 and 131 while piston 120 is retracted by biasing force of spring 84 so as to locate motor swash plate 23 at minimum angle A1, thereby establishing the minimum capacity of hydraulic motor 21.

On the other hand, while mode selection lever 36 being located at regular traveling position m2, if first valve 131 is operated by pilot pressure, as shown in FIG. 19, oil is supplied from oil passage 140 into cylinder chamber 106 through first and second valves 131 and 132 so as to thrust out piston 120 against the biasing force of spring 84, thereby locating motor swash plate 23 at maximum angle A2 so as to establish the maximum capacity of hydraulic motor 21.

Incidentally, in this embodiment, the capacity of hydraulic motor 21 can be set to the maximum, whether the working vehicle may travel forward or backward, because motor swash plate 23 is rotated to maximum angle A2 in correspondence to the increase of hydraulic pressure in either first or second hydraulic oil circuit 111 or 112.

If the working vehicle having such a structure shown in FIGS. 15 to 19 is a lawn tractor, the work mode means its lawn-mowing. During the lawn-mowing, the working vehicle must drive at a constant low speed for preventing unevenness of the mowed lawn, however great resistance may be generated against driving axles 50L and 50R.

Then, in above-described accelerator system 100, which has no relation to speed control pedal 27, accelerator lever 20 with friction lock means 45 is set to fix the output rotary speed of engine 2 optimally. Mode selection lever 36 is located at work mode position m1, as shown in FIGS. 16 and 17, so as to fix motor swash plate 23 at maximum angle A2, thereby establishing the maximum capacity of hydraulic motor 21 so as to overcome the total resistance applied on axles 50L and 50R and avoid overload on engine 2.

In such a precondition, speed control pedal 27 is pressed so as to establish optimal capacity of hydraulic pump 11. While speed control pedal 27 is fixed at its pressed position, the greatest speed reduction ratio of HST 8 is fixed, whereby the working vehicle can cruise at constant low speed.

If the working vehicle is workless and going to travel on road, it may be possible that the working vehicle travels at a desirable high speed, repeats frequent stopping and starting, or climbs a slope. Thus, it is desired that the capacity of hydraulic motor 21 is switched between the smaller and the greater in correspondence to the fluctuations of the total resistance against driving axles 50L and 50R.

In other words, it is preferred that the capacity of hydraulic motor 21, reduced for smooth traveling under little resistance, is increased only when axles 50L and 50R are subjected to great resistance.

Then, accelerator lever 20 with friction lock means 45 is set to fix the output rotary speed of engine 2 optimally. Mode selection lever 36 is located at regular traveling mode position m2, as shown in FIGS. 18 and 19.

In such a precondition, speed control pedal 27 is pressed to an optimal depth so as to establish an optimal traveling speed. While the resistance against driving axles 50L and 50R is small and the hydraulic pressure in both first and second hydraulic oil circuits 111 and 112 is less than the pilot pressure for first valve 131, oil passage 140 is shut from cylinder chamber 106 by first valve 131 as shown in FIG. 18, thereby detracting piston 120 so as to keep motor swash plate 23 at minimum angle A1, whereby the highest possible traveling speed can be attained while speed control pedal 27 is pressed to a certain depth. Thus, working vehicle can accelerate and cruise desirably.

If the resistance against driving axles 50L and 50R is increased so that a pilot pressure for first valve 131 rises in either first or second hydraulic oil circuit 111 or 112, oil passage 140 is brought into communication with cylinder chamber 106 by first valve 131 as shown in FIG. 19, thereby thrusting out piston 120 so as to locate motor swash plate 23 at maximum angle A2, whereby the lowest possible traveling speed is attained while speed control pedal 27 is pressed to a certain depth. Thus, the resistance can be overcome so as to avoid overload on engine 2.

Referring to an embodiment shown in FIGS. 20 to 23, there is adopted motor capacity control system 200'c identical with that shown in FIGS. 16 to 19. The distinctive point of this embodiment from that shown in FIGS. 16 to 19 is that link mechanism 300 is interposed between accelerator system 100 and speed control pedal 27. Link mechanism 300 brings throttle arm 134 of carburetor 130 into connection with speed control pedal 27 according to the manipulation of mode selection lever 36. This structure and effect is described.

A first clutch shaft 53 is fixed to control arm 61 so as to be rotated integrally with control arm 61. A clutch slider is axially slidably provided around first clutch shaft 53 through a spline. A second clutch shaft 55 is disposed coaxially with first clutch shaft 53.

A clutch 54 including the clutch slider on first clutch shaft 53 is interposed between first and second clutch shafts 53 and 55.

The clutch slider interlocks with mode selection lever 36 so as to be slid along first clutch shaft 53 by rotating mode selection lever 36. Accordingly, clutch 54 is disengaged when mode selection lever 36 being located at work mode position m1 as shown in FIGS. 20 and 21, and is engaged when mode selection lever 36 being located at regular traveling mode position m2 as shown in FIGS. 22 and 23.

The other end of second clutch shaft 55 is fixed to a center position of an arm 57. Arm 57 has two opposite extended portions from its center point in connection with second clutch shaft 55. A cam plate 58 is disposed adjacent to arm 57. A cam plate 58 is pivoted at its one end and formed with a pair of concentrically arcuate first and second slots 58b and 58c centering on a pivot point 58a of cam plate 58.

A pair of first and second links 62 and 63 are interposed between arm 57 and cam plate 58. One end of each of links 62 and 63 is connected to each of the opposite extended portions of arm 57. The other end of each of links 62 and 63 is slidably inserted into each of first and second slots 58b and 58c, respectively. First slot 58b and the end of first link 62 therein are nearer to pivot point 58a than second slot 58c and the end of second link 63 therein. A clearance of first slot 58b for play of first link 62 does not need to be so long as that of second slot 58c for the same amount of play of second link 63. Thus, first slot 58b may be made shorter than second slot 58c. This effect is discussed later.

When mode selection lever 36 is located at work mode position m1 so as to disengage clutch 54 as shown in FIGS. 20 and 21, arm 57 stays at its neutral position so that the end of each of links 62 and 63 is held at one end of each of slots 58b and 58c. Even if mode selection lever 36 is located at regular traveling mode position m2 so as to engage clutch 54 as shown in FIGS. 22 and 23, when speed control pedal 27 is unpressed, arm 57 still stays at the neutral position so that the end of each of links 62 and 63 is still held at the one end of each of slots 58b and 58c.

A wire 59 is interposed between cam plate 58 and throttle arm 134. As mentioned above, throttle arm 134 is connected to accelerator lever 20 with friction lock means 45 through wire 64. In this embodiment, friction lock means 45 is switched between a locking state and an unlocking state. Mode selection lever 36 also interlocks with friction lock means 45. As shown in FIGS. 20 and 21, when mode selection lever 36 is located at work mode position m1, accelerator lever 20 is locked with friction lock means 45 so as to fix the output rotary speed of engine 2. As shown in FIGS. 22 and 23, when mode selection lever 36 is located at regular traveling mode position m2, accelerator lever 20 is unlocked from friction lock means 45, whereby accelerator lever 20 returns to its neutral position after its being released from manipulation force.

Due to such a construction as shown in FIGS. 20 to 23, when mode selection lever 36 is located at work mode position m1, throttle arm 134 is free from speed control pedal 27 because clutch 54 is disengaged.

Therefore, the throttle of carburetor 130 is controlled only by accelerator lever 20 regardless of the pressing of speed control pedal 27. Also, manipulated acceleration lever 20 is locked with friction lock means 45, thereby enabling the output rotary speed of engine 2 to be fixed. In this condition, the maximum capacity of hydraulic motor 21 is kept whether pilot pressure for first valve 131 may rise or not in one of first and second hydraulic oil circuits 111 and 112, as shown in FIGS. 20 and 21. Consequently, the working vehicle securely cruises at a constant speed established by pressed speed control pedal 27 however great resistance is generated against axles 50L and 50R.

When mode selection lever 36 is located at regular traveling mode position m2 as shown in FIGS. 22 and 23, clutch 54 is engaged so as to unify both first and second clutch shafts 53 and 55, thereby interlocking speed control pedal 27 with throttle arm 134.

In this state, when fore pedal portion 27a of speed control pedal 27 is pressed, control arm 61 is rotated through link rod 51 so that arm 57 is rotated from its neutral position in a direction as an arrow z shown in FIGS. 22 and 23 together with control shaft 60, first clutch shaft 53 and second clutch shaft 55. Accordingly, cam plate 58 is pulled and rotated by arm 57 through first link 62 while second link 63 plays with its end sliding in second slot 58c of cam plate 58. Rotated cam plate 58 pulls throttle arm 134 so as to widen the throttle of carburetor 130, thereby accelerating the output rotation of engine 2.

On the other hand, when rear pedal portion 27b of speed control pedal 27 is pressed, arm 57 is rotated from the neutral position oppositely to arrow z shown in FIGS. 22 and 23 together with control shaft 60, first clutch shaft 53 and second clutch shaft 55. Accordingly, cam plate 58 is pulled and rotated by arm 57 through second link 63 while first link 62 plays with its end sliding in first slot 58b of cam plate 58. Rotated cam plate 58 pulls throttle arm 134 so as to widen the throttle of carburetor 130, thereby accelerating the output rotation of engine 2.

Also, accelerator lever 20 is unlocked from friction lock means 45. Therefore, accelerator lever 20, while being untouched, stays at the neutral (idling) position. Accordingly, during the regular traveling mode, the throttle of carburetor 130 is controlled only by speed control pedal 27, in other words, speed control pedal 27 is pressed so as to change both the throttle of carburetor 130 and the capacity of hydraulic pump 11.

The pulling stroke of first link 62 according to the rotation of arm 57 when control arm 61 being rotated to a certain degree from its neutral position by pressing fore pedal portion 27a is the same with that of second link 63 when control lever 61 being oppositely rotated to the same degree from the neutral position by pressing rear pedal portion 27b. However, the clearance of first slot 58b for play of first link 62 while second link 63 being pulling cam plate 58 at a certain stroke is shorter than that of second slot 58c for play of second link 63 while first link 62 being pulling cam plate 58 at the same stroke. Thus, even if the capacity of hydraulic pump 11 is set to the same degree, the rotational degree of throttle arm 134 during backward traveling is less than that during forward traveling so that the acceleration of engine 2 is restricted during backward traveling in comparison with that during forward traveling.

Generally, while the working vehicle traveling backward, it is rare that the working vehicle accelerates suddenly or climbs a slope. Therefore, such a restriction of acceleration during backward traveling is reasonable and advantageous in fuel-saving.

Anyway, as shown in FIGS. 22 and 23, while mode selection lever 36 is located at regular traveling mode position m2, the capacity of hydraulic motor 21 is switched between the minimum and maximum according to detection of hydraulic pressure in either first or second hydraulic oil circuit 111 or 112 in the same manner as shown in FIGS. 18 and 19.

For application to the two embodiments of hydrostatic vehicle driving system shown in FIGS. 16 to 19 and FIGS. 20 to 23, transaxle apparatus 1 may be modified as shown in FIGS. 24 to 26.

In center section 10, oil passage 105' replacing vertical oil hole 105 is separated from both first and second hydraulic oil circuits 111 and 112 and downwardly open through a port sleeve 34a at the bottom of housing 9 so as to be connected to port C of second valve 132.

Also, charge oil passage 93 vertically bored in center section 10 is downwardly open through a port sleeve 34b at the bottom of housing 9 so as to be connected to ports A of first and second valves 131 and 132.

This structure of transaxle apparatus 1 is provided with such outward open ports for their connection with first and second valves 131 and 132 assumed to be provided out of housing 9. However, assuming that first and second valves 131 and 132 are disposed in housing 9, the downward open oil ports may be replaced with those open in housing 9.

Description will be given on another hydrostatic vehicle driving system shown in FIGS. 27 to 34.

The capacity of hydraulic motor 21 is controlled by the foregoing motor capacity control system 200'c including valves 131 and 132. The capacity of hydraulic motor 21 is fixed to the maximum when mode selection lever 36 is located at work mode position m1. It is switched between the minimum and maximum when mode selection lever 36 is located at regular traveling mode position m2.

Also, in this hydrostatic vehicle driving system, the capacity of hydraulic pump It is controlled by pressing speed control pedal 27 during the work mode, and it is automatically controlled according to the control of output rotary speed (acceleration) of engine 2 during the regular traveling mode.

For the automatic control of the capacity of hydraulic pump 11 during the regular traveling mode, transaxle apparatus 1 of this embodiment is provided with an automatic speed control system 160 for moving pump swash plate 13 of hydraulic pump 11 in addition to the linkage from speed control pedal 27. In this regard, as shown in FIG. 28, an orifice 170 is provided on the way of piston drive oil passage 140 extended form the discharge port of charge pump 16. A first cylinder drive oil passage 171 is extended from the upstream of orifice 170 in oil passage 140. A second cylinder drive oil passage 172 is extended from the downstream of orifice 170 in oil passage 140.

While engine 2 drives, first cylinder drive oil passage 171 is hydraulically pressured higher than second cylinder drive oil passage 172 because of orifice 170. Hydraulic pressure in piston drive oil passage 140 is increased in proportion of acceleration of engine 2 because oil passage 140 is supplied with oil discharged from charge pump 16 driven by pump shaft 12 which is driven synchronously with engine 2. Consequently, the difference of hydraulic pressure between first and second cylinder drive oil passages 171 and 172 is increased in proportion to acceleration of engine 2.

A pair of double-acting hydraulic cylinders, which are a forward drive cylinder 173 and a backward drive cylinder 174, are provided. Each of oil passages 171 and 172 branches into two ways so as to be connected to respective cylinder chambers of each of cylinders 173 and 174 through a forward/backward travel switching valve 175, which is a manual two-position switching valve interlocking with a manual forward/backward travel selection lever 28'.

Forward/backward travel switching valve 175 is a double valve consisting of a forward drive valve 175a and a backward drive valve 175b, which are switched together by switching lever 28'. When forward/backward travel selection lever 28' is located at a forward traveling position F, forward drive valve 175a supplies oil from both passages 171 and 172 into the respective chambers of forward drive cylinder 173, and backward drive valve 175b drains oil from both chambers of backward drive cylinder 174. When forward/backward travel selection lever 28' is located at a backward traveling position R, backward drive valve 175b supplies oil from both passages 171 and 172 into the respective chambers of backward drive cylinder 174, and forward drive valve 175a drains oil from both chambers of forward drive cylinder 173.

Whether forward/backward travel selection lever 28' may be located at forward traveling position F or backward traveling position R, the piston stroke of each of cylinders 173 and 174, which is supplied with oil from forward/backward travel switching valve 175, is increased in proportion to the increase of hydraulic pressure difference between oil passages 171 and 172, that is, acceleration of engine 2.

An arm 180 having three arm portions 180a, 180b and 180c is provided with its center portion pivoted. First and second arm portions 180a and 180b are oppositely extended from the center pivotal portion. Third arm portion 180c is extended from the center pivotal portion in perpendicular to first and second arm portions 180a and 180b. A piston rod of forward driving cylinder 173 is connected to first arm portion 180a, and that of backward driving cylinder 174 to second arm portion 180b.

When forward/backward travel selection lever 28' is located at forward traveling position F, backward drive cylinder 174 is free from hydraulic pressure and the piston rod of forward drive cylinder 173 pulls first arm portion 180a at a stroke as much as the difference of hydraulic pressure between oil passages 171 and 172. When forward/backward travel selection lever 28' is located at backward traveling position R, forward drive cylinder 173 is free from hydraulic pressure and the piston rod of backward drive cylinder 174 pulls second arm portion 180b at a stroke as much as the difference of hydraulic pressure between oil passages 171 and 172.

Selection means 150 is interposed among control arm 61, speed control pedal 27 and arm 180. Through selection means 150, control arm 61 is selectively connected to either swing arm 27c of speed control pedal 27 or third arm portion 180c of arm 180. This switching of connection depends upon the location of mode selection lever 36. When mode selection lever 36 is located at work mode position m1, speed control pedal 27 interlocks with control arm 61. When mode selection lever 36 is located at regular traveling mode position m2, arm 180 interlocks with control arm 61. In this state, the rotation of control arm 61 is synchronized with that of arm 180. Accordingly, The rotational angle of control arm 61 corresponds to the stroke of each of cylinders 173 and 174. The rotational direction of control arm 61 from its neutral position depends which of cylinders 173 and 174 is hydraulically pressured, that is, at which of positions F and R forward/backward travel selection lever 28' is located. In this regard, all of FIGS. 28 to 32 show that forward/backward travel selection lever 28' is located at forward traveling position F. When forward/backward travel selection lever 36 is located at backward traveling position R, forward drive valve 175a and backward drive valve 175b of forward/backward travel switching valve 175 are set at the other positions than those shown in FIGS. 28 to 32.

Consequently, while mode selection lever 36 is located at work mode position m1 as shown in FIGS. 28 and 31, control arm 61 interlocking with pump swash plate 13 of hydraulic pump 11 is rotated by pressing speed control pedal 27, that is, the capacity of hydraulic pump 11 is controlled by pressing speed control pedal 27. The discharge direction of hydraulic pump 11 depends upon which is pressed, fore pedal portion 27a or rear pedal portion 27b. FIG. 31 shows that speed control pedal 27 is neutral. FIG. 31 shows that fore pedal portion 27a is pressed.

In this state, motor swash plate 23 is fixed at maximum angle A2 so as to keep the maximum capacity of hydraulic motor 21 in the above mentioned manner using valves 131 and 132, thereby overcoming load on engine 2 while being traveling at an optimal speed determined by pressing speed control pedal 27.

On the other hand, as shown in FIGS. 29, 30 and 32, while mode selection lever 36 is located at regular traveling mode position m2, control arm 61 is rotated by rotation of arm 180 in correspondence to the acceleration degree of engine 2.

in this regard, as shown in FIGS. 27 to 32, the working vehicle of this embodiment is provided with accelerator system 100' as described above. This may be replaced with another such as accelerator system 100. In this system 100', accelerator lever 20 and momentary accelerator pedal 46 are used for controlling throttle arm 134 of carburetor 130. Moreover, while mode selection lever 36 is located at regular traveling mode position m2, accelerator lever 20 and momentary accelerator pedal 46 are also used for controlling the capacity of hydraulic pump 11. In this state, speed control pedal 27 is useless. FIGS. 29 and 32 show that engine 2 is neutral so that arm 180 stays at its initial position, thereby keeping HST 8 neutral. FIGS. 31 shows that accelerator lever 20 or momentary accelerator pedal 46 is operated to some degree for acceleration of engine 2 so that arm 180 is rotated so much, thereby automatically determining the capacity of hydraulic pump 11 without pressing speed control pedal 27.

Also, while mode selection lever 36 is located at regular travel mode position m2, motor swash plate 23 is switchable between minimum angle A1 and maximum angle A2 so as to vary the capacity of hydraulic motor 21 in correspondence to the load on engine 2. FIG. 29 and 31 shows that swash plate 23 is set at minimum angle A1 while light load being applied on engine 2. FIG. 32 shows that motor swash plate 23 is set at maximum angle A2 under heavy load applied on engine 2.

In this embodiment, mode selection lever 36 and its base portion serving as selection means 150 are structured such as shown in FIG. 34. A horizontal base shaft 123 is rotatably supported by an optimal portion of the working vehicle. Mode selection lever 36 is disposed substantially upwardly from base shaft 123. A U-like shaped segment 36a is fixedly provided onto the bottom end of mode selection lever 36 so as to straddle base shaft 123. A pin 124 penetrates base shaft 123 together with segment 36a so as to cross the axis of base shaft 123 perpendicularly, so that mode selection lever 36 is not rotatable around base shaft 123, but is rotatable around pin 124 in the axial direction of base shaft 123.

A first input arm 151 and a second input arm 152 are juxtaposed along base shaft 123 so as to sandwich mode selection lever 36. First and second input arms 151 and 152 are formed with respective boss portions 151a and 152a which are rotatably disposed around base shaft 123.

First input arm 151 is connected to swing arm 27c of speed control pedal 27 through an optimal linkage. Second input arm 152 is connected to third arm portion 180c of arm 180.

Above boss portions 151a and 152a, first and second input arms 151 and 152 are formed with respective guide plate portions 151b and 152b. Guide plate portions 151b and 152b are notched toward mode selection lever 36 so as to form respective guide notches 151c and 152c facing each other. Guide notch 151c serves as work mode position m1 for mode selection lever 36. Guide notch 152c serves as regular traveling mode position m2 for mode selection lever 36.

An output arm 153 is tied through its boss portion 153a together with base shaft 123. Output arm 153 fixed to base shaft 123 in such a manner is connected to control arm 61 interlocking with pump swash plate 13 of hydraulic pump 11.

Therefore, when mode selection lever 36 is located at work mode position m1, that is, when mode selection lever 36 is engaged in guide notch 151c, first guide arm 151 is integrated with base shaft 123 through mode selection lever 36 so as to connect speed control pedal 27 with control arm 61. During this state, first input arm 151 is rotated together with base shaft 123 and output arm 153 around the axis of base shaft 123 in correspondence to the pressing of either pedal portion 27a or 27b of speed control pedal 27, thereby rotating control arm 61 in connection with output arm 153 so as to rotate pump swash plate 13.

On the other hand, when mode selection lever 36 is located at regular traveling mode position m2, that is, when mode selection lever 36 is engaged in guide notch 152c, second guide arm 152 is integrated with base shaft 123 through mode selection lever 36 so as to connect arm 180 with control arm 61. During this state, second input arm 152 is rotated together with base shaft 123 and output arm 153 around the axis of base shaft 123 in correspondence to the stroke of either hydraulic cylinder 173 or 174, that is, the rotational angle of throttle arm 134 operated by accelerator lever 20 and/or momentary accelerator pedal 46 and the location of forward/backward travel selection lever 28', thereby rotating control arm 61 so as to rotate pump swash plate 13.

Transaxle apparatus 1 may be modified for this embodiment as shown in FIG. 33. Similarly with transaxle apparatus 1 shown in FIGS. 24 to 26, port sleeves 34a is provided for connecting cylinder chamber 106 in center section 10 with second valve 132 disposed out of housing 9. Also, port sleeve 34b is provided for bringing charge oil passage 93 among check valve 19 and two check valves 26 into connection with first valve 131 and second valve 132 disposed out of housing 9.

Furthermore, in this embodiment, center section 10 is provided with a part of piston drive oil passage 140 including orifice 170 (not shown).

A pair of port sleeves 34c and 34d are provided through the bottoms of center section 10 and housing 9 so as to be open downward, from which respective oil passages 171 and 172 are extended.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A hydrostatic transaxle applicable to a working vehicle having an engine, comprising:
   a housing;
   a variable displacement hydraulic pump disposed within said housing and driven by said engine;
   a variable displacement hydraulic motor, disposed within said housing, a capacity of which is switchable between a first capacity and a second capacity that is larger than said first capacity;
   a hydraulic circuit for fluidly connecting said hydraulic pump and said hydraulic motor with each other;
   a center section having said hydraulic circuit, disposed within said housing;
   an axle disposed within said housing driven by said hydraulic motor;
   a manual speed control member for changing a capacity of said hydraulic pump; and
   an actuator disposed on said center section for switching the capacity of said hydraulic motor between said first and second capacities, wherein the actuator is controlled so that the capacity of said hydraulic motor is set to said first capacity when load on said engine is less than a predetermined value, and set to said second capacity when load on said engine is not less than said predetermined value.

2. The hydrostatic transaxle as set forth in claim 1, said actuator being a hydraulic actuator, further comprising:
   load-detection means detecting hydraulic pressure in said hydraulic circuit corresponding to the load on said engine, wherein said actuator is controlled according to the hydraulic pressure detected by said load-detection means.

3. The hydrostatic transaxle as set forth in claim 1, further comprising:
   a manual mode selection member provided on said working vehicle so as to be switched between a first mode position and a second mode position, wherein, when said mode selection member is located at said first mode position, a capacity of said hydraulic motor is fixed, and wherein, when said mode selection member is located at said second mode position, the capacity of said hydraulic motor can be varied by said motor capacity control system.

4. The hydrostatic transaxle as set forth in claim 3, wherein the capacity of said hydraulic pump is controlled by operation of said speed control member whether said mode selection member is located at said first mode position or said second mode position.

5. The hydrostatic transaxle as set forth in claim 4, wherein said speed control member is selectively connected to a carburetor of said engine so that, when said mode selection member is located at said second mode position, said speed control member is operated so as to control both the capacity of said hydraulic pump and an output rotary speed of said engine.

6. The hydrostatic transaxle as set forth in claim 1, said hydraulic motor being of an axial piston type having a movable motor swash plate.

7. A hydrostatic transaxle applicable to a working vehicle having an engine, comprising:
   a housing;
   a variable displacement hydraulic pump disposed within said housing and driven by said engine;
   a hydraulic motor disposed within said housing;
   a first hydraulic circuit, for driving said hydraulic motor, interposed between said hydraulic pump and said hydraulic motor;
   an axle disposed within said housing driven by said hydraulic motor;
   a manual speed control member for changing a capacity of said hydraulic pump;
   a hydraulic actuator for changing the capacity of said hydraulic pump, said hydraulic actuator being controlled according to output of said engine; and
   selection means selecting one of said manual speed control member and said hydraulic actuator so as to change the capacity of said hydraulic pump.

8. A hydrostatic transaxle applicable to a working vehicle having an engine, comprising:
   a housing;
   a variable displacement hydraulic pump disposed within said housing and driven by said engine;
   a hydraulic motor disposed within said housing;
   a first hydraulic circuit, for driving said hydraulic motor, interposed between said hydraulic pump and said hydraulic motor;
   an axle disposed within said housing driven by said hydraulic motor;
   an actuator for changing capacity of said hydraulic pump;
   a charge pump driven by said engine;
   a second hydraulic circuit extended from a discharge port of said charge pump; and
   an orifice provided on the way of said second hydraulic circuit, wherein said actuator is driven according to difference of hydraulic pressure in said second hydraulic circuit between upstream and downstream of said orifice.

9. The hydrostatic transaxle as set forth in claim 8, further comprising:
   a manual speed control member for changing the capacity of said hydraulic pump, and
   selection means selecting one of said manual speed control member and said actuator so as to change the capacity of said hydraulic pump.

10. A hydrostatic transaxle applicable to a working vehicle having an engine, comprising:
   a housing;
   a variable displacement hydraulic pump disposed within said housing and driven by said engine;
   a variable displacement hydraulic motor disposed within said housing;
   a first hydraulic circuit, for driving said hydraulic motor, interposed between said hydraulic pump and said hydraulic motor;
   an axle disposed within said housing driven by said hydraulic motor;
   a manual speed control member for changing a capacity of said hydraulic pump;
   an actuator for changing the capacity of said hydraulic pump, said actuator being controlled according to output of said engine; and
   selection means selecting one of said manual speed control member and said actuator so as to change the capacity of said hydraulic pump, wherein, while said selection means selects said speed control member, a capacity of said hydraulic motor is fixed, and wherein, while said selection means selects said actuator, the capacity of said hydraulic motor can be changed.

* * * * *